US007207041B2

(12) United States Patent
Elson et al.

(10) Patent No.: US 7,207,041 B2
(45) Date of Patent: Apr. 17, 2007

(54) OPEN PLATFORM ARCHITECTURE FOR SHARED RESOURCE ACCESS MANAGEMENT

(75) Inventors: Jeremy Elson, Culver City, CA (US); Lewis D. Girod, Culver City, CA (US); William J. Kaiser, Los Angeles, CA (US); Josef Kriegl, San Diego, CA (US); Gregory J. Pottie, Los Angeles, CA (US); Guillaume Francois Rava, Culver City, CA (US)

(73) Assignee: Tranzeo Wireless Technologies, Inc., Vancouver, British Columbia (CA)

( * ) Notice: Subject to any disclaimer, the term of this patent is extended or adjusted under 35 U.S.C. 154(b) by 1010 days.

(21) Appl. No.: 10/184,527

(22) Filed: Jun. 28, 2002

(65) Prior Publication Data

US 2003/0014521 A1    Jan. 16, 2003

Related U.S. Application Data

(60) Provisional application No. 60/343,312, filed on Dec. 21, 2001, provisional application No. 60/301,660, filed on Jun. 28, 2001.

(51) Int. Cl.
G06F 9/50 (2006.01)
(52) U.S. Cl. ............................ 718/104; 718/102; 718/1; 719/321; 719/328; 719/331; 726/1
(58) Field of Classification Search .................... 718/1, 718/100–108; 719/310–332; 709/226–229
See application file for complete search history.

(56) References Cited

U.S. PATENT DOCUMENTS

| | | | |
|---|---|---|---|
| 4,649,524 A | 3/1987 | Vance | 367/13 |
| 4,812,820 A | 3/1989 | Chatwin | 340/518 |

(Continued)

FOREIGN PATENT DOCUMENTS

| | | | | |
|---|---|---|---|---|
| DE | 19743137 A1 | 9/1997 | | 13/194 |
| EP | 0814393 A1 | 12/1997 | | 19/42 |
| WO | WO 9917477 | 4/1999 | | |
| WO | WO 0054237 | 9/2000 | | |

OTHER PUBLICATIONS

Engler, Dawson R. et al. "Exokernel: An Operating System Architecture for Application-Level Resource Management." ACM. 1995.*
Hunt, Galen C. "Creating User-Mode Device Drivers with a Proxy." USENIX. Aug. 1997.*
Mayes, K.R. et al. "Network performance in Arena." 1996.*
G. Asada, et al., "Wireless Integrated Network Sensors (WINS)," SPIE vol. 3673, Mar. 1999.

(Continued)

*Primary Examiner*—Lewis A. Bullock, Jr.
(74) *Attorney, Agent, or Firm*—Courtney Staniford & Gregory LLP

(57) ABSTRACT

An open platform architecture and methods for shared resource access management are provided. A redirection module in kernel space receives requests for access to resources from applications in user space. The redirection module routes signals representative of the received requests to a device driver interface in user space. Components of the device driver interface include resource management modules and device drivers that correspond to available resources. The resource management modules generate queries to the device drivers regarding availability of the requested resources. Upon receipt of resource status information from the device drivers, components of the device driver interface generate schedules for granting access to the requested resources. Further, the device driver interface components control access to the resources in accordance with the generated schedules including issuing responses to the requesting applications and the device drivers of the requested resources.

15 Claims, 36 Drawing Sheets

U.S. PATENT DOCUMENTS

| | | | | |
|---|---|---|---|---|
| 4,855,713 | A | 8/1989 | Brunius | 340/506 |
| 4,951,029 | A | 8/1990 | Severson | 340/506 |
| 5,241,542 | A | 8/1993 | Natarajan et al. | 370/95.3 |
| 5,247,564 | A | 9/1993 | Zicker | 379/40 |
| 5,295,154 | A | 3/1994 | Meier et al. | 375/1 |
| 5,428,636 | A | 6/1995 | Meier | 375/202 |
| 5,475,687 | A | 12/1995 | Markkula, Jr. et al. | 370/85.1 |
| 5,553,076 | A | 9/1996 | Behtash et al. | 370/95.3 |
| 5,659,195 | A | 8/1997 | Kaiser et al. | 257/415 |
| 5,732,074 | A | 3/1998 | Spaur et al. | 370/313 |
| 5,854,994 | A | 12/1998 | Canada et al. | 702/56 |
| 6,028,857 | A | 2/2000 | Poor | 370/351 |
| 6,208,247 | B1 | 3/2001 | Agre et al. | 340/539 |
| 6,477,560 | B1 * | 11/2002 | Murayama et al. | 718/104 |
| 6,571,257 | B1 * | 5/2003 | Duggan et al. | 707/202 |
| 6,732,138 | B1 * | 5/2004 | Browning et al. | 718/102 |
| 6,904,477 | B2 * | 6/2005 | Padmanabhan et al. | 710/74 |
| 2002/0152331 | A1 * | 10/2002 | Wong et al. | 709/321 |
| 2004/0216145 | A1 * | 10/2004 | Wong et al. | 719/321 |

OTHER PUBLICATIONS

H. Lohle, et al., "BorderMaster 2000— An Advanced Border Surveillance System," 1225 Electrical Communication, 2nd Quarter 1994, Paris, France.

M. Dong, et al., "Low Power Signal Processing Architectures For Network Microsensors," International Symposium on Low Power Electronics & Design (ISLPED), pp. 173-177, Jan. 1998.

T. H. Lin, et al., "CMOS Front End Components For Micropower RF Wireless Systems," Proceedings of the 1998 International Symposium on Low Power Electronics & Design (ISLPED), pp. 11-15, Aug. 1998.

S. Natkunanathan, et al., "A Signal Search Engine For Wireless Integrated Network Sensors," ASFL Annual Symposium, pp. 1-4, Mar. 2000.

G. Asada, et al., "Wireless Integrated Network Sensors: Low Power Systems on a Chip," Proceedings of the 1998 European Solid State Circuits Conference (ESSCIRC), pp. 1-8, The Hague, The Netherlands, Sep. 22-24, 1998.

G. Pottie, R&D Quarterly and Annual Status Report for AWAIRS for the period Jan. 1-Apr. 31, 1999, pp. 1-28, Apr. 31, 1999.

G. Pottie, et al., "Wireless Integrated Network Sensors: Towards Low Cost and Robust Self-Organizing Security Networks," SPIE Conference on Sensors, C31, Information and Training Tech. for Law Enforcement, Boston, MA, pp. 1-10, Nov. 3-5, 1998.

L. Clare, et al., "Self-Organizing Distributed Sensor Networks," SPIE 13th Annual Symposium on Aerosense/Defense Sensing, Simulation and Controls, UGS Technologies and Applications Conference, Orlando, FL, pp. 1-9, Apr. 5-9, 1999.

J. Agre, et al., "Autoconfigurable Distributed Control Systems," Proceedings of the 2nd International Symposium on Autonomous Decentralized Systems (ISADS 95), Phoenix, AZ, pp. 162-168, Apr. 25-27, 1995.

J. Agre, et al., "Development Platform for Self-Organizing Wireless Sensor Networks," SPIE 13th Annual Symposium on Aerosense/Defense Sensing, Simulation and Controls, Unattended Ground Sensor Technologies and Applications Conference, Orlando, FL, pp. 1-12, Apr. 5-9, 1999.

K. Sohrabi, J. Gao, V. Ailawadhi, G. Pottie, "A Self-Organizing Wireless Sensor Network," Proc. 37th Allerton Conf. On Comm., Control, and Computing, Monticello, IL, Sep. 1999.

D.J. Baker and A. Ephremides, "The Architectural Organization of a Mobile Radio Network via a Distributed Algorithm," IEEE Transactions on Communications, vol. Com-29, No. 11, Nov. 1981, pp. 1694-1701.

J. Elson, L. Girod, and D. Estrin, "Fine-Grained Network Time Synchronization Using Reference Broadcasts," submitted to SIGCOMM 2002.

W. Merrill, K. Sohrabi, L. Girod, J. Elson, F. Newberg, and W. Kaiser, "Open Standard Development Platforms for Distributed Sensor Networks," Aerosense Conference, Orlando, FL, Apr. 2002.

M. Gerla and J. Tzu-Chieh Tsai, "Multicluster, Mobile, Multimedia Radio Network," ACM-Baltzer Journal of Wireless Networks, vol. 1, No. 3, pp. 255-265, 1995.

C. R. Lin and M. Gerla, "Adaptive Clustering for Mobile Wireless Networks."

\* cited by examiner

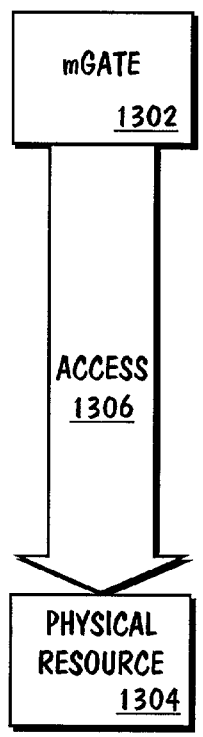 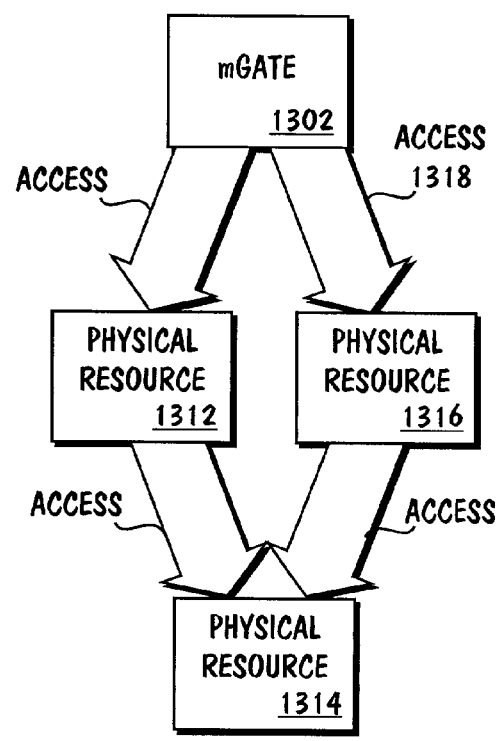
INDEPENDENT RESOURCE             COMBINED RESOURCES
FIG. 13A                         FIG. 13B

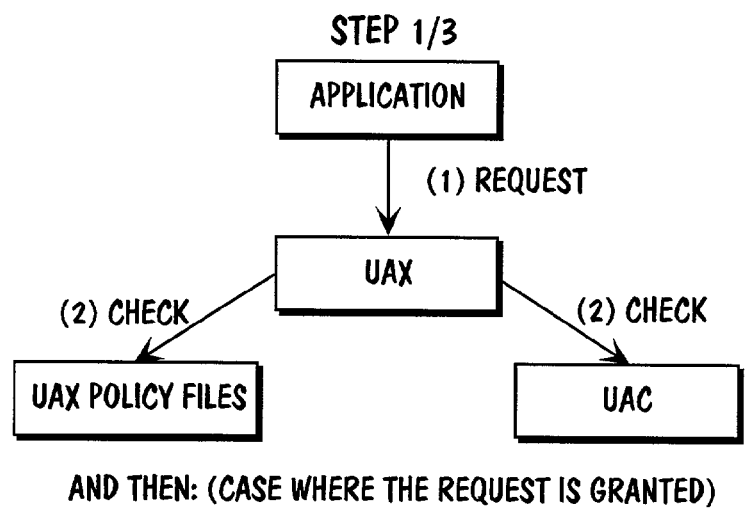
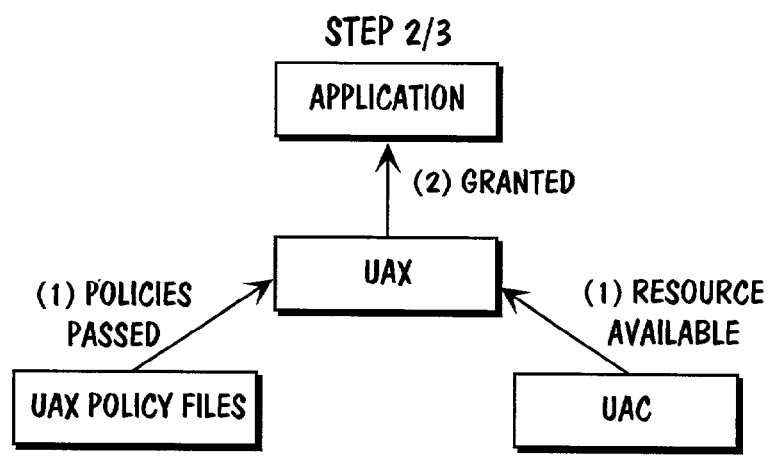
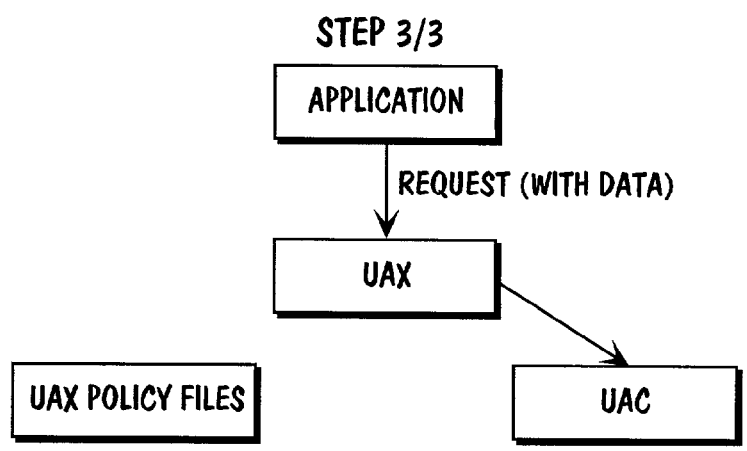
FIG. 21

| | |
|---|---|
| ]now, ∞ [ | AS SOON AS POSSIBLE, WITHOUT UPPER LIMIT |
| ]now, now + 1 hour [ | THE REQUEST IS EXECUTED WITHIN AN HOUR |
| ]now, now + 3 seconds [ | PRACTICALLY THE REQUEST IS EXECUTED NOW - THE "3 SECONDS" IS ARBITRARY |
| ]now + 3 seconds, ∞ [ | ASAP, BUT WITH AN INITIAL DELAY OF 3 SECONDS. THIS IS THE CASE WHERE SOMETHING IS TO BE PLAYED ASAP, BUT A SMALL PAUSE IS PLACED AFTER THE END OF THE CURRENT PLAY |
| ]now + 1 hour, now + 2 hour [ | IN AN HOUR FROM NOW, AND WITHIN AN HOUR |
| ]12:00pm, 12:05pm [ | AT NOON (5 MINUTE WINDOW) |

FIG. 22

OPEN PLATFORM ARCHITECTURE FOR SHARED RESOURCE ACCESS MANAGEMENT

RELATED APPLICATIONS

This application claims the benefit of U.S. patent application Ser. Nos. 60/301,660 filed Jun. 28, 2001 and 60/343,312 filed Dec. 21, 2001, both of which are currently pending and incorporated herein by reference in their entirety.

STATEMENT OF GOVERNMENT INTEREST

This invention was made with United States government support under Contract Number DAAE30-00-C-1055 awarded by the Defense Advanced Research Projects Agency (DARPA) Advanced Technology Office (ATO) and Contract Number F30602-99-C-0171 awarded by the DARPA Information Exploitation Office (IXO). The United States government may have certain rights in this invention.

FIELD OF THE INVENTION

The disclosed embodiments relate to systems that process numerous requests from applications for access to physical resources such as communications ports, user interfaces, sensors, or actuators.

BACKGROUND

Vehicle networks can be assembled to include networks connected to devices installed by the original equipment manufacturer (OEM), a consumer bus linked to other devices including ports for wireless networks, and a gateway that mediates access among these various devices, as described in the Related Applications. The gateway can be configured to mediate security and external communications. As such, the gateway provides access to telematics services involving remote servers connected through a public network such as the Internet. The gateway, therefore, becomes a resource manager or interface for resources such as communications, data sources, and user interfaces. Thus, the gateway in combination with the networked devices enables a smart vehicle.

In order to capture the potential of automotive telematics systems, many entities will need to be able to connect to the smart vehicles. These entities include retail businesses, automotive OEM suppliers, insurance providers, corporate information technology (IT) organizations, roadway infrastructure providers, and others. These entities must rely on open standards for gaining access to the vehicle. Open standards ensure that all vendors will be able to reach all vehicles and that application developers will have the assurance that their applications are portable and can access the largest market base. Therefore, proprietary extensions to software languages or middleware standards must be avoided—or the portability and validation benefits of these standards will not be obtained.

Serious limitations exist in typical open standards because these standards were developed for conventional IT platforms, for example the desktop computer. The embedded systems of telematics platforms differ from conventional platforms in that they often contain multiple network interfaces and support connections between private vehicle interfaces and external networks. Also, the network connectivity for telematics platforms can require a high cost per unit connect time, (unlike workstation networks). Therefore it is desirable for telematics networking to include integrated cost accounting. Additionally, multiple users may attempt to access shared physical resources in the vehicle such as the audio system, sensors, communications ports and various consumer devices that may be connected to consumer buses. Further, both applications local to the host vehicle and remote applications may attempt access. Conventional systems do not conveniently or securely manage this shared access.

A goal of the telematics community is that local telematics software applications, for example those hosted on an automotive gateway, will deliver compelling safety, security, productivity, and entertainment applications while also enabling the transaction capabilities that will provide revenue. The enabling software infrastructure requires contributions from in-vehicle platform providers, the telematics service provider, and third party independent software vendors (ISVs). This infrastructure and market will be impeded without open and common connectivity and interoperability between vehicles, vendors, and operators. An open standards approach will allow companies to have a uniform way to interface to different vehicle brands. Also, in this way, vendors including petroleum suppliers, convenience restaurants, and other concerns will be better incentivized to connect to the vehicle telematics system if it is the same for different vehicles.

A number of open standards exist currently that provide capabilities for telematics platforms. Generally, these open standards have been developed for conventional desktop computing and other fixed-base applications and are not adaptable to environments where platforms operate in an intermittently connected fashion over a wireless link having a low quality of service along with many other constraints. The primary technologies and available standards include the Portable Operating System Interface (POSIX) standard, the portable software standard, software provisioning standards like the Open Services Gateway Initiative (OSGi), networking standards like wireless point-to-point packet (PPP) communication protocols, security standards like Secure Sockets Layer (SSL), vehicle interface standards like J-1850 and others, local client support standards like Bluetooth, IEEE 802.11, and others, and the Automotive Multimedia Interface Collaboration (AMI-C) standard.

The POSIX defines a standard for a vendor-independent application programming interface (API) between applications and operating systems. The POSIX standard is defined by IEEE 1003, and defines critical operating systems features including those that enable synchronization and scheduling. By following the POSIX standard in selecting the operating system and in development, the portability of the entire platform is maintained. This allows the telematics service provider (TSP) and OEM (e.g., vehicle manufacturer) to make choices for software systems including choices for multiple Java virtual machine (JVM) and middleware vendors. The wide adoption of POSIX standard operating systems means that these systems will carry a large selection of portable JVMs, wireless LAN (local area network) (Bluetooth) interface drivers, protocol stacks, and profiles, as well as other future device drivers and computing platforms.

Open, standard operating systems, including embedded Linux, provide networking, process scheduling, file systems, and security. However, as will be described below in more detail, telematics applications preferentially should make use of additional networking capability for cost-accountable, wireless access, process scheduling for launching and managing multiple applications with controlled process priorities, security for authentication of Gateway platform and applications. These additional networking capabilities are not provided by POSIX.

With reference to the portable software standard, the standard Java Run Time Environment (JRE) provides a hardware-independent platform. The proper operating system and architecture choices allow multiple JVM choices to be selected and to support standard applications. However, Java applications, supported by a virtual machine for example provided on an embedded telematics platform, preferentially should be supported with infrastructure services available in a language-independent fashion. These services include wireless networking, vehicle device, and user interface access. In addition, the JRE faces the challenge for monitoring resource usage, a requirement for managing multiple Telematics applications, hosted on the virtual machine.

The OSGi provides Java application hosting and provisioning. The functions specific to OSGi include installation and uninstallation, process control (starting and stopping an application), service registration, and a security mechanism based on JRE permissions. While OSGi services are effective for provisioning of software to conventional fixed base clients that are equipped with continuous network access, the OSGi standard is limited in management of platforms like telematics platforms that operate in an intermittently connected environment over wireless channels. It is desirable to support OSGi or similar functionality with the proper architecture so that provisioned services are furnished with the appropriate processing priority and have controlled access to secure and accountable networking, as well as other resources.

Networking standards like the wireless PPP communication protocols combined with standard lossless data compression and error correction methods (V.42) can provide a telematics communication substrate, leveraging well-known, cross-industry wireless data communication. Unlike conventional platforms, however, additional support is preferred in telematics platforms to enable the cost accounting so that multiple applications have accountable and fair access to the wireless channel. Also, in addition, automotive telematics carries an unusual burden that applications may exploit multiple wireless channels in a fragmented carrier marketplace. Finally, communication efficiency is more important than in typical broadband applications.

Security standards like SSL transport combined with the Public Key Infrastructure (PKI) offer authentication of embedded platforms, authentication of the Enterprise, message authentication and encrypted communication. In the context of a telematics platform, however, secure networking over these open standards may not be efficiently provided to applications. In particular, networking security may not be provided such that all applications are ensured of security and that the platform is assured that no application may communicate over an unsecured channel or to a network node that is not authenticated in the standard way. It is particularly desirable to ensure that applications do not implement multiple security channels that must be individually validated and may represent security risks.

Because typical vehicle interface standards lack independent interfaces, a vehicle independent interface for telematics applications is desirable to enable portability of applications between vehicles. Also, interfaces to vehicle networks should include security capabilities intended to provide applications with a degree of access that resolves the permissions associated with particular applications. Interfaces should also manage throughput to ensure that applications are not capable of exceeding bandwidth allocations.

The typical local client support standards lack a secure interface that permits authorized applications to gain access to local handheld devices via Bluetooth, IEEE-802.11 interfaces, or other such wireless communications standards as may emerge.

The AMI-C is a worldwide organization of motor vehicle manufacturers created to facilitate the development, promotion and standardization of automotive multimedia interfaces to motor vehicle communication networks. The AMI-C mission is to fill a gap in the current vehicle interface standards by developing a set of common specifications for a multimedia interface to motor vehicle electronic systems in order to accommodate a wide variety of computer-based electronic devices in the vehicle. Implementation of AMI-C capabilities will be facilitated by an open platform based on the standards discussed above.

Turning now to the limitations of typical conventional software architectures in the support of open platforms, it is noted that currently available desktop and enterprise platforms have driven the guiding set of requirements for Java platforms. These have assumed availability of large memory and storage resources and high speed, continuously available Transmission Control Protocol/Internet Protocol (TCP/IP) networking. However, it is desirable to enable a foundation for portable Java applications to support telematics applications that carry networking, resource management, and security objectives that are not met by conventional technologies. It is thus desirable that standard Java, without proprietary extensions, be enabled by appropriate platform infrastructures.

To illustrate these issues, reference is made to FIG. 1, which shows the platform JRE known in the art as it would be hosted on an operating system, which in turn accesses drivers to networking and other devices. The entire software architecture might for example be supported on a platform such as an automotive gateway described in the Related Applications. This standard architecture provides the benefits of application portability (between platforms operating with standard Java platforms and frameworks) and security. The Java 2 security standard implements and defines the "sandbox model" that provides applications with restricted access to specified file systems via a permissions architecture provided by the Java class, java.security.Permission. Also, the Java 2 security standard defines a local namespace that is invoked by the Java platform ClassLoader. Access to resources is controlled by security manger/access controller.

However, examination of this prior art architecture also reveals limitations. In particular, the standard Java platform does not include methods for managing resource assignment to applications. In conventional desktop applications, this may not be a severe limitation in normal usage since determinism is not regarded as the high priority that it is in applications that may involve control system functions. Also, the number of parallel tasks that are normally launched may be small for desktop applications. In contrast, however, telematics systems may support many parallel applications including diagnostics, telematics transaction management, speech processing, media management and media players, networking, and others. Each application should operate with specified priorities and with controlled access to resources that potentially include any or all of the device drivers.

As such, methods should be provided in platforms such that resources including memory and processor cycles can be monitored. This resource monitoring should ensure that system management can limit, terminate, and log an application that has occupied excessive resources. If only one application is running on a JVM, then the operating system may control its global resource usage since the operating system supports the virtual machine (VM) as a conventional process. However, for many parallel applications operating on one JVM, there is no ability in the Java standard for resource consumption management. This requires the solution to protect security and determinism. The platform should additionally provide resource management through standardized, open interfaces while avoiding any proprietary extensions to a particular JRE.

Another limitation of typical conventional software architectures in the support of open platforms is the lack of adequate security. For example, consider FIG. 2, which again depicts a JRE implementation known in the art in a situation where an application has access to wireless network drivers as well as vehicle control drivers. Conventional Java security frameworks permit applications to gain access to device drivers. For example, a diagnostics application may require access to the vehicle control network (for example the J-1850 network) while also enabling wireless access. However, it is required that this application be prevented from operating without security since faults in the application would leave open a path from the wireless environment into the vehicle network. FIG. 2 shows an instance where an application has access to network drivers in this way. Solving this problem by removing access to drivers would be unacceptable to the application developer. Thus, the application developer should have access to a standard and open driver interface that includes control by security permission policy. As for the resource management problem, this technology requirement is more important in telematics and other situations where many users may attempt resource access than in many other applications. Generally, for desktops, access to drivers may remain open.

As for resource management, it is not a problem on conventional computing platforms because network access cost is negligible. For a desktop system, one user maintains responsibility for all network costs and applications all act in support of this user. Further, the use controls the applications and their access. In the case of a cellular telephone microbrowser or pager, again, applications act on the behalf of a single user. However, for telematics, multiple applications may operate in parallel and all may seek network access at specific times. The conventional Java platform allows each application to gain access to network port drivers. FIG. 3 shows the shared access problem of platforms known in the art with an instance where multiple applications all have access to the cellular wireless network device driver. Here it is desirable that proper cost accounting be applied to network access such that the cellular port is not only fairly shared, but, that costs are properly accounted for. There are many similar shared access problems.

Further to the resource management problem found in platforms known in the art, the typical platforms fail to provide a standard, open interface to a network port that includes network traffic cost accounting. This cost accounting should be combined with resource management since the ports in question will be shared by multiple applications.

FIG. 4A shows the OSGi architecture known in the art, including the Java platform architecture. While the OSGi standard specifies methods for delivery and management of applications on remote clients, the standard has many limitations. The standard specification relies on remote service management using servers that access the embedded clients over continuously maintained networks. However, since telematics embedded platforms may operate in an intermittently connected environment, local management of resources and security needs to be added.

The OSGi standard specifies functionality for bundle installation into the Framework, service registration in a registry created by the Framework, distribution of service references to Bundles, distribution of references to other installed Bundles, publish/subscribe methods for Framework events broadcast, and service discovery, log service, and Hypertext Transfer Protocol (HTTP) service Bundles. FIG. 4B is a block diagram of a signed application bundle known in the art. The Bundle components include a Signature Block File (.SF signature and Public Key Certificate), Signature File (Hash entries of all JAR files below), Manifest File (Bundle specific information), and Application Files (Application classes).

The contents of a typical Manifest File for a Service Bundle, LocationService, include the following information: (a) Bundle-Vendor: Sensoria Corporation; (b) Bundle-Version: 1.0; (c) Bundle-Activator: com.sensoria.osgi.impl.gps.GPSSIActivator; (d) Created-By: Sensoria Corporation; (e) Bundle-Name: LocationService; (f) Bundle-ContactAddress: support@sensoria.com; (g) Bundle-Description: GPS Location Service; (h) Export-Package: com.sensoria.osgi.service.gps; and (i) Import-Package: org.osgi.service.log. This manifest file corresponds to a LocationService Service Bundle that might operate on an automotive Gateway platform, for example the gateway available from Sensoria Corporation and described in the Related Applications.

In examining the detailed architecture of the Bundle it is noted that the Export-Package definition contains a package name which is expected to include an interface class. This interface class contained in com.sensoria.osgi.service.gps describes the methods that are available to other Service Bundles that have obtained a reference to LocationService. Also, an Import-Package definition includes a reference to the standard OSGi defined event logging service—org.osgi.service.log.

In addition to defined Export-Package class locations, the Service Bundle implementer also must provide an implementation of the Bundle activator class, which is named in the Bundle-Activator field. This class contains a start( ) method that serves as an entry point to initialize the OSGi Application Framework thread that starts the Bundle application. An important architectural feature is that this method is expected to return immediately, so any Bundle that must implement application functionality must create its own thread(s) in its start method. Thus, all application Service Bundles behave autonomously. This is generally considered an advantage for conventional platforms that operate with resource constraints. However, the autonomous creation of threads, allocation of memory, and occupying of computing cycles all represent concerns for control of the robust and secure platform. There are also resource consumption management issues associated with this autonomy.

Applications operating over the OSGi Application Framework access system services via the Java System Libraries and Java Native Interface, in the usual way. Now, while this may be permissible in some embedded technology applications, this is not applicable to telematics. In telematics applications, the embedded device (Gateway) operates with access to vehicle networks, external Internet connectivity, and local area wireless connectivity. Thus, the embedded platform now contains a routing and bridging function. Thus, the security requirements for this platform are drastically more significant since the embedded platform can, in principle, enable network access between private vehicle services and the external Internet or other local devices. This security risk points towards a need for new solutions. However, it is desirable for reasons of rapidity of application development that these solutions be provided without introducing proprietary OSGi extensions.

Limitations of conventional extensions of open software architectures are now described. Telematics applications are likely to appear in a variety of forms. Consider for example the following two categories: (1) compact Java telematics applications that are provisioned over the wireless network via application Service Bundles using the OSGi standard; and (2) large footprint, legacy applications that are part of the embedded telematics platform services and may be frequently available only as native (C or C++) code distributions. Examples of the first category are applications that schedule transactions and may be rapidly and frequently "swapped" by the Telematics Service Provider to enable the Gateway to respond to evolving customer requirements. Examples of applications in the second category are speech recognition, media player, navigation applications and other services that are compute intensive or require particularly fine control over large memory allocations. Support of either of these applications often requires device drivers, networking stacks, and networking profiles for Bluetooth and IEEE-802.11 wireless LAN interfaces that are implemented in native code.

There are multiple approaches for providing interfaces between the Java telematics applications and native platform services. The most commonly proposed approach depends on Java Native Interface (JNI) implementations with proprietary APIs. FIG. 5 is a block diagram of Java applications communicating via JNIs as known in the art.

This architecture illustrates the conventional method for communication between the telematics applications and both the Java JRE and native code applications. It is clear that a special API implemented with the Java Native Interface must be introduced because the proprietary APIs are an extension of the Java standard and limit portability of Java applications. In addition, separate validation steps are required for the integration of Java and native code via this conventional method.

BRIEF DESCRIPTION OF THE FIGURES

FIG. 13A is a block diagram showing control of independent user interface devices using a gateway including the platform software architecture of an embodiment.

FIG. 13B is a block diagram showing access to and control of combinations of CUI physical resources by a gateway using the platform software architecture of an embodiment.

FIG. 21 is a block diagram showing the interactions among the UAX and UAC when handling an application request, under the platform software architecture of an embodiment.

FIG. 22 is a table of Time Window examples, under an embodiment.

Figure 1:
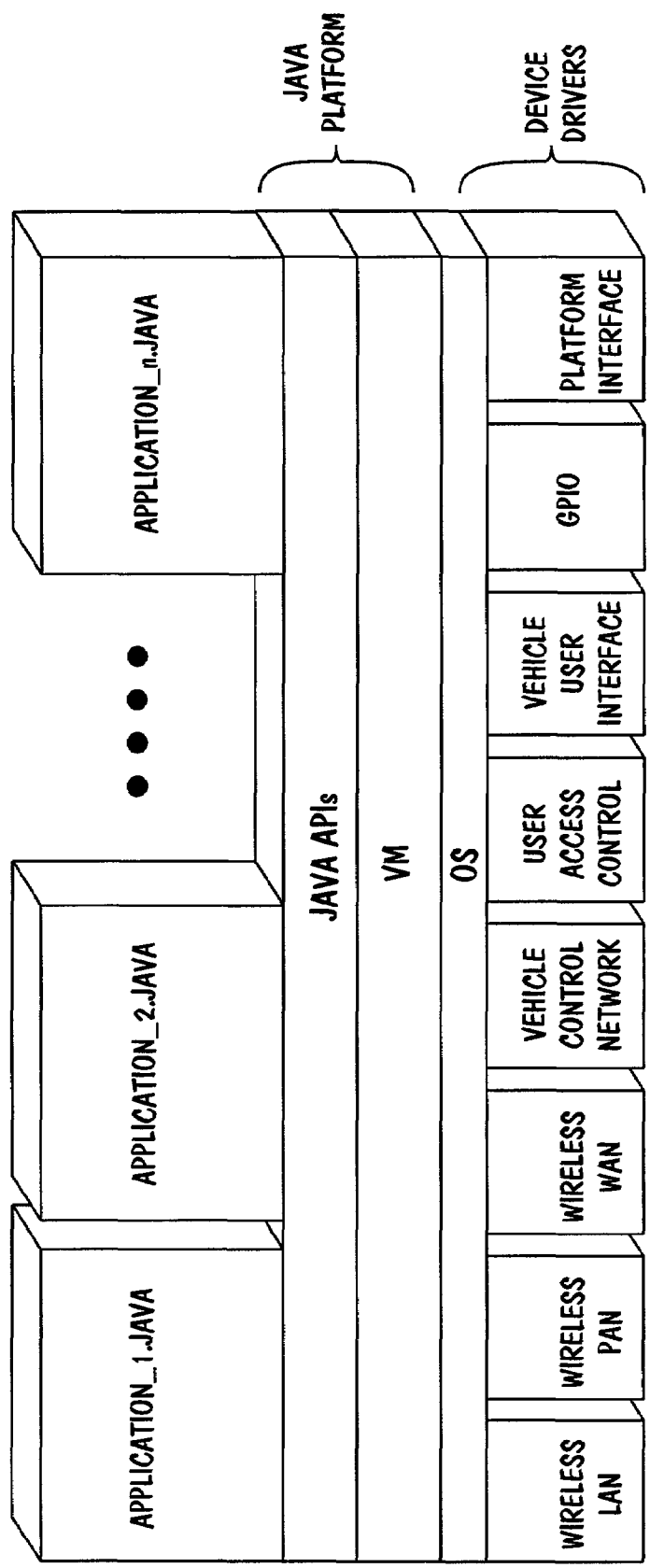
FIG. 1 is a platform Java Runtime Environment (JRE) known in the art as it would be hosted on an operating system.
Figure 2:
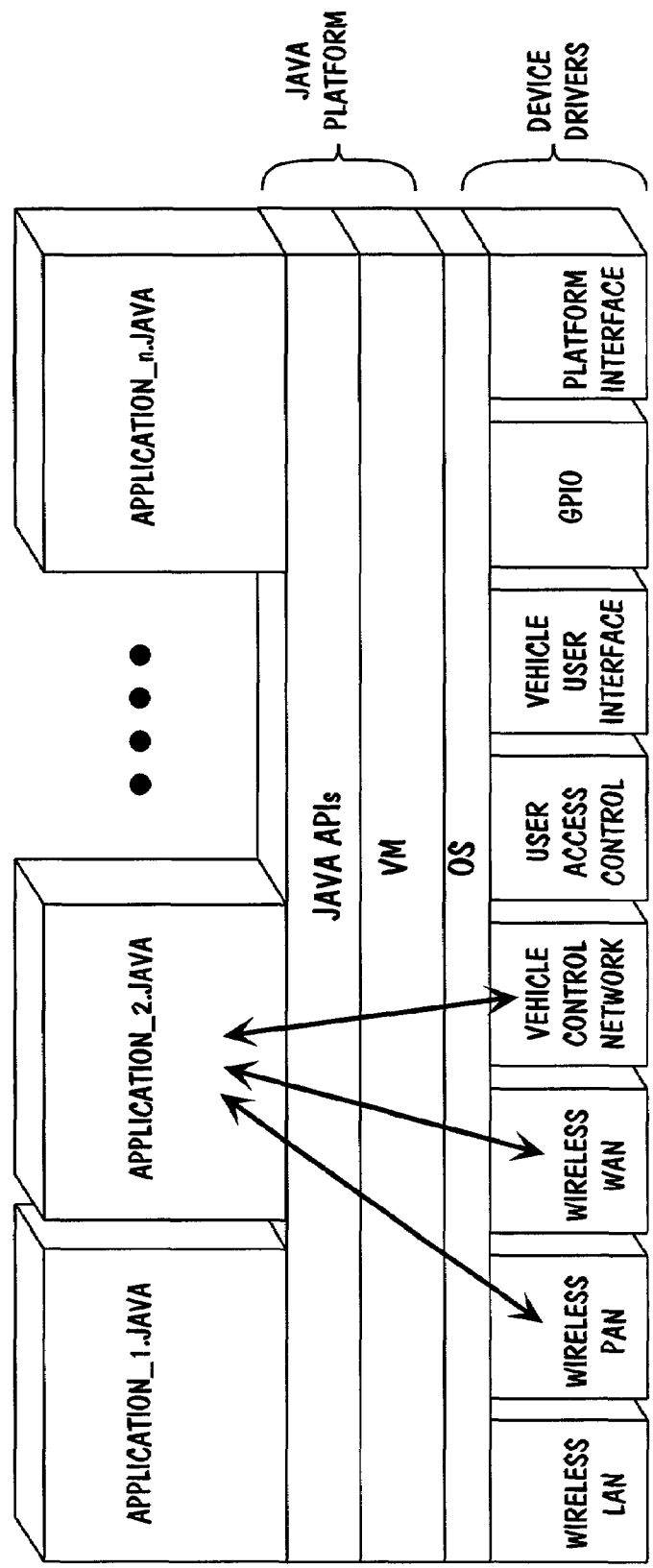
FIG. 2 shows a JRE implementation known in the art in a situation where an application has access to wireless network drivers as well as vehicle control drivers.
Figure 3:
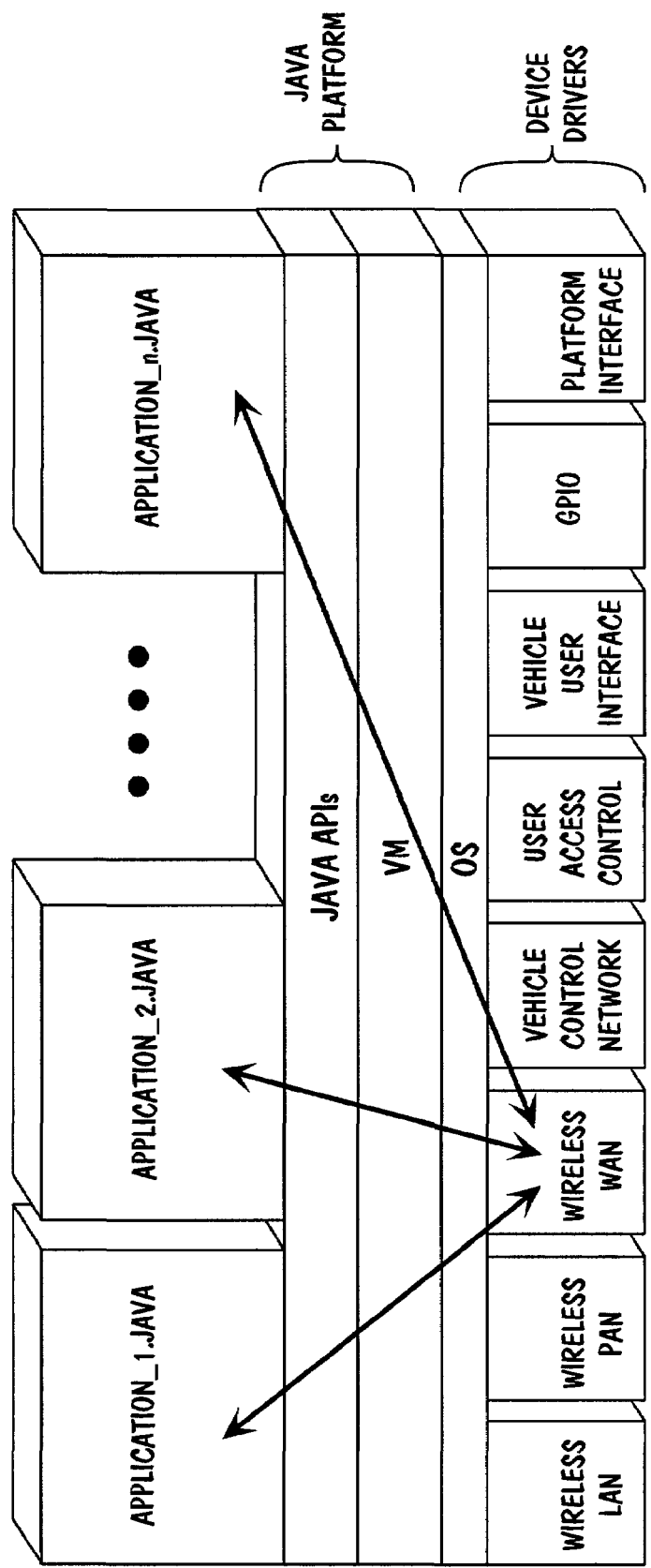
FIG. 3 shows the shared access problem of platforms known in the art with an instance where multiple applications all have access to the cellular wireless network device driver.
Figure 4:
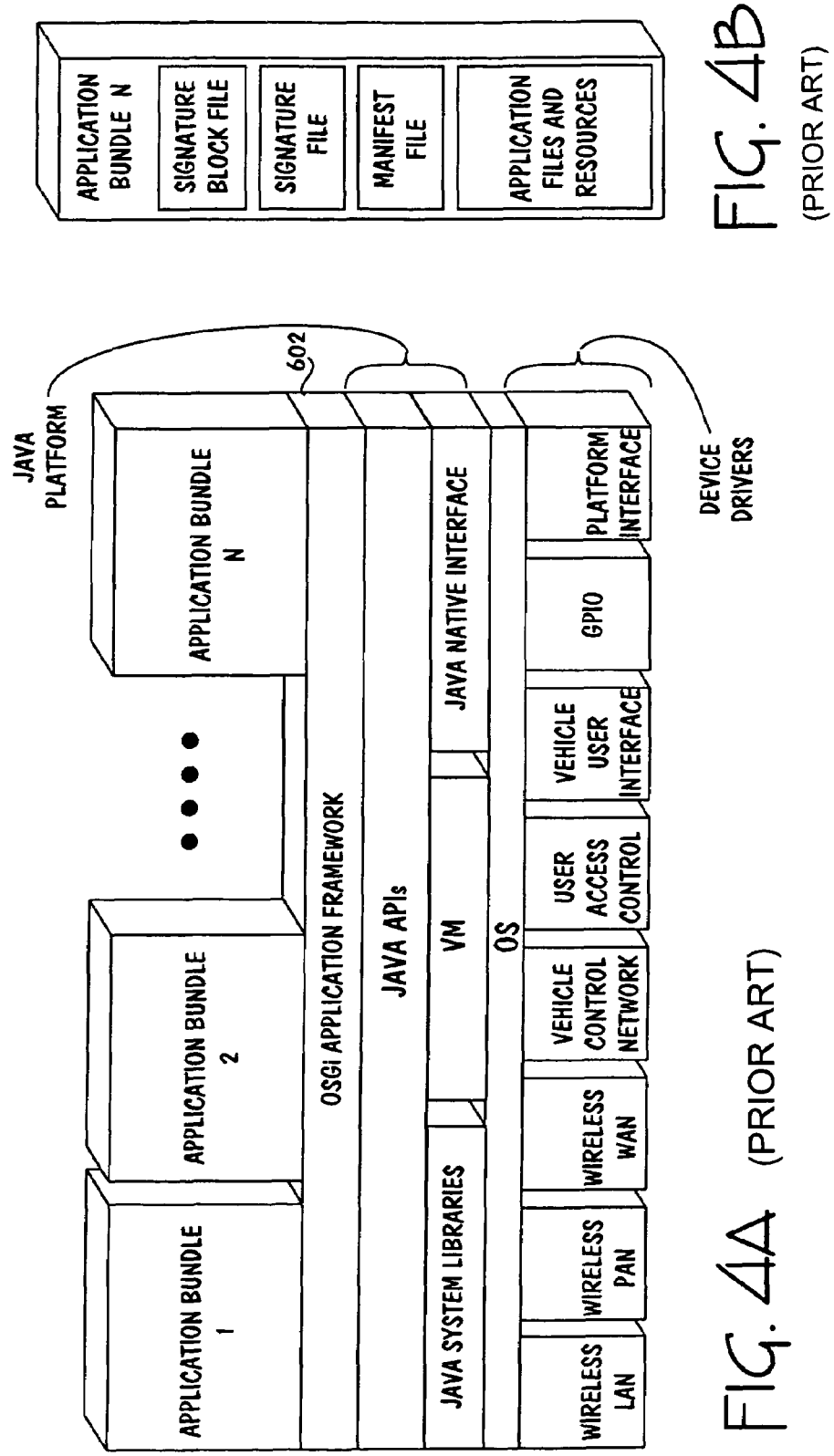
FIG. 4A shows the OSGi architecture known in the art, including the Java platform architecture.
FIG. 4B is a block diagram of a signed application bundle known in the art.
Figure 5:
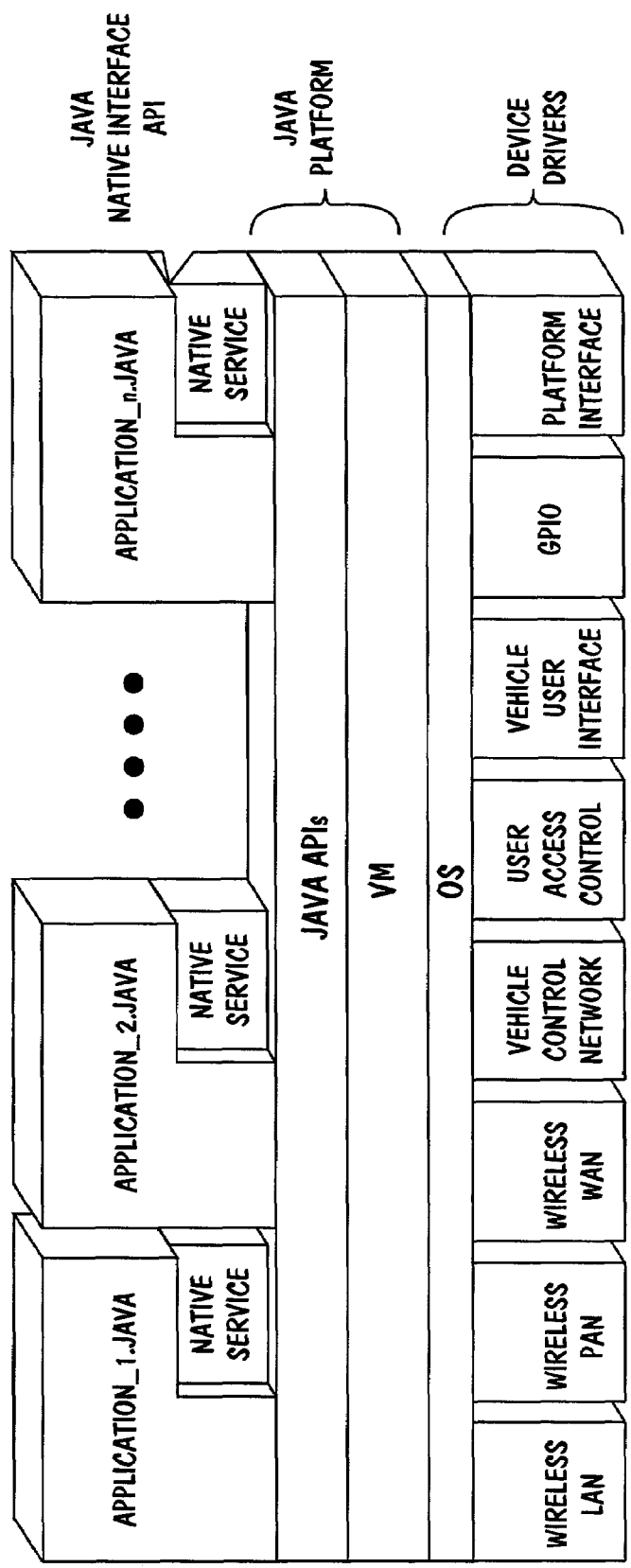
FIG. 5 is a block diagram of Java applications communicating via JNIs as known in the art.

In the drawings, the same reference numbers identify identical or substantially similar elements or acts. To easily identify the discussion of any particular element or act, the most significant digit or digits in a reference number refer to the Figure number in which that element is first introduced (e.g., element 1012 is first introduced and discussed with respect to FIG. 10).

Figure numbers followed by the letters "A," "B," "C," etc. indicate either (1) that two or more Figures together form a complete Figure (e.g., FIGS. 10A and 10B together form a single, complete FIG. 10), but are split between two or more Figures because of paper size restrictions, amount of viewable area within a computer screen window, etc., or (2) that two or more Figures represent alternative embodiments or methods under aspects of the invention.

The headings provided herein are for convenience only and do not necessarily affect the scope or meaning of the claimed invention.

DETAILED DESCRIPTION

A telematics platform and corresponding platform software architecture, collectively referred to herein as a telematics system, is described below that supports the design of software in systems that handle numerous requests for access to physical resources such as communications devices, user interfaces, sensors, and/or actuators. This platform and software architecture provides for maximal use of standard operating systems, device drivers, and means for exchanging software applications, while supporting secure shared access to devices and transactional cost accounting. The platform software architecture supports for example Java and OSGi standards directly and eliminates the need for non-standard and proprietary extensions. The software architecture provides each Java application assured secure network access, network and resource sharing, network access accounting, and shared secure access to system interfaces (e.g., those within a vehicle). This is accomplished without introducing a proprietary API that would limit application portability and increase validation overhead.

The software architecture described below allows the use of standard device drivers, operating systems, virtual machines, and portable software frameworks such as Java/OSGi without modification, for applications in which numerous devices or entities request access to a common set of resources, for example telematics applications. The software architecture provides user-space driver support so it appears to the application developer that the device drivers have been modified for such purposes as managing access or logging costs for their access. However, the architecture of an embodiment supports conventional device drivers without modification because actually changing the device drivers for these purposes has many practical disadvantages, such as lack of access to many system resources and the difficulty of maintaining state for code within the kernel.

The software architecture of an embodiment uses the framework for user-space devices (FUSD), as described in detail below, to program functions as applications together with a special driver or driver interface that acts as a proxy for the application at the device level. In this way the FUSD provides access to all drivers and most system resources, and can make use of the security and communications features already built into or onto a standard operating system such as Linux. In this manner, one or more software-exchange mechanisms can be layered on top of the operating system as the mechanisms become available, without the need for any modifications or extensions to the mechanisms in order to enable access to the devices. Moreover, the software architecture permits secure distribution of applications and key management software across multiple platforms, enabling convenient upgrades of both hardware and software, management of network access by communications and computer peripherals, and cost-accounted and secure interactions among local networks. For example, the software architecture supports personal and handheld computers and their associated networks of peripherals, industrial or home automation, security networks, and vehicular systems, for example.

The descriptions and examples below are presented in the context of an automotive telematics system; however, the platform and corresponding software architecture encompass a wider set of applications and standards. Telematics services involve the transfer and processing of information to and from systems that interface to the physical world, such as sensors, actuators, and user interfaces. Such services may take place on a local scale, including for example control networks, or on a global scale, including for example provision of data from a remote repository to a user on an automobile.

The following description provides specific details for a thorough understanding of, and enabling description for, embodiments of the invention. However, one skilled in the art will understand that the invention may be practiced without these details. In other instances, well known structures and functions have not been shown or described in detail to avoid unnecessarily obscuring the description of the embodiments of the invention.

Unless described otherwise herein, components of the embodiments described herein and depicted in the Figures are described in detail in the above-noted and cross-referenced provisional patent application. Indeed, much of the detailed description provided herein is explicitly disclosed in the provisional patent application; most or all of the additional material of aspects of the invention will be recognized by those skilled in the relevant art as being inherent in the detailed description provided in such provisional patent application. Those skilled in the relevant art can implement aspects of the invention based on the detailed description provided in the provisional patent application.

Interfaces for Support of Java and OSGi Standards

Applications supported by an operating system (OS), running within a typical platform architecture, gain access to device drivers via a system call interface. The device drivers may include wireless cellular network ports, vehicle device network ports, and others. The system call interface accesses a virtual file system (VFS), memory manager, process manager, network services, and ultimately the corresponding device drivers. This architecture is used by applications including those supported by a JVM, itself supported by the OS.

Under the POSIX standard the interface to devices is via device files. This device file system provides an input/output (I/O) interface for both character-based and block device drivers from the application via the VFS. Standard POSIX read( ) and write( ) and system calls provide access to the device while the POSIX ioctl( ) system call may provide a channel for configuration parameters to be passed to the device. The driver in these prior art systems is hosted in the operating system kernel space or protected memory, while the device file interface is available to applications in protected user-space.

Figure 6:
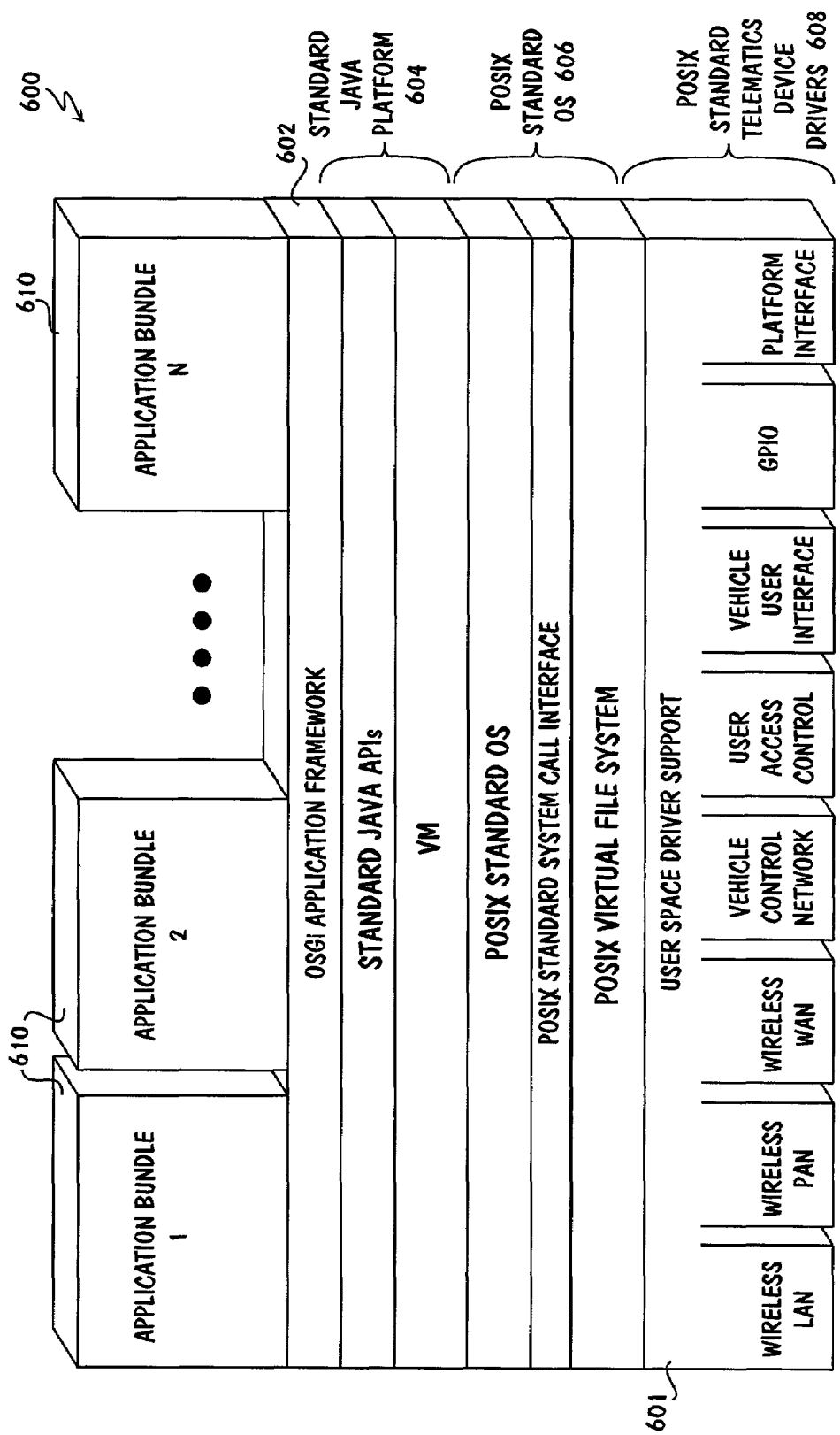
FIG. 6 is a block diagram of a platform software architecture incorporating a language-independent open user-space device driver interface, also referred to herein as a device driver interface or driver interface or management suite, under an embodiment.

FIG. 6 is a block diagram of a platform software architecture 600 incorporating a language-independent open user-space device driver interface 601, also referred to herein as a device driver interface or driver interface or management suite, under an embodiment. This architecture 600 supports the OSGi framework 602 and Java platform 604 with the operating system. This platform architecture 600 further supports direct access by the applications 610 to all of the security, resource management, sharing, accounting, and other host platform functions via the open interface 601. As a result, portable applications have direct access to the device driver interface 601, as described in detail below, and the need for proprietary APIs is eliminated. In contrast to architectures known in the art, the device driver interface 601 makes platform services and functions available via POSIX standard device file interfaces 606 to POSIX standard device drivers 608.

The platform software architecture 600 of an embodiment enables the OSGi framework 602 to meet telematic system requirements using POSIX standard device drivers 608, without modification of the specification, because the user-space device driver becomes the site where telematics-specific functions appear to be hosted and are presented to applications 610. This ensures portability, security, and robust operation. This is in contrast to other methods for supporting telematics requirements including proposals for proprietary extensions to the OSGi specification or complex solutions for extending Java capabilities.

The device driver interfaces 601 include features that are significant enhancements over conventional device drivers. For example, the complete set of embedded services hosted on the telematics platform are available to the applications via the device driver interface. In particular, this includes access to the file system, network ports, and memory management. This also includes speech, media player, and navigation services. Thus, as for networking ports, applications now have language-independent interfaces to legacy applications.

In contrast, conventional device drivers are hosted entirely within the operating system kernel. Thus, as residents of the kernel, device drivers are not able to access the file system, network ports, and memory management in the standard fashion. Indeed, as a result of these restrictions, device drivers may generally be stateless.

The device driver interfaces carry additional features compared to conventional kernel-space drivers. For example, a wireless network port may convey PPP packets, just as for a conventional port; however, in telematics applications this port may have to account for the cost of bit transmission for all applications that access the port. Also this wireless network port may need to authenticate the calling application and ensure that the communication in question is conveyed over a secure socket layer (SSL) channel. With the software architecture of an embodiment the device driver interface has the capability to directly access the resources in user-space to identify calling applications, maintain accounting state, and consult security and accounting policies in the telematics device registry. Device drivers resident in the kernel, as described above, are not able to directly access these resources.

The enhanced functionality of the device driver interfaces places demands on device driver architecture. The interfaces described below in detail are implemented with user-space components that offer access to managed persistent storage, security and permissions policy registries, and file systems.

Interfaces for OSGi Security and Resource Management

The platform software architecture of an embodiment enables resource consumption management and security for multiple Java applications. Also, the inherent limitations of OSGi may be directly solved. Both of these advances are achieved without the need to extend Java and OSGi specifications, as described below. Three classes of Java OSGi Service Bundles are considered including Application Bundles, Core Service Bundles, and Management Bundles. Application Bundles contain verified and authenticated applications to be provisioned to gateways via the OSGi. Service and Management Bundles are standard open services that support Applications.

Figure 7:
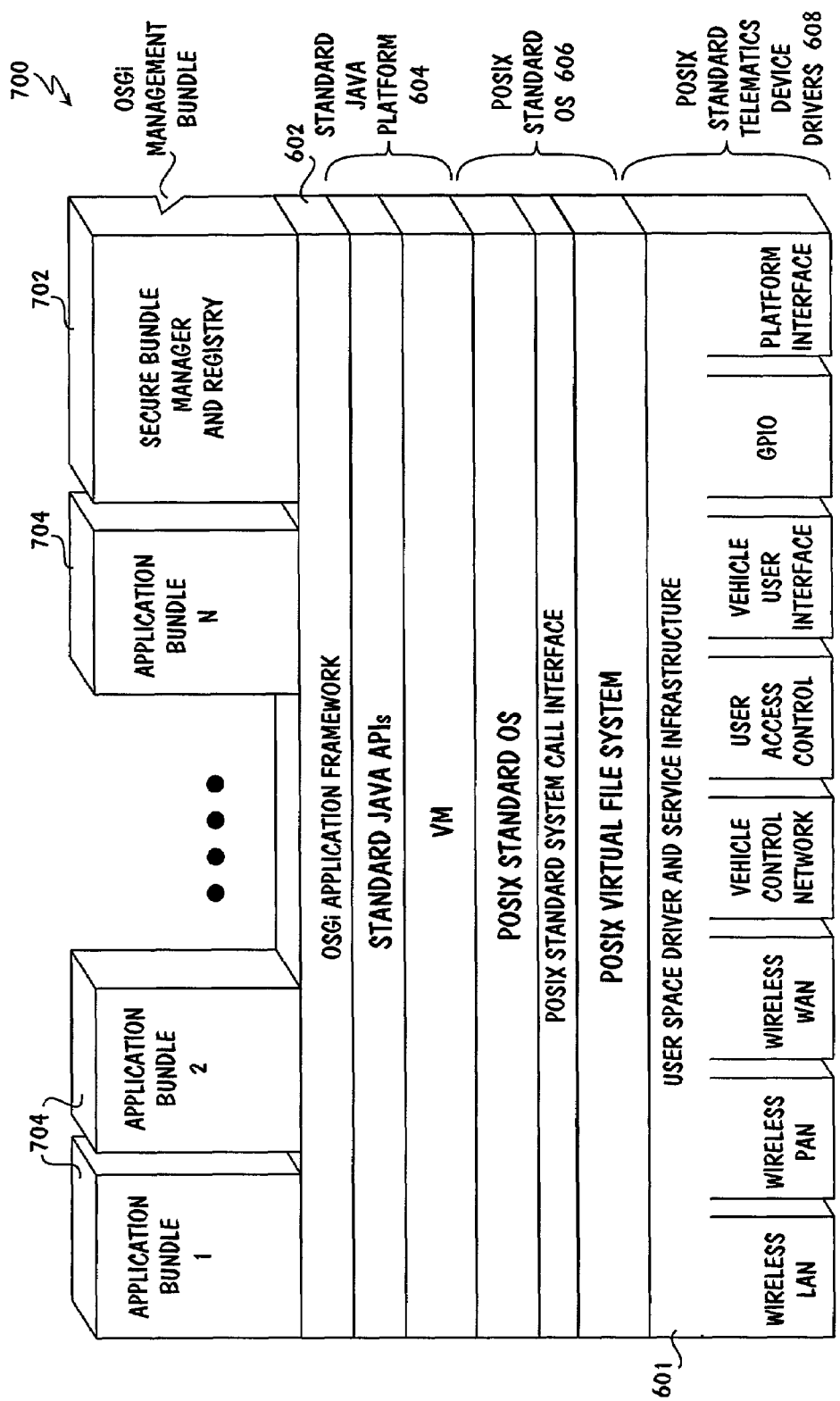
FIG. 7 is a block diagram of a platform software architecture including the device driver interface supporting OSGi Service Bundles, under an embodiment.

FIG. 7 is a block diagram of a platform software architecture 700 including the device driver interface 601 supporting OSGi Service Bundles 704, under an embodiment. As described herein, the application environment is supported by POSIX standard device file interfaces 606 to POSIX standard user-space device drivers 608. Further, the standard Java platform 604 including the Java Runtime Environment and corresponding APIs is supported. The OSGi services 704 operate in this platform architecture as an unmodified standard since the OSGi limitations have been removed by use of the user-space device driver interfaces.

The OSGi Application Service Bundles 704 of an embodiment access the OSGi Management Bundle 702. This Management Bundle 702, in turn, accesses device and network resources via the device driver interfaces 601 that are exposed via the POSIX device file drivers 608, as described herein.

Support for telematics applications under the OSGi begins with installation of the Application Service Bundles 704, which are not directly granted any permissions. This prevents unattended access to private network ports or data by applications not carrying appropriate permissions. However, the Management and Registry Bundle 702, a trusted bundle provided by the TSP or other trusted party, is also installed and will be assigned permissions to OS service accessible via the Java system libraries and JNI. This includes the device file interfaces. The Management and Registry Bundle 702 in an embodiment exploits the Java 2 security framework to prevent Application Service Bundles 704 from gaining unregulated access to its member files and classes. Consequently, for Application Service Bundles 704, access to resources is only possible via the Management and Registry Bundle 702. Finally, the open, standard Management and Registry Bundle 702 accesses system resources via the device driver interface 601.

Regarding Application Service Bundle security, access to platform resources such as GPS location devices, J-1850 vehicle ports, and cellular wireless ports is controlled by the device driver corresponding to the device file interface that represents the particular resource. Access control decisions are made based on a set of permissions granted to a particular application identification (ID). The application ID is included with the Application Service Bundle 704. The Secure Management and Registry Bundle 702 exports methods for access by other Application Service Bundles 704. The Secure Management and Registry Bundle 702 multiplexes requests from applications and transfers the application ID via a standard system call. The Secure Management and Registry Bundle 702 abstracts the resources in consideration and determines the application ID. Access decisions are delegated to the user-space interface that operates in parallel with a large persistent storage increase.

The application ID for a particular Application Service Bundle 704 is included in the signed jar file before it is transferred to the embedded platform. The Secure Management and Registry Bundle 702 verifies the integrity of the jar file including the application ID. The Secure Management and Registry Bundle 702 then loads and starts Application Bundles 704 and records unique Bundle application IDs and makes them accessible to other Bundles for future reference. Whenever the Application Bundle 704 executes a system call to one of the exported methods of the Management Service, it also supplies its Bundle application ID, therefore allowing the Bundle Management service to retrieve the corresponding application ID.

An important feature of the user-space interface and the Secure Management and Registry Bundle is resource management for Java and OSGi platforms, and other frameworks for portability of applications. Multiple Java applications appear as groups of threads running on the VM. The standard Java VM Profiler Interface provides thread specific CPU cycle, Java stack and Java heap. Process management, as described below, is fully enabled in the platform without the requirement to modify the OSGi.

Framework for User-Space Devices (FUSD)

The open interface of the platform software architecture of an embodiment makes it appear to the application developer that increased functionality has been provided at the level of the accessed device drivers. This enables access from applications via the standard POSIX VFS. While actually adding the needed functionality within the system kernel (device driver level) presents many practical difficulties, the FUSD architecture described below in the context of both single platform systems and distributed systems provides access to the system drivers and resources. In this manner, one or more software-exchange mechanisms can be layered on top of the operating system without the need for any modifications or extensions to these mechanisms to enable access to the devices.

Figure 8:
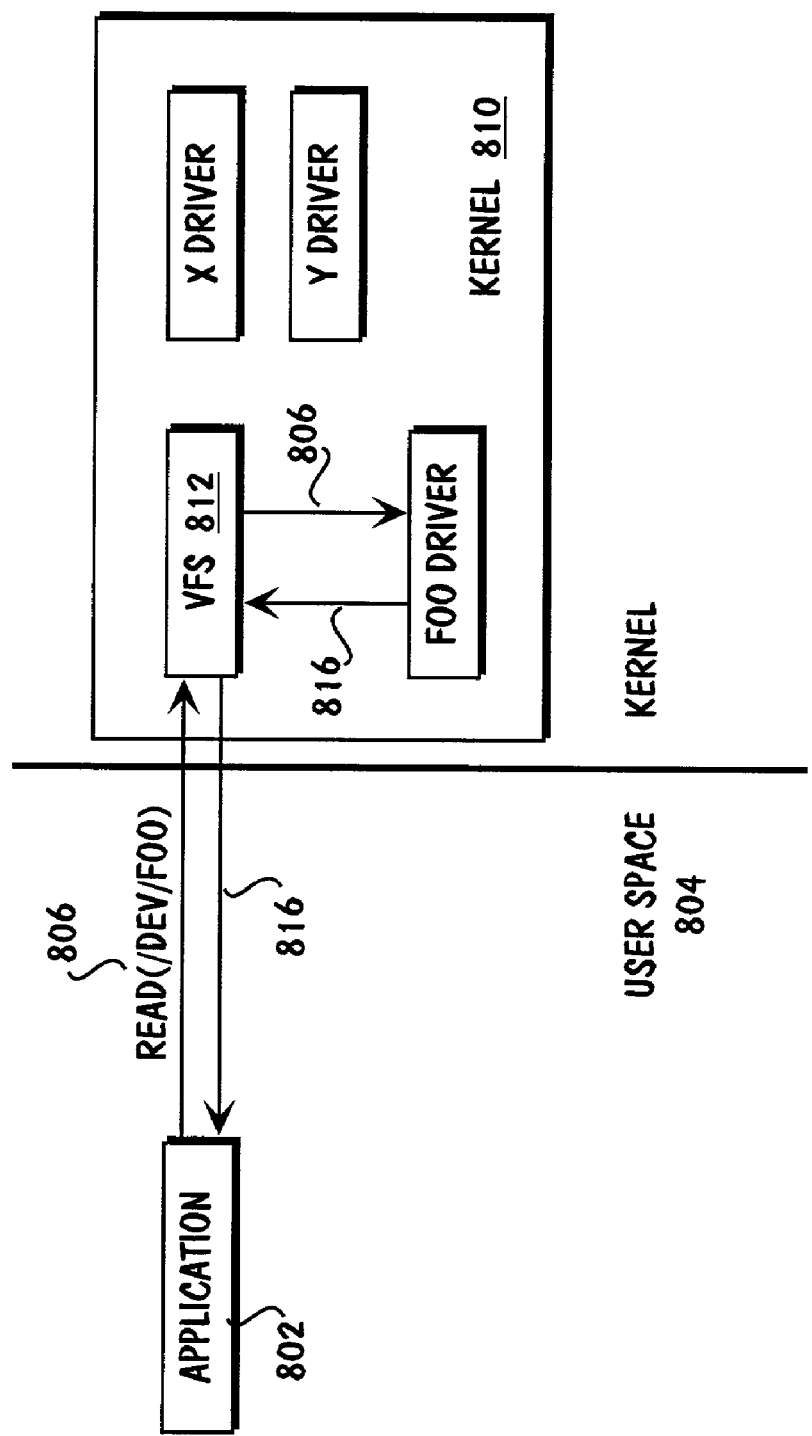
FIG. 8 is an example known in the art in which an application residing in user-space issues a command to read from device residing in kernel space.

In typical device drivers there is a layer of indirection between applications (such as read or write) and devices (such as I/O ports). This layer of indirection is needed because there must be some point of synchronization between processes competing for serial resources. Typically, this is managed with "trusted" (verified, stable) code that runs in kernel space and which has direct access to hardware, memory, and other system resources. Consider the example known in the art shown in FIG. 8 in which an application 802 residing in user-space 804 issues a command 806 to read from device "foo" which resides in kernel space 810. The command propagates through the VFS 812 to the foo driver 814, which responds 816 to the VFS 812, and in turn propagates data 816 back up to the application 802.

Unfortunately, device drivers residing in the kernel cannot access most user-space services such as files, the outside world (e.g., serial ports, network interfaces), or user-space libraries, and are unable to block or run for long periods of time. Moreover, typically it is very difficult to write and debug code that must run in the kernel. The FUSD architecture of an embodiment avoids these difficulties by fusing the kernel and user space.

The FUSD architecture, including a kernel module and a cooperating user-space library, is a Linux framework for proxying device file callbacks into user-space, allowing device files to be implemented by daemons instead of kernel code. Despite being implemented in user-space, FUSD devices can look and act just like any other file under /dev implemented by kernel callbacks.

A user-space device driver can do many of the things that kernel drivers can not, such as perform a long-running computation, block while waiting for an event, or read files from the file system. Unlike kernel drivers, a user-space device driver can use other device drivers—that is, access the network, talk to a serial port, get interactive input from the user, pop up graphical user interface (GUI) windows, or read from disks, for example. Further, user-space drivers implemented using FUSD can be much easier to debug. Also, it is impossible for user-space drivers to crash the host platform, and they can be killed and restarted without rebooting even if they become corrupted. User-space drivers can also be swapped out, whereas kernel drivers lock physical memory.

The FUSD drivers are conceptually similar to kernel drivers in that they include a set of callback functions called in response to system calls made on file descriptors by user programs. The FUSDs C library provides a device registration function, similar to the kernel's devfs_register_chrdev( ) function, to create new devices. The fusd_register( ) function accepts the device name and a structure full of pointers. Those pointers are callback functions which are called in response to certain user system calls, for example, when a process tries to open, close, read from, or write to the device file. The callback functions should conform to the standard definitions of POSIX system call behavior. In many ways, the user-space FUSD callback functions are identical to their kernel counterparts.

The proxying of kernel system calls that makes possible this kind of program is implemented by FUSD, using a combination of a kernel module and cooperating user-space library. The kernel module implements a character device, /dev/fusd, which is used as a control channel between the kernel module and the user-space library. The fusd_register( ) function uses this channel to send a message to the FUSD kernel module, telling the name of the device the user wants to register. The kernel module, in turn, registers that device with the kernel proper using devfs. The devfs and the kernel do not know anything unusual is happening; it appears from their point of view that the registered devices are simply being implemented by the FUSD module.

When the kernel subsequently makes a callback due to a system call (e.g., when the character device file is opened or read), the FUSD kernel module callback blocks the calling process, marshals the arguments of the callback into a message and sends it to user-space. Once there, the FUSD user-space library unmarshals it and calls whatever user-space callback the FUSD driver passed to the fusd_register( ) function.

When the user-space callback returns a value, the process happens in reverse, wherein the return value and its side-effects are marshaled by the library and sent to the kernel. The FUSD kernel module unmarshals this message, matches it up with a corresponding outstanding request, and completes the system call. The calling process is completely unaware of this trickery; it simply enters the kernel once, blocks, unblocks, and returns from the system call, just as it would for any other blocking call.

Figure 9:
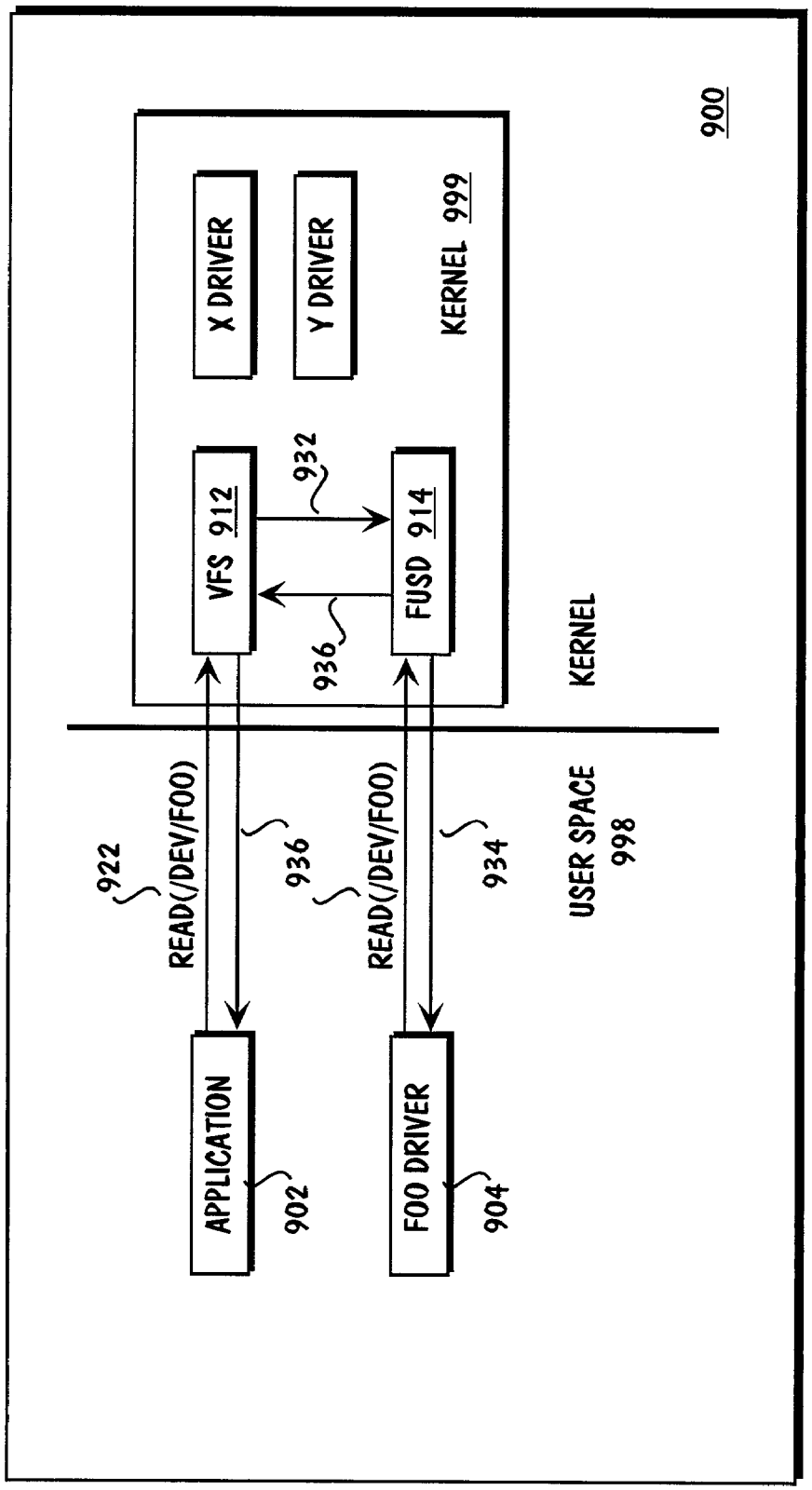
FIG. 9 is an example of a system call of a processing platform using the FUSD architecture, under an embodiment.

FIG. 9 is an example of a system call of a processing platform 900 using the FUSD architecture, under an embodiment. The processing platform 900 may, for example, be a telematics platform or gateway, but is not so limited. The application 902 in user space 998 reads 922 from dev/foo, but now the VFS 912 calls 932 the FUSD module's 914 read callback. The FUSD module 914, or redirection module, resides in kernel space 999 and serves mainly to redirect calls 934 to drivers 904 residing in user space 998, which may for example be written in C, Java, or other standard programming languages. Further, because the driver 998 resides in user space it has access to all the user-space resources. The FUSD module 914 calls 934 the foo driver 904 callback, and the response 936 propagates back to the original calling application.

The semantics of the return variables under the FUSD architecture are exactly the same as if the foo driver 904 were in the kernel space 999. However, now it is possible to include a much broader set of functions in the driver 904, which can access user-space resources as well as make calls to drivers within the kernel space 999 such as, for example, the X and Y drivers.

Alternative means known in the art for enabling access to extra system resources include both daemons listening on sockets, and libraries. The daemons are less convenient in that special programs are needed for access. Moreover, sockets do not provide access to important metadata such as user identity (UID), GID, PID and the like, making implementation of authentication and other security features more intricate. Libraries do not resolve the problem of synchronizing between multiple processes, for example, in determining who can be listening to the serial port. By contrast, with the FUSD architecture it is much more straightforward to implement functions in user space to control access from the various applications to particular ports, for such purposes as synchronization, cost accounting, application priority, and security, to name a few.

It is noted that the general notion of placing some device driver functions in system space is described, for example in the QNX operating system, using the terminology of front end device drivers. However, these systems require the use of proprietary operating systems, with the consequent difficulties of ensuring that a sufficient number of device drivers, middleware, and communication stacks will be available for supporting a wide application set. By contrast, the FUSD architecture can apply to a variety of standard operating systems, with minimal changes to the kernel.

A description is provided below of a number of services enabled by the FUSD architecture that are particularly valuable when shared resources are potentially accessed by multiple applications or users. These services include, but are not limited to, the control of external communications devices, the control of user interface devices, the control of other network resources, policy and service registry, and security methods and distributed operation, all of which are described in detail below.

Control of External Communications Devices

Control of access to peripherals or other external resources is effected in an embodiment using a combination of the FUSD architecture along with a set of resource managers residing in user space. This accommodates multiple applications which make competing resource access requests with differing levels of priority, security, and/or cost.

Figure 10:
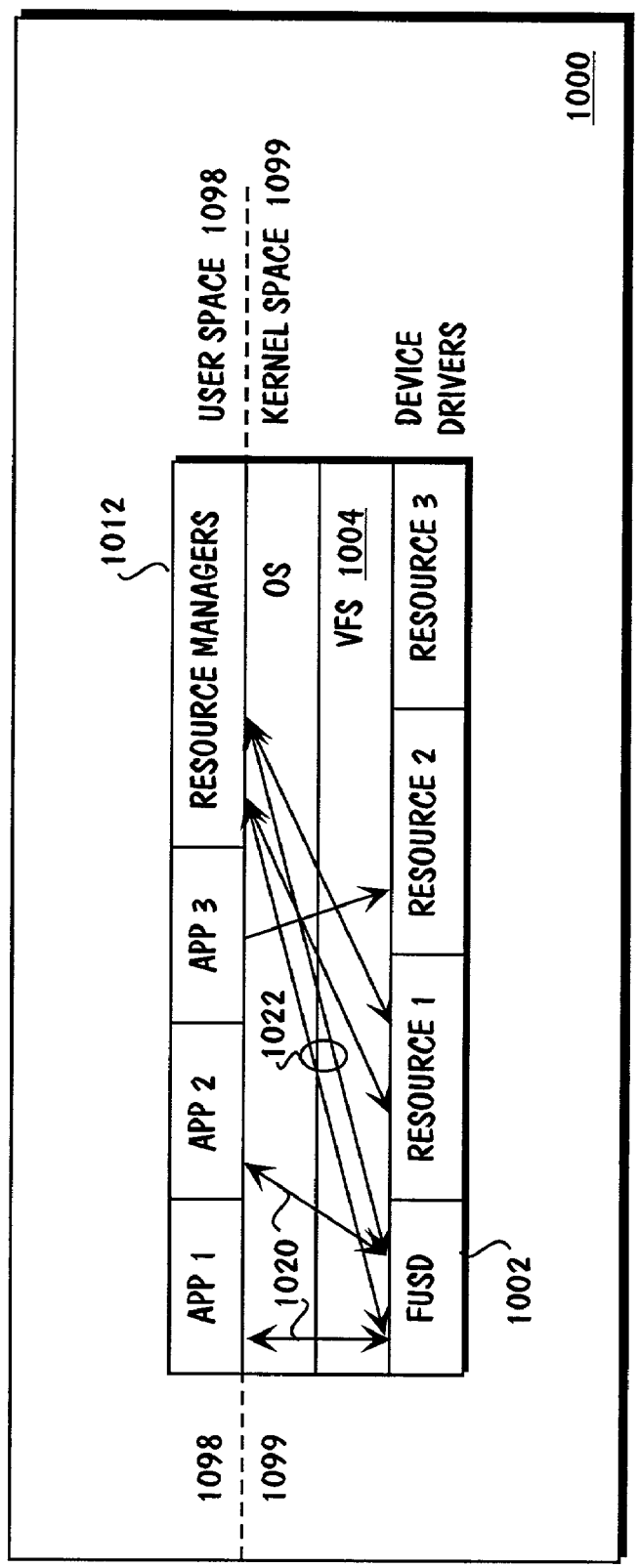
FIG. 10 is a block diagram showing the management of contention for shared resources on a processing platform including the platform architecture of an embodiment.
Figure 11:
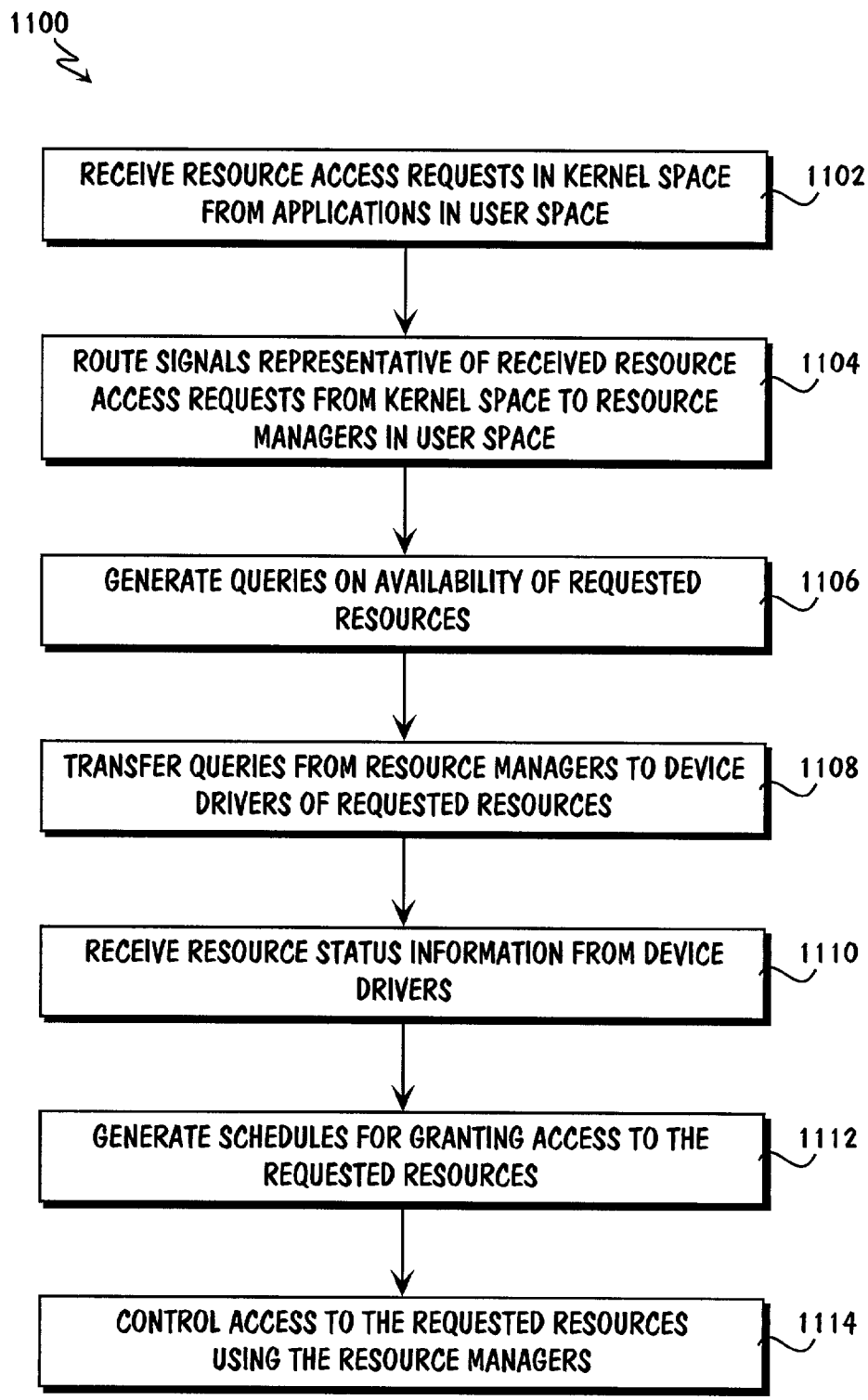
FIG. 11 is a flow diagram of a general method for performing shared resource access management, under an embodiment.

FIG. 10 is a block diagram showing the management of contention for shared resources on a processing platform 1000 including the platform architecture of an embodiment. FIG. 11 is a flow diagram of a general method for performing shared resource access management, under an embodiment. In this example there are a set of applications App 1, App 2, App 3 some of which may be native code and others of which might have been downloaded to the platform after deployment, e.g., as Java applets. Applications 1 and 2 want access to Resource 1, but have different priorities and quality of service requirements. The standard device driver calls 1020 from App 1 and App 2 go to the FUSD module 1002, or redirection module, in kernel space 1099 via the VFS 1004. The FUSD module 1002 then communicates 1022 with the resource managers 1012. The resource managers 1012 respond 1022 with a schedule that accommodates the requests, and then Apps 1 and 2 gain access to Resource 1 in the appropriate sequence. Application 3 on the other hand might be trusted code which can directly access Resource 2 without the mediation of the resource managers 1012. These management features are particularly valuable in an automotive telematics context as software may be remotely downloaded after the purchase of the vehicle, and multiple users may compete for resources such as the car speakers and the various modes of external communications.

More specifically, an outbound link exchange (OLX) and outbound link control (OLC) together may be used as resource managers 1012 in a telematics system and associated gateway to control access to cost and bandwidth sensitive resources such as cellular telephones, 802.11 radios, Bluetooth radios, or such other connections to the outside world as may exist. In the following description, the OLX and OLC are hosted on an automotive gateway, such as the Sensoria Corporation mgate, described herein. Many devices can potentially communicate with a gateway equipped with such ports, but not all of the devices are authorized for access to every port, and even for those ports for which the devices are authorized there are cost-of-use constraints to consider. Moreover, with many different applications hosted on the gateway there is contention for access to these ports that must be resolved. It is unrealistic to expect that each of the applications will negotiate this among themselves. By routing the device calls through the FUSD and back to the OLX and OLC residing in user space the appropriate device driver calls can then be made taking into account the resource issues described above. The calling application can then be informed of which resources it can actually access, and is not required to be specially configured to take into account the other applications that may request the same set of resources. Moreover, all of the driver calls use standard POSIX protocols.

Among the purposes of OLC are to enable link providers (such as an 802.11 radio) to advertise themselves to applications, to collect fees for link usage and to inform applications of link status. The OLC further enables applications to learn about available links and costs, select a link to use and arrange funding, and cause a link to be established (and pay for connection costs). The OLC may, in various embodiments, enable accounting by user identity (UID), sockets, or both UID and sockets.

In per-UID accounting, each UID has a preferred link and authorizations, and keeps a count of the number of connections. In order to keep the link running, the application makes an OLC log connection call to increment the count and start metering before using the link. Afterwards it issues a clear connection call to stop metering and to allow the link to go down. Authorization may also be cancelled, which will also stop the link.

In per-socket accounting, a socket is configured with a preferred link and authorization. Metering begins with a connect call, and ends with clear connection call. A useful byproduct of the OLC cost accounting is that applications cannot spam the link; once the amount credited to an application's account has been spent, it has no authority to use a link.

The OLX enables applications to coordinate link bring-up and share connection establishment costs. For example, through use of the OLX, applications can wait for a link to come up and use it opportunistically, cause a link to come up immediately, or request a link to come up sometime before some specified time limit. The OLX monitors and accounts for link usage for each application, thereby permitting applications to share the cost of connection establishment by supplying, for example, a delay parameter. Applications can also pay their own share of the costs for link usage according to the method by which the link is metered (per bit, packet, or fraction of minute charge). The OLX therefore provides an implicit communications channel between processes and applications. For example, another application that is unknown to a calling application can bring up a link, and the OLX responds to the calling application with notification that the calling application can start sharing the link. A simple program might for example bring up a link periodically. A waiting process can take advantage of this and dump data whenever the link comes up.

The OLX further enables the use of custom cost functions where, for example, basic functions select a link with the lowest cost per minute. However, actual billing is often much more complicated, and there are further issues of link congestion and tolerance of latency. Since the OLX resides in user-space, it is easy to create a library of cost functions that can be made available to applications. These can then be composed by the application.

One method by which cost-aware applications coordinate their access to links is through a bidding process managed by the OLX. In one embodiment, an application supplies a payment token to the OLX to be applied towards establishing a connection using a specific link. Applications can watch the bidding process and retract or modify their bids. When the total bid is at least the required connection cost, the link is established, and any remaining value is refunded. Note that in the event of failure to establish a link some of the value may be consumed. For links with per-minute charges, a buffer of n seconds is added to the connection cost so that the link does not get dropped while waiting for new access requests.

Figure 12:
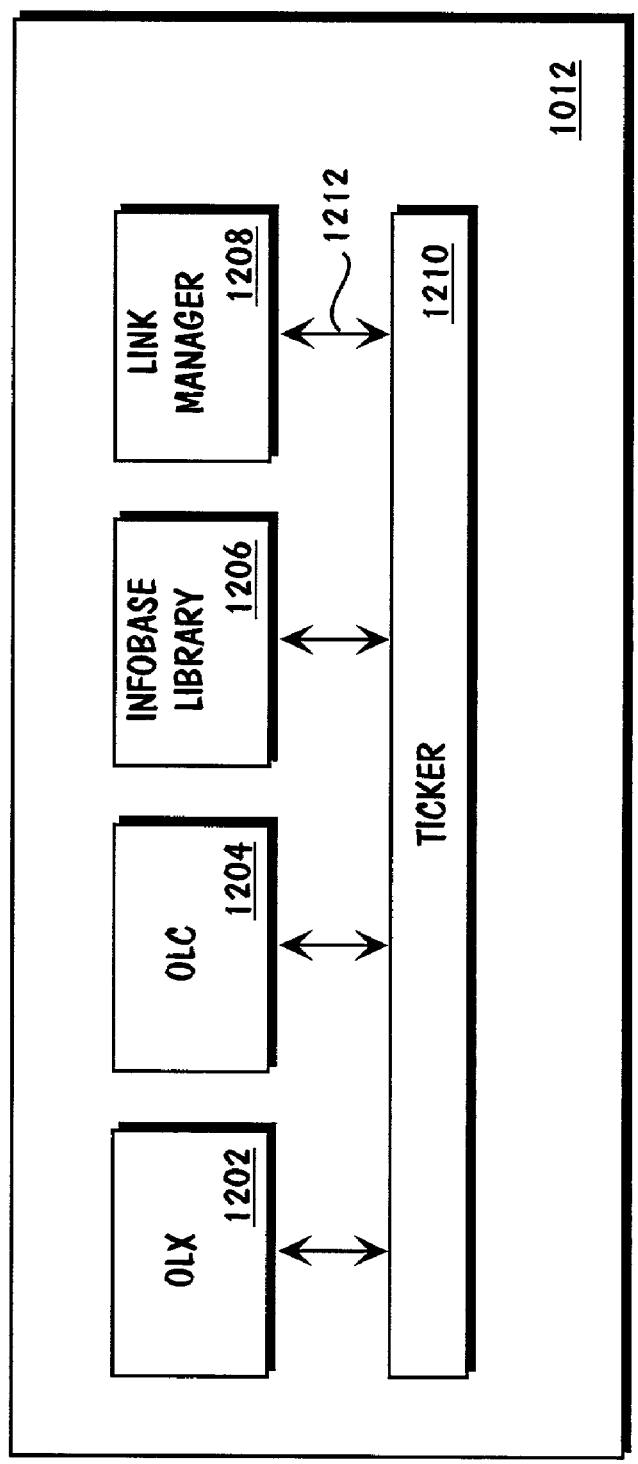
FIG. 12 is a block diagram of a resource manager that implements the full OLX/OLC interface as four separate APIs, under an alternative embodiment.

FIG. 12 is a block diagram of a resource manager 1012 that implements the full OLX/OLC interface as four separate APIs 1202–1208, one each for the OLX 1202 and OLC 1204, and one each for an infobase library 1206 and a link manager 1208, under an alternative embodiment. This modular construction results in simpler code management in that well-defined interfaces provide the interaction among the APIs 1202–1208. The infobase library 1206 and link manager 1208 are described below in detail.

The infobase library 1206 is a database of link information collected from the OLC and OLX tickers 1210, which is a message stream to which these software modules have common access. The ticker messages 1212 include, but are not limited to, messages for new link advertised, link deleted, link state changed, link cost estimate update, link performance estimate update, and link funding state (e.g., funds exhausted). The infobase library 1206 can be queried in various ways to support link selection decisions, as it maintains a searchable database organized by link. It can for example be used to keep track of bids an application has made for access to multiple links. Macros can be used to add fields to the infobase library 1206. Further, the infobase library 12006 may include other custom items for applications such as custom cost functions.

The link managers 1208 are applications that advertise links to the OLC 1204. The link managers 1208 handle such functions as indicating the availability of a link, or its non-availability, receiving requests to establish a link (with payment), and notifying the OLC 1204 of changes in link state (e.g., available bandwidth, or up/down). Thus for example, when cellular telephone or 802.11 devices become available the OLC 1204 passes an authorization to the link manager 1208 to bring up a link, and the link manager 1208 withdraws a value token. When the link comes up, the link manager 1208 notifies the OLC 1204 and monitors link usage, withdrawing a suitable value. When the value runs out, the link manager 1208 brings down the link, and notifies the OLC 1204.

Note that when using OLX and OLC resource management services there is no requirement to route all application device driver calls through the FUSD module. When using the FUSD architecture, a message is passed to the FUSD module from the calling application, and the FUSD module in turn calls the corresponding driver in user-space. The OLX and OLC functions may then be invoked, resulting in an exchange of messages with the application and the kernel-space driver for the link, so that a message can be sent or received. Multiple applications may simultaneously attempt to access the same device, with the OLX managing the shared access. However, as far as the applications are concerned, the OLX and OLC functionality as well as any other user-space driver functions all appear to be within the kernel, and may be accessed using standard means for communicating with the VFS; the FUSD module transparently proxies these services into the kernel. Further, as far as the drivers for the devices are concerned, they may also be written as if they are communicating directly with the VFS. Therefore any POSIX compatible device driver may be used. Thus, regardless of whether or not use is made of the FUSD module, there is no impact on how either drivers or applications are written, except for applications specifically to issue calls to invoke the special services for resource management that are provided by the OLX and the OLC. Thus, the applications see standard interfaces, with the OLX and OLC services merely appearing as additional parameters of the device being invoked.

Control of User Interface Devices

Communication devices are not the only resources for which multiple applications may compete. For example, cellular telephone calls and the host vehicle audio head unit may both compete for use of the host vehicle speakers, with requests for access possibly drawn from different physical interfaces such as separate sets of buttons, or speaker recognition systems. In general there will be many devices that may be used as part of the human/machine interfaces within a vehicle, referred to collectively herein as the car-user interface (CUI). As for communications devices, the FUSD architecture can be employed for access control, with the User Access Exchange (UAX) and User Access Control (UAC) performing as resource managers in analogous roles to the OLX and OLC described above. In the following examples, the software is hosted on a gateway, such as the Sensoria Corporation mGate, but the embodiment is not so limited.

In providing gateway functionality, some of the CUI elements are combined to obtain the desired behavior; others are accessed independently. FIG. 13A is a block diagram showing control of independent user interface devices using a gateway including the platform software architecture of an embodiment. In this automotive gateway example, the automotive gateway 1302 accesses 1306 an independent CUI physical resource 1304, under an embodiment. FIG. 13B is a block diagram showing access 1318 to and control of combinations of CUI physical resources 1312–1316 by a gateway 1302 using the platform software architecture of an embodiment. In either case however some resource management is required since multiple applications may compete for the physical resources represented by each CUI element.

Figure 14:
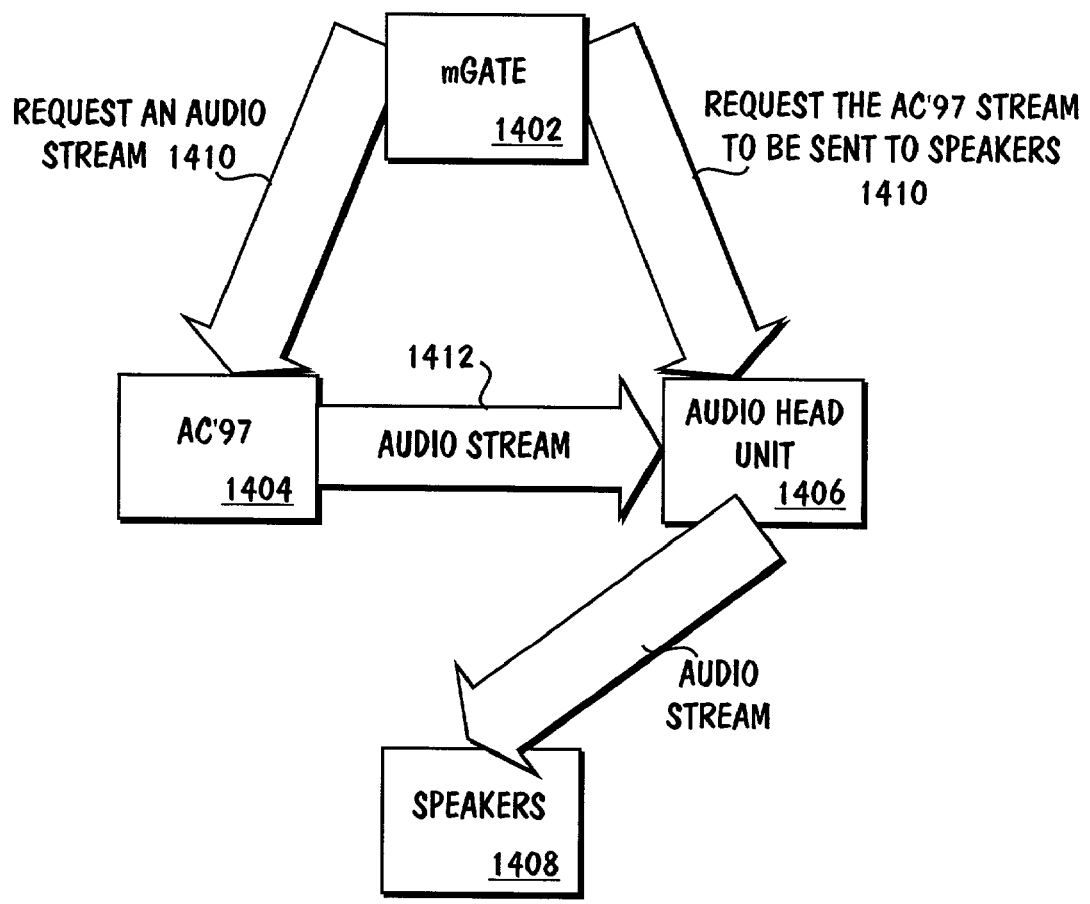
FIG. 14 is a block diagram showing access to multiple resources in order to activate audio speakers, using a gateway including the platform software architecture of an embodiment.

The CUI may include several layers of resources that are combined in order for the gateway platform to produce the desired effect. FIG. 14 is a block diagram showing access 1410 to multiple resources 1404–1406 to activate audio speakers 1408, using a gateway including the platform software architecture of an embodiment. For example, in order to output audio through speakers 1408, the gateway 1402 accesses 1410 the AC'97 sound card 1404 to request an audio stream 1412 for delivery to the audio head unit 1406. Additionally, the gateway 1402 accesses 1410 the Audio Head Unit (AHU) 1406 to request transfer of the audio stream 1412 received from the sound card 1404 to the speakers 1408. The AHU 1406 controls access to the speakers 1408 between an auxiliary input (to which the sound card output is routed), the compact disk (CD) player, and the radio.

Figure 15:
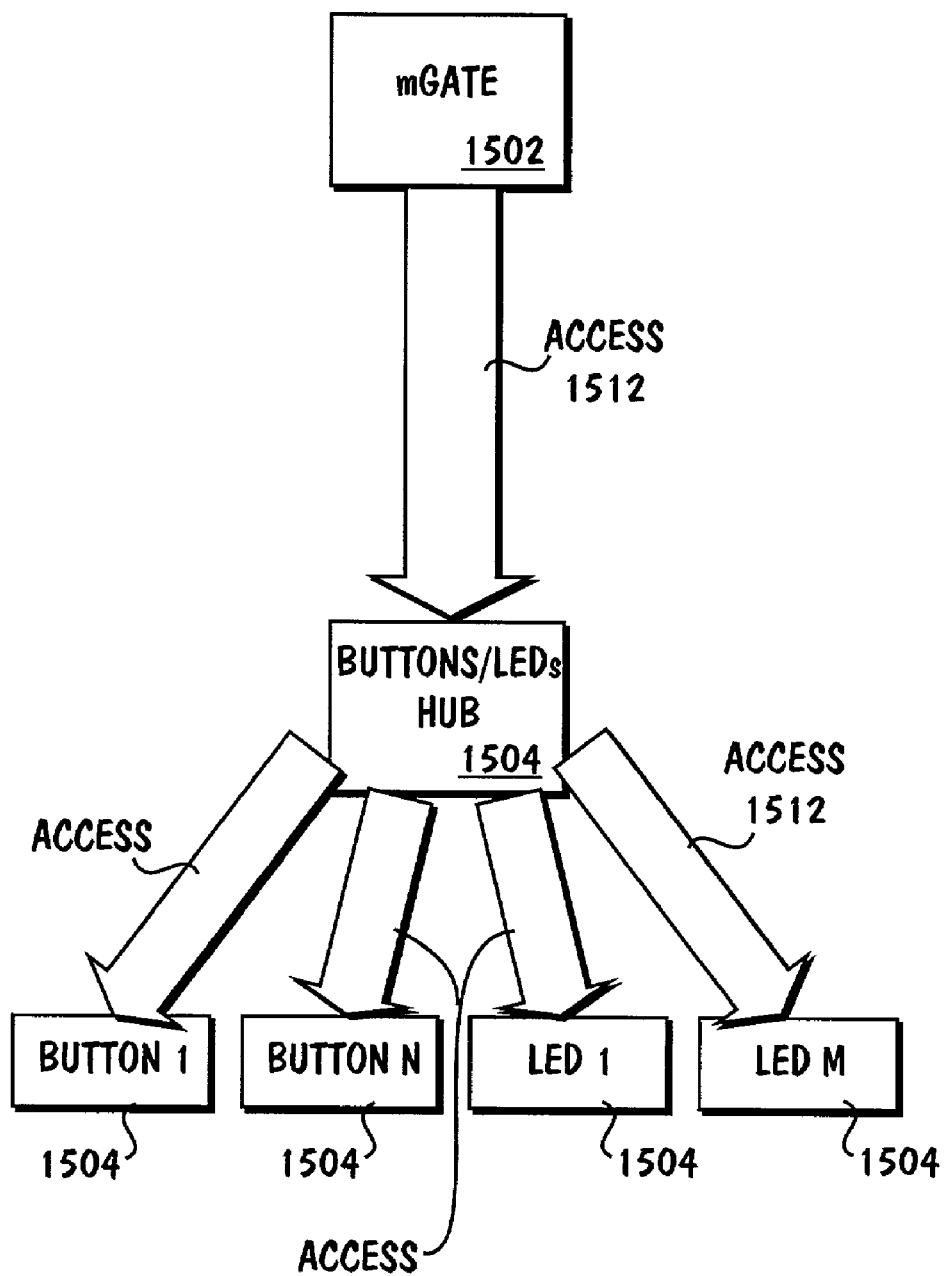
FIG. 15 is a block diagram of a gateway including the platform software architecture of an embodiment independently accessing numerous CUI components independently of other physical resources.

Car-user interface components like buttons and light-emitting diodes (LEDs) or other display devices can also be accessed independently of other resources. FIG. 15 is a block diagram of a gateway 1502 including the platform software architecture of an embodiment independently accessing 1512 numerous CUI components 1504 independently of other physical resources.

Figure 16:
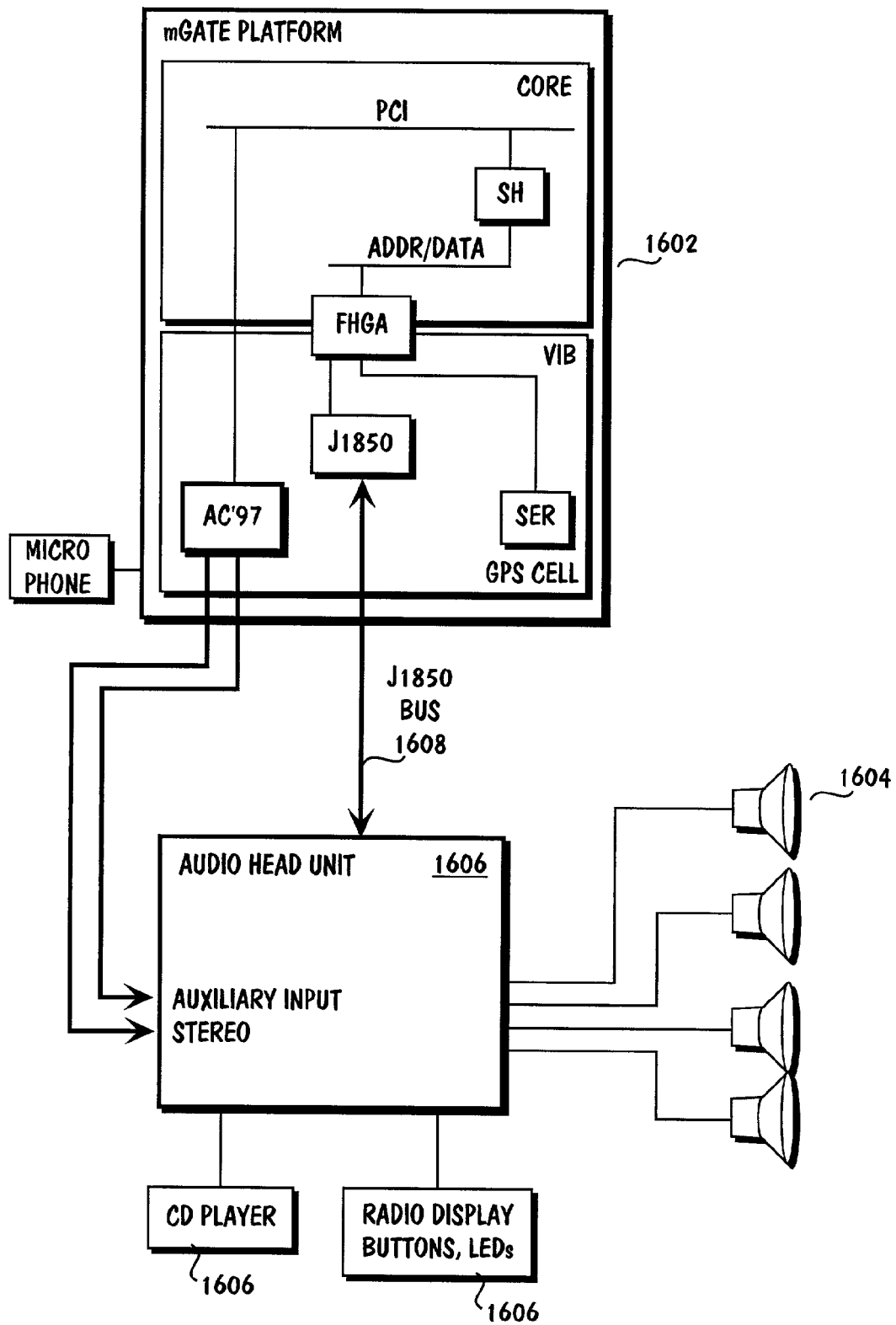
FIG. 16 is a block diagram of a gateway/audio subsystem including the platform software architecture of an embodiment accessing multiple resources to activate an audio speaker and independently accessing the radio display and buttons.

FIG. 16 is a block diagram of a gateway/audio subsystem 1602 including the platform software architecture of an embodiment accessing multiple resources to activate an audio speaker 1604.and independently accessing the radio display and buttons 1606. This configuration includes hardware of several types and software. The hardware includes the gateway 1602, the access medium 1608 (a bus, line, etc.), and the CUI resource 1606 (AHU, CD player, radio display). With reference to FIGS. 14, 15, and 16, the J1850 bus 1608 allows the gateway platform 1602 to query the audio state, and to control the audio devices 1606 (CD player, radio, tape player). Requests to redirect the auxiliary input to the speakers 1604 are made via this channel 1608.

Figure 17:
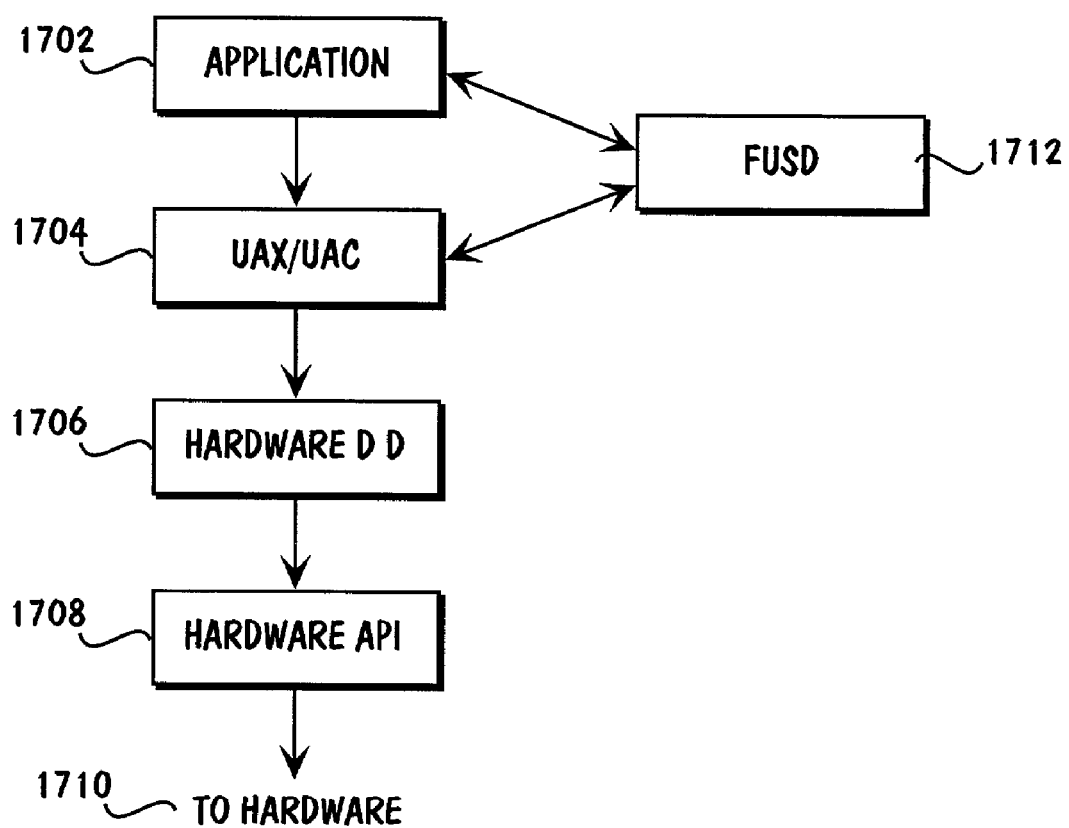
FIG. 17 is a block diagram of the communication flow among the platform components of an embodiment during physical resource control.

The gateway hosts the software components for physical resource control, as described above. FIG. 17 is a block diagram of the communication flow among the platform components of an embodiment during physical resource control. The software components include the application 1702, the UAX/UAC (resource managers) 1704, the FUSD module 1712, hardware device drivers 1706, and the hardware API 1708. The nominal flow for a resource request goes through a resource manager 1704 like the UAX/UAC, the hardware device driver 1706, and the hardware API 1708 to finally access the hardware 1710 or physical resource. As described above with reference to FIG. 13, the resource managers (UAX/UAC) 1704 of an embodiment reside in user space and mediate access to the resources 1710. The negotiations among the resource managers (UAX/UAC) 1704 and the applications 1702 pass through the FUSD module 1712.

The following descriptions provide more detail on the management of user interface devices using the platform architecture described herein. For clarity, however, the descriptions that follow omit the details of the intermediate role played by the FUSD module and present connections as if communications go directly between applications and managers, but this is implicit in the various abstractions described.

Figure 18:
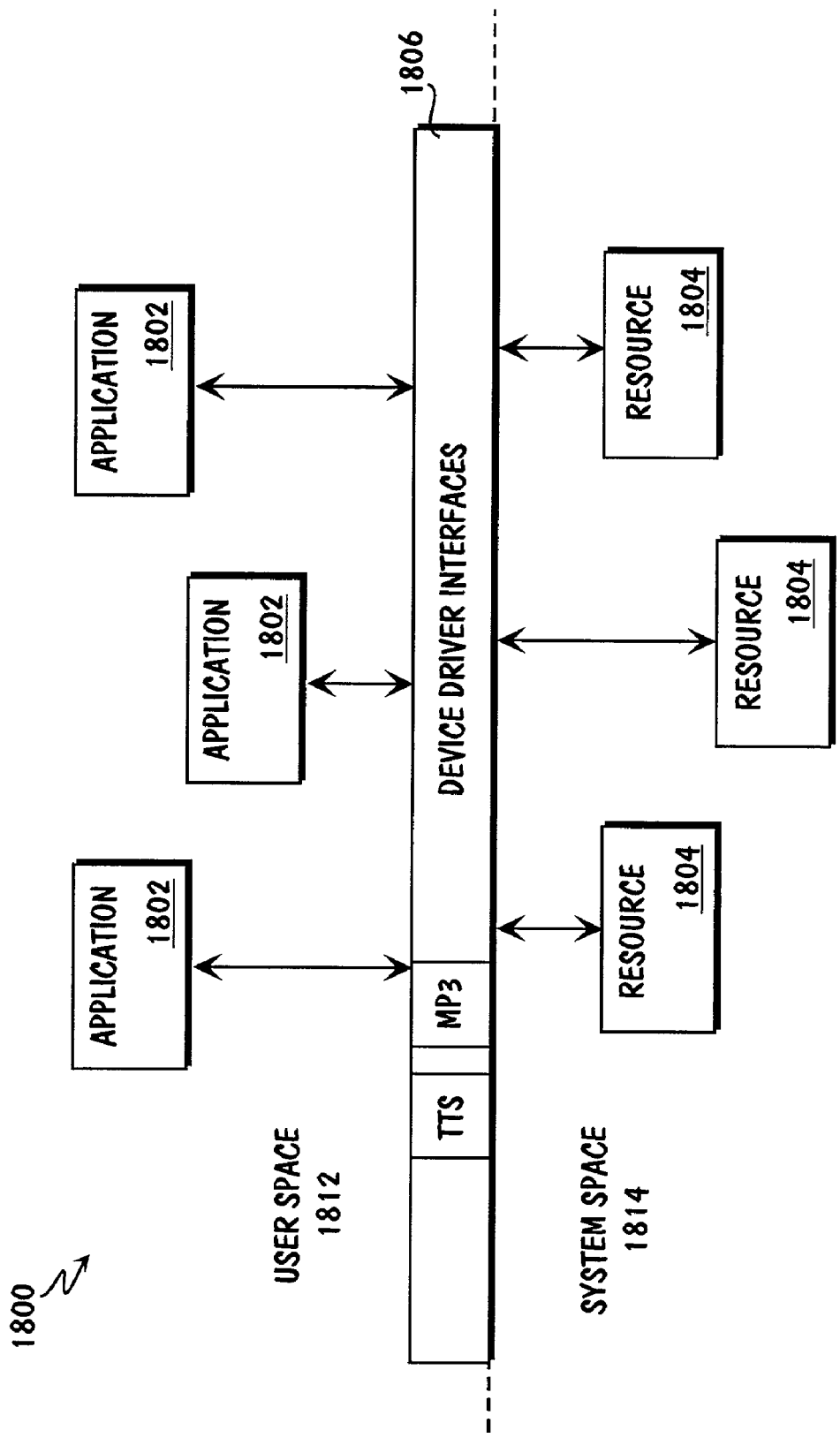
FIG. 18 is a block diagram of a platform system in which the applications reside in user space and the physical resources reside in system space, under an embodiment.

Applications of an embodiment reside in user space while the physical resources reside in system space, and the applications access the resources through device driver interfaces. FIG. 18 is a block diagram of a platform system 1800 in which the applications 1802 reside in user space 1812 and the physical resources 1804 reside in system space 1814, under an embodiment. The applications 1802 access the resources 1804 via user-space device driver interfaces 1806.

The applications 1802 of an embodiment can be installed on the system 1800 from the enterprise side. The enterprise side attributes a user ID (UID) to each application. Once on a POSIX-compliant system for example, applications are activated by an initialization module designated herein as p-init. The p-init copies the UID into the UNIX attributes of the application. As such, there is no way for the application to modify its UID. The UID is thus a certified identifier for an application. The enterprise will create a UID that defines application properties necessary for the software architecture to identify the application rights. These rights define how the application can interact in the architecture (trust level) and define how the application is treated in the process (priority level).

Figure 19:
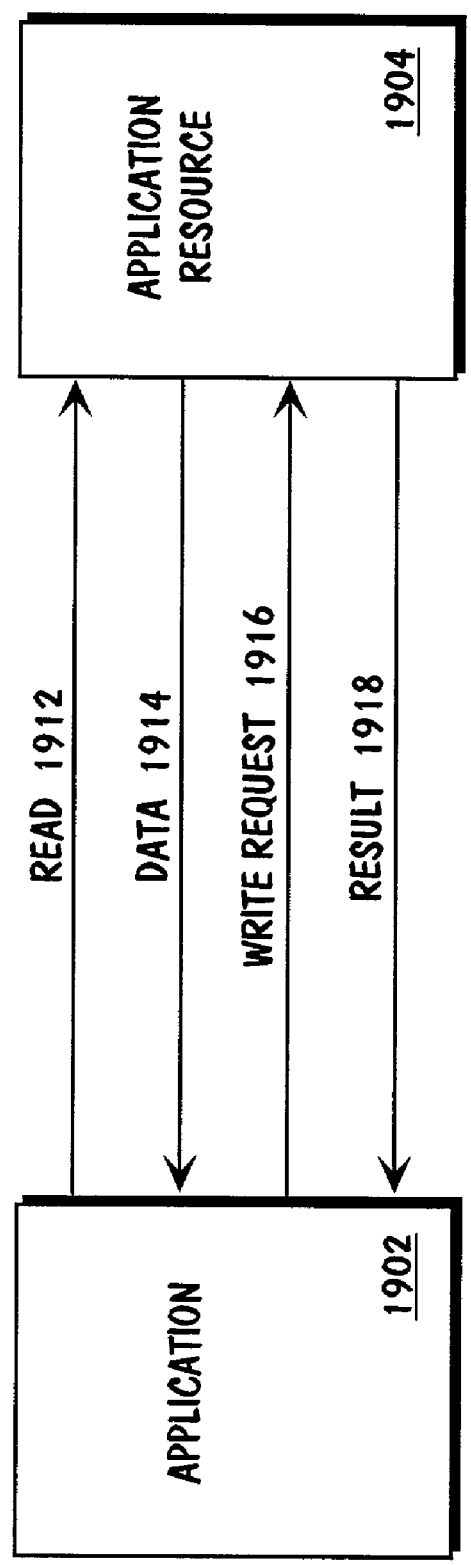
FIG. 19 is a block diagram showing the interactions among applications and application resources, under the platform architecture of an embodiment.

FIG. 19 is a block diagram showing the interactions among applications 1902 and application resources 1904, under the platform architecture of an embodiment. From the application 1902 perspective, the CUI is accessible through application resources 1904, which may for example be mediated by a resource manager like the UAX. Access to application resources 1904 involves four operations, including Read 1912, Data 1914, Write Request 1916, and Result 1918 operations. The Read 1912 and Data 1914 operations describe the state where the application 1902 is gathering information to define access to the application resource 1904. The Write Request 1916 and Result 1918 operations describe the state where the application 1902 is accessing the application resource 1904. There are however cases where the Read 1912 and Data 1914 operations do not exist either because the criteria do not include the application resource state (e.g., if it's 8am, play "ding.mp3" on /dev/mp3) or because there are no criteria (# echo "hello.mp3">/dev/mp3).

During the Read 1912 operation the application 1902 reads from the application resource 1904 by sending a read-request 1912 to the application resource 1904. The application resource 1904 returns the set of data 1914 requested by the application 1902 during the Data operation 1914. When certain pre-specified criteria are met, the application 1902 wants to take action and use the application resource 1904, in which case operation proceeds at the Write Request operation 1916; otherwise operation returns to the Read operation 1912.

When proceeding to the Write Request operation 1916, the application 1902 sends a request 1916 to write to the application resource 1904. During the Result operation 1918 the application resource 1904 responds to the write-request 1916; the request many or may not have been granted.

Note that during the interaction among the applications 1902 and the application resources 1904, the application resources 1904 constitute a layer of abstraction for all the levels below the application resources 1904, many details of which may be hidden by the second layer of the software flow (FIG. 17), the resource managers (UAX and UAC) and their associated libraries. Among other functions, the UAX and UAC prevent simultaneous access calls by multiple applications from producing a resource violation. That is, the UAX and UAC enable multiple accesses without applications requiring explicit coordination with each other. Additionally, they hide the physical resource sharing process.

Figure 20:
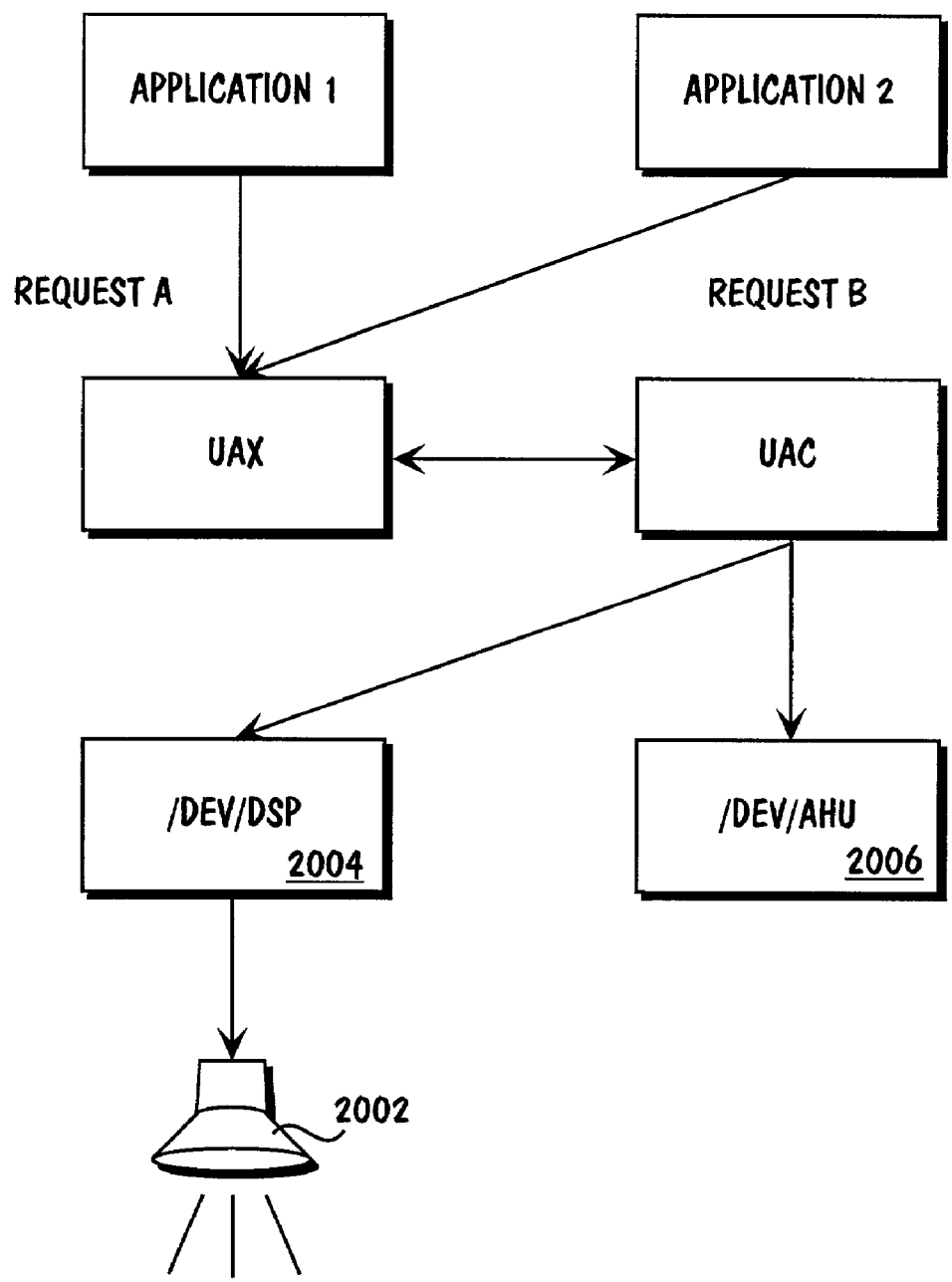
FIG. 20 is a block diagram showing resource request flow from multiple applications for a single resource using the platform architecture of an embodiment.

FIG. 20 is a block diagram showing resource request flow from multiple applications for a single resource using the platform architecture of an embodiment. Three resource request scenarios are described with reference to FIG. 20. In a first resource request scenario, Application 1 sends Request A to the UAX for audio resources including the /dev/dsp 2004, /dev/ahu 2006, and speakers 2002. Request A is granted, and the audio resources 2002–2006 subsequently receive the stream produced by /dev/tts (tts=text to speech) (not shown). Meanwhile, Application 2 sends Request B to the UAX to request dedication of the audio resources 2002–2006 to the stream produced by /dev/mp3 (not shown). Request B is not granted because the audio resources 2002–2006 are currently dedicated to Application 1 and are thus not available.

In a second resource request scenario, Application 1 sends Request A to the UAX. Request A is granted and the audio resources 2002–2006 are subsequently dedicated to the output stream produced by /dev/tts (tts=text to speech). Meanwhile Application 2 queues Request B to the UAX to request dedication of the audio resources 2002–2006 to the stream produced by /dev/mp3. Request B is granted and, upon completion of the stream from /dev/tts, the stream from /dev/mp3 starts.

In a third resource request scenario, Application 1 sends Request A to the UAX. Request A is granted and the audio resources 2002–2006 subsequently receive and output the stream produced by /dev/tts (tts=text to speech). Meanwhile, Application 2 schedules Request B for /dev/mp3 to be played by the audio resources 2002–2006 in 30 seconds. Request B is granted and, when the stream from /dev/tts completes 7 seconds later, the audio resources 2002–2006 are not used for 23 seconds. The stream from /dev/mp3 starts at the scheduled time.

As noted above, it is desirable for application developers to be able to access physical resources without explicitly coordinating for all possible interactions. It is equally undesirable to force device drivers to be configured to deal with resource management issues such as metering cost or dealing with priority of access. It is far more convenient to be able to use standard device drivers. A solution is to use the platform architecture described above with reference to FIG. 10 to redirect application resource requests via the FUSD module first to a set of resource managers that reside in user-space. The resource managers then issue queries on resource availability and issue the appropriate responses to the applications and device drivers. The redirection of requests is invisible to the application developer.

The UAX is responsible for granting application requests to user interfaces. To do so, it validates the request against UAX policies and checks with the UAC as to availability of the requested resource. The UAC is in communication with the Hardware Access Device Drivers (HADDs). The UAC informs the UAX of the resource status. The UAC thus provides a layer of abstraction to the UAX.

The UAX policies describe logic for use in testing application requests. The logic may be any type of logic, including calculations (e.g., is the file to be played too long?), statistics (e.g., does this application request access to this resource too often?), or UAC querying (e.g., if the car goes too fast, certain messages are not output; access to the VES (Vehicle State) through the UAC).

FIG. 21 is a block diagram showing the interactions among the UAX and UAC when handling an application request, under the platform software architecture of an embodiment. In this process, the UAX performs the roles of request granting (policy checking, resource status checking) and queuing and scheduling of requests. The UAC provides a unique, standardized point of access to the resource status for the UAX and a unique, standardized point of access to all the HADDs for the applications. The UAX and UAC interactions provide the policies that mediate access to the resources. While the HADDs contain the mechanisms for access (that is, issue the commands for particular actions to be taken by particular physical resources), the UAX and UAC determine which competing applications can gain access, and when they can gain access. Thus, neither applications nor HADDs need to be designed to account for the scenario in which multiple applications attempt to access the same HADD. Nor does application design need to consider the scenario in which multiple HADDs are accessed by the same application with kernel space controllers.

There are three types of request an application may issue to the UAX, including a send, a queue, and a schedule. A send is a request immediately sent to a resource. A queue is a request that is queued for the resource. A time-out may be specified with a queue. A schedule is a request that is scheduled with the resource. A time or time frame may accompany a schedule.

When an application issues a send request, the application knows immediately if the request is granted. When an application issues a queue or a schedule, there are two levels of request granting. In the first level of request granting the application is informed if the request is accepted in the queue or in the schedule. In the second level of request granting, the application is informed as to whether the request was actually processed. For example, it may happen that a UAX policy denies an application request at the moment it comes out of the queue.

In the case of a queue or a schedule, the request is held at the UAX. When the UAC informs the UAX that the resource is available, the UAX calls back the application, and then the application accesses the UAC (via the UAX). Policies are verified when the resource becomes available (not when the application request is queued or scheduled).

Each application request is validated against the UAX policies. The UAX policies determine if access to the UAC can be granted. The UAX chooses the policies to apply depending on the request and, in so doing, categorizes the request by group and resource. A group represents a global feature on the system (e.g., Audio, Button, etc.) and the resource is the resource the application wants to access. The UAX then applies four policies to the request including a generic initial policy, a group specific policy, a resource specific policy, and a generic final policy, but the application is not so limited.

The generic initial policy applies to any request. For the group specific policy, the application request specifies its group. For the resource specific policy, the application request specifies the resource to access. A generic final policy applies to any request.

A policy includes a variable number of simple tests. The data used in these tests are pulled from either the UAX or UAC. For example, the test "car speed is above 50 mph" pulls the car speed from the UAC as the UAC maps the CUT status. The test "Speaker usage is under 70% during the last 10 minutes" pulls the speaker usage statistical information from the UAX. The UAX policies are generally synchronized with an Enterprise Registry that is a registry of the set of policies for a fleet of vehicles.

The UAX and UAC log every request and every access to every resource, apart from application requests that directly access the hardware interface. To keep the log to a reasonable size, the UAX logs only information useful for policy formulation and execution. For example, a request log of an embodiment includes the application ID, request type (send, queue, or schedule), requested resource, and requested duration. The request log entries are performed by the UAX when an application request is received. As another example, an access log of an embodiment includes the application ID, actual access time and duration. The access log entries are performed by the UAC when the UAC gives an application access to a HADD. The UAX is responsible for retrieving information from the activity logs.

As a result of this architecture, standard HADDs may be used. With reference to FIG. 17, the completion of the software flow in accessing the CUT resources is accomplished through the hardware APIs. Examples of hardware APIs include the Button User Interface (BUT) API, the LED User Interface (LUI) API, and the Audio User Interface (AUI) API. The BUT API provides methods for returning a last button pressed, for blocking on a particular button pressed, for signaling applications upon button pressed, etc. The LUI API provides methods for setting LED levels and for requesting current LED levels. The AUI API provides methods for routing streams from microphones and telephones to speakers, for routing Gateway output to particular speakers, for controlling all head unit controls, etc. The AUI API uses the J1850 bus to communicate with the AHU, as described with reference to FIG. 16.

Because it is much easier to control access to a device driver than an API, each API of an embodiment is encapsulated in a device driver. For example, the BUT is accessible through /dev/buttons The resource manager (UAX/UAC) architecture proposes a model but the hardware resources (that is, the hardware APIs) are freely accessible. Nevertheless, not all applications can be permitted such free access. For example, consider the MFC/Win32 model on the Microsoft platform. In this model use can be made of the MFC API or the Win32 API. The MFC API provides the application developer with structured access and architectures. In contrast, the Win32 API gives free access to the resources by providing functions that directly access the resources.

In an automobile, where there are many shared and/or safety-critical resources, it is highly undesirable for the Win32 model to be accessible by any program. Final applications (third-parties) should rather have access to the resources through a controlling architecture, otherwise these applications could jeopardize the stability of other applications, security of transactions, or the overall vehicle safety. However, device drivers should still have free access to all the resources. The resource manager (UAX/UAC) architecture provides a convenient model, and a more effective way to write the code, that also allows access to the resources. Device driver (DD) developers are provided with the UAX architecture, and they are free to use it or not. The DD code is tested and called "trusted code" before being integrated in the DD space.

The logic of the UAX/UAC architecture of an embodiment applies to all final applications regardless of whether the application is trusted code or not, but the embodiment is not so limited. Therefore, when a third-party vendor application is downloaded on the system, because there is no guarantee on the code stability, this code uses the UAX architecture. Thus, direct access to resources is not granted to this third-party vendor application.

However, when a final application is trusted, it can access resources directly. Therefore, the architecture provided herein defines an application attribute, Application Trust Level, which determines whether or not an application is trusted. The Application Trust Level is encoded in the application UID.

A description follows for the process by which application requests are handled in the architecture of an embodiment. The UAX is the point of access to all resources and, as such, the UAX is in charge of the resource allocation. In controlling resource allocation the UAX handles queuing and the prioritizing and granting of requests according to policies.

As an example, and referring to FIG. 21, an application request is made to write to a resource. The request includes the following fields: the resource name; the data to send to the resource; timing parameters including a Time Window specified with Tmin and Tmax, and a Duration Window specified with Dmin and Dmax; and Negotiation parameters including Priority, Session ID, and Request ID. The Time Window specifies when the request is to be executed, where Tmin and Tmax are absolute dates. For example, if an application wants a request to be executed as soon as possible, but without limit, the specified time window will be $$]now,\infty[$$

where "now" represents the time at which the request is sent.

FIG. 22 is a table of Time Window examples, under an embodiment.

The UAX receives the request, as described above, and then tests against an entry policy. First, the UAX uses a specified logic to grant or deny the request. This logic is defined in a policy. For example, the policy may determine if the application that sent this request spams the resource. If the request meets policy requirements, then one possible action is that the UAX queues the request.

While the UAX eventually sends all resource requests to the corresponding resource, request queuing deals with multiple requests for access to the same resource. In queuing, the UAX places the request in a queue. Elements in this queue are sorted according to their priority. Elements having higher priority are moved up in the queue. Priorities can, for example, be defined for an application when the application is loaded onto the system, and subsequently be modified only by the user. Different levels of priorities might include: (1) emergency, (2) voice call, (3) user input, (4) navigation, (5) audio entertainment, and (6) unsolicited. If the element to queue has a higher priority than the element currently "playing" on the resource, the playing element is interrupted, and the new element is played. Playing of the interrupted element continues upon completion of new element play.

Figure 23:
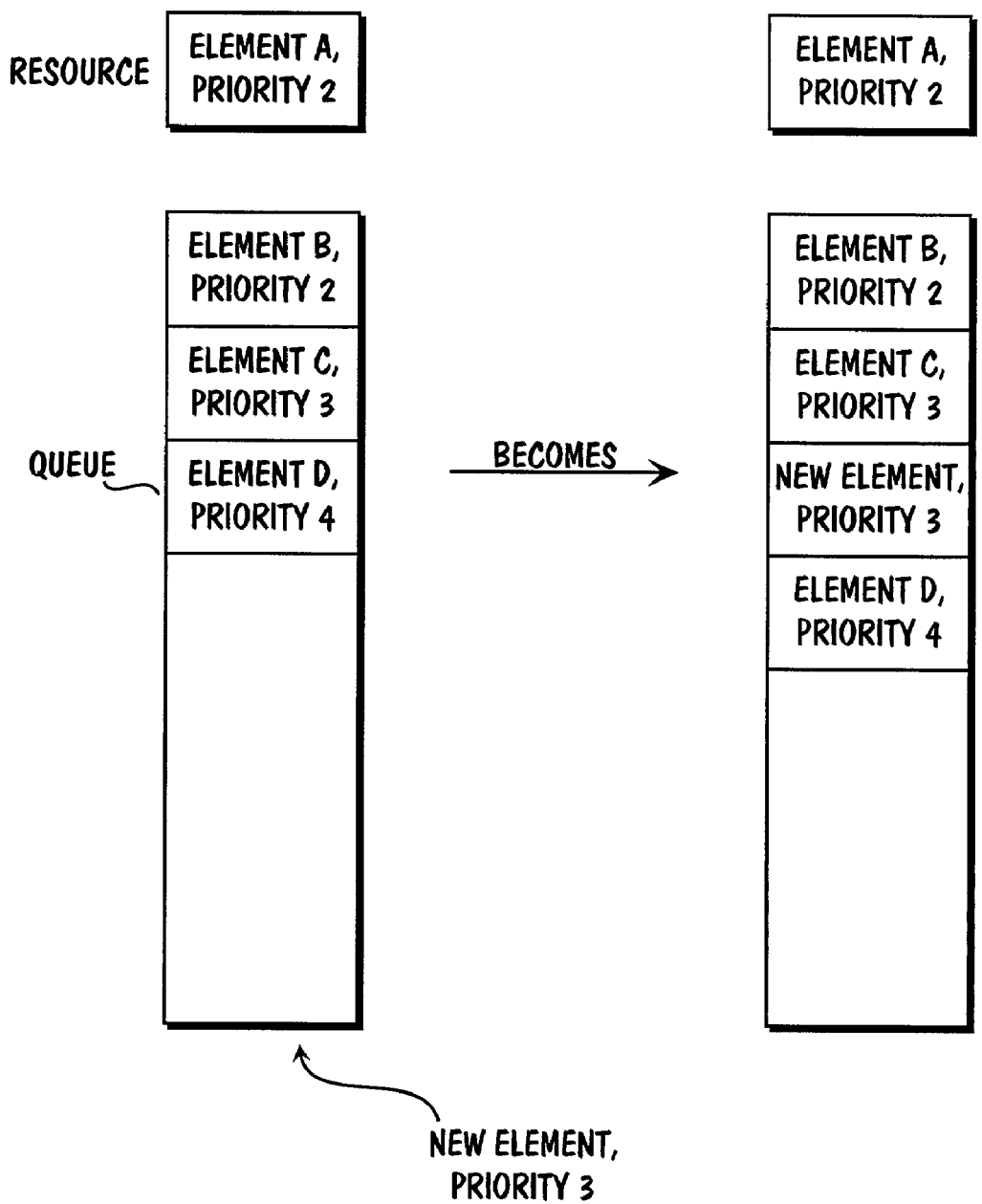
FIG. 23 is a block diagram of an example of queuing behavior when a new element is inserted in a queue according to priority, under the platform software architecture of an embodiment.

FIG. 23 is a block diagram of an example of queuing behavior when a new element is inserted in a queue according to priority, under the platform software architecture of an embodiment. In this example Element A, with priority 2, is currently playing. The other elements of the queue are arranged in order of element priority. A new element having priority 3 arrives at the queue, and is placed ahead of Element D (priority 4) and behind any elements having the same priority (Element C with priority 3). Element A continues playing.

Figure 24:
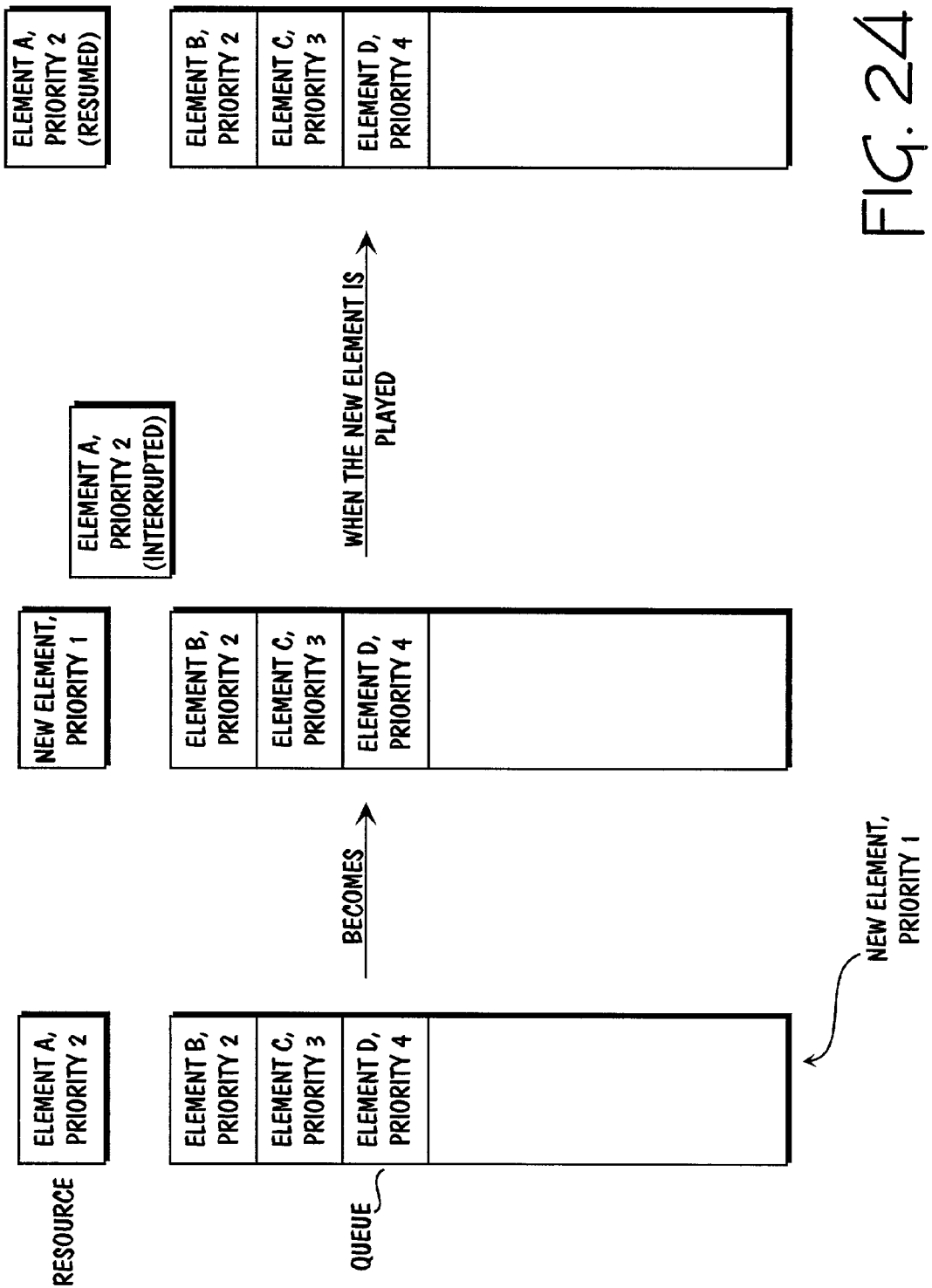
FIG. 24 is a block diagram of another example of queuing behavior when a new element is inserted in the queue according to priority, under the platform software architecture of an embodiment.

FIG. 24 is a block diagram of another example of queuing behavior when a new element is inserted in the queue according to priority, under the platform software architecture of an embodiment. In this example an arriving new element has priority 1, a higher priority than the currently playing element (Element A). Upon receipt of the new element, the playing of Element A is interrupted. The new element is then played to completion. The playing of Element A resumes upon completion of play of the new element.

Prior to queuing a request (with regard to priorities and policies consideration), the UAX evaluates whether the request can be executed in the specified time window. If not, the UAX will answer the application with a proposal to execute the request using the closest time window possible. For example if the request asks for ]now, now+3 seconds[ but the UAX is sure that the resource will not be available before 5 seconds, the proposal will be ]now+5 seconds, now+8 seconds[.

It is then up to the requesting application whether to accept the proposal.

Further, the request evaluation of the time window is not guaranteed. Consider the following example. The queue is empty, and the corresponding resource is busy with an element for 5 seconds. A first application sends a first request for the resource, where the first request has a time window ]now, now+10 seconds[.

Time wise, this first request is granted by the UAX along with the other parameters of the request, placing this first request in the queue.

A second application then sends a second request for the same resource to the UAX. However, this second application has a higher priority than both the first application and the application currently playing on the resource. The second request demands ]now, now+10 seconds [ and a duration of 12 seconds. The element at the resource is then interrupted, and the high-priority second request is played for 12 seconds. Play of the interrupted element is then resumed. Following completion of the interrupted element, the first request is played; however, this play time is 7 seconds after the high limit of our time window. Thus, although the UAX schedules the request, the request is never guaranteed to be executed in time.

In another example regarding request timing issues, assume a request is at the highest position in the queue. The resource frees, and the request can now be sent to the resource. Two scenarios are presented with regard to the time window of the request.

In the first scenario, the request was in the queue longer than specified in the associated time window. In this case, the request of an embodiment is cancelled. In spite of the UAX accepting a request, the request is not guaranteed to be executed until it actually leaves the queue. The UAX thus uses a send method to send a request and a check method to determine if a request has actually been executed.

Figure 25:
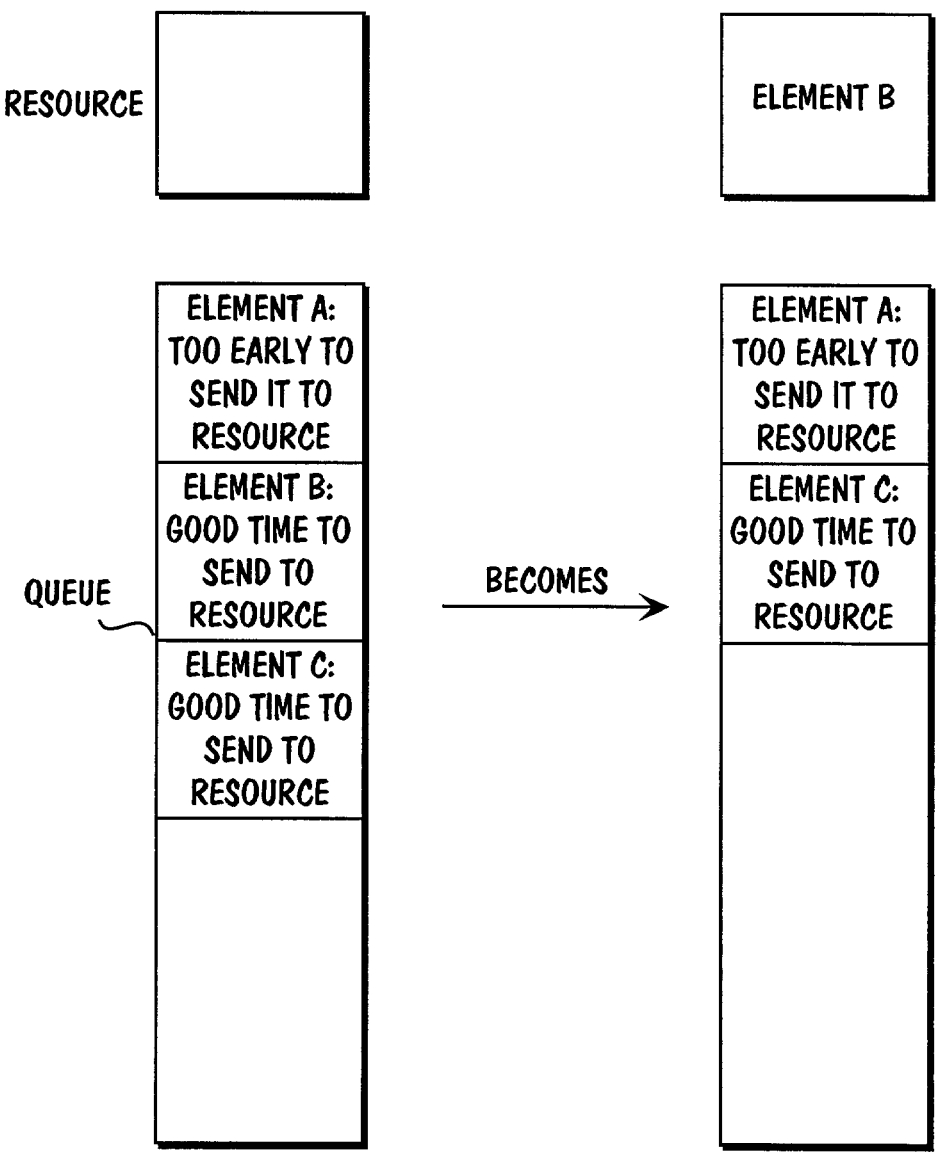
FIG. 25 is a block diagram of an example where the first queued application for which the time window is appropriate for resource usage is selected, under the platform software architecture of an embodiment.

In a second scenario, the request is set to be sent to the resource before the time specified in the associated time window. FIG. 25 is a block diagram of an example where the first queued application for which the time window is appropriate for resource usage is selected, under the platform software architecture of an embodiment. In this example, the resource has completed play of an element and it is too early to play Element A. In this case, the resource moves to the next request (Element B) in the queue.

Figure 26:
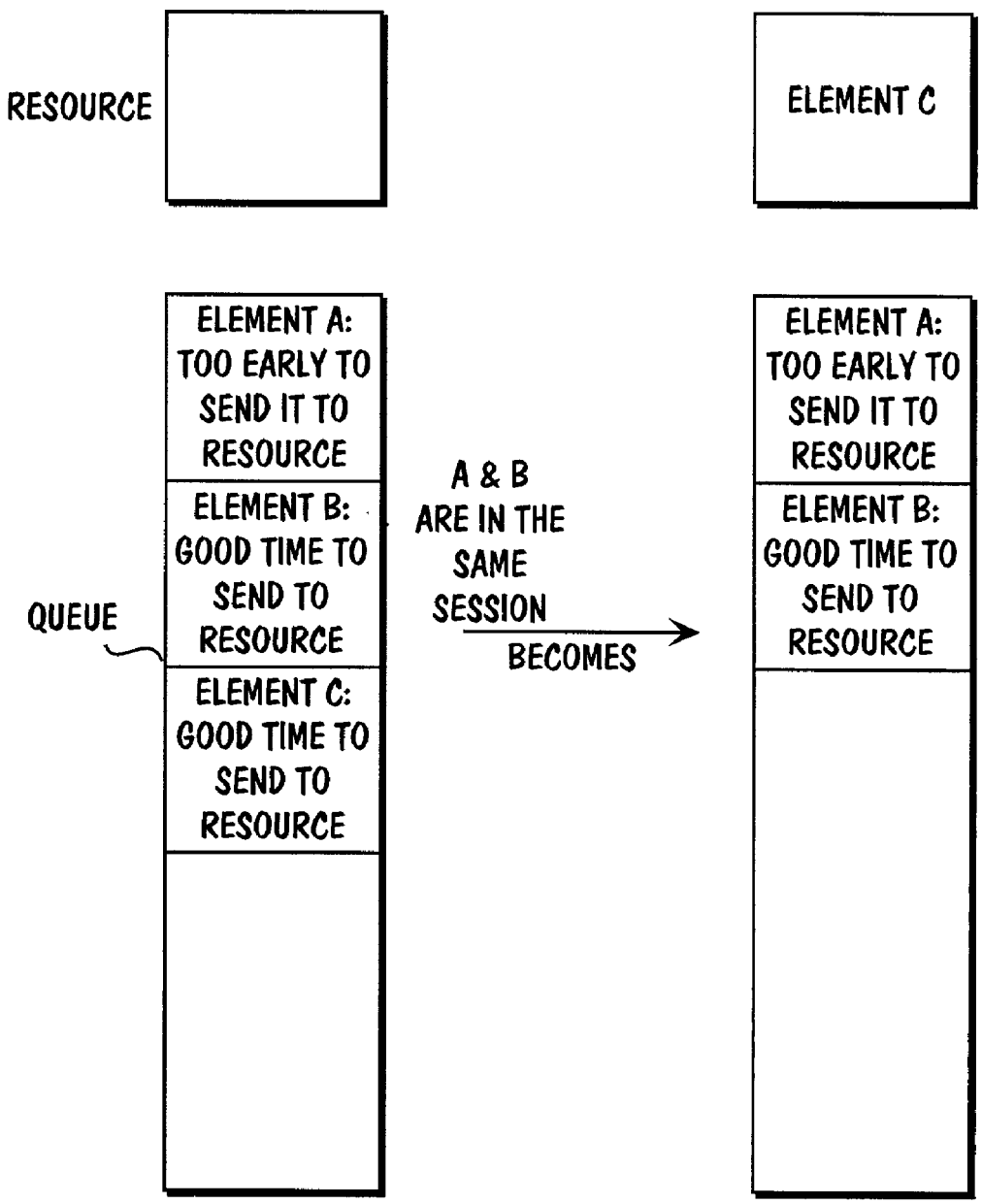
FIG. 26 is a block diagram of an example of a two requests being passed over, under an embodiment.

However, the resource cannot move to the next request if the request being passed over because of a later specified time window and the next request are part of the same session. FIG. 26 is a block diagram of an example of a two requests being passed over, under an embodiment. In this example, Elements A and B are part of the same session (thus, both sent by the same application, consecutively). The first request (Element A) is passed over because of a later specified time window. The next subsequent request (Element B) is passed over because it is part of the same session as Element A. This situation arises when the order in which the requests are sent are relevant, for example, sessions include instructions that should not be interrupted (these are defined by the application). In this situation, the resource takes the next subsequent element not part of the same session.

As another example of time window use in resource allocation, a request is at the highest position in the queue, the resource frees, and the request time window parameters are met. Before sending the request to the resource, an exit policy is checked against the request. If the request does not meet the criteria specified by this exit policy, the request is postponed, but not cancelled. For example, the policy may be that if the host car's speed is too high or the rate of change of speed is too high, the request should not be sent to the resource unless the request's priority is above a certain level (because for example we should not distract the driver with low-priority events). If the policy grants the request, then the request is sent to the resource, and the resource is marked busy.

The UAX answers an application request with one of three answers. The answers include, but are not limited to, yes (request granted), no (request denied), and proposal (request cannot be completed as specified, but a close schedule proposed by the UAX would allow it). In any case, a proposal answer does not mean that the request will be fulfilled, only that the request is accepted in the queue. By default, in the case of a proposal, the UAX puts the request in the queue with the proposed schedule. If the application is not satisfied with the new schedule, it can cancel the request afterwards (this logic keeps the application developer from having to deal with the proposal and rescheduling).

In order for an application to know if a request was fulfilled, the application checks on the status of the request (for example, with a UAX_check method ). The status can include, but is not limited to, in queue (with), playing, playing—interrupted, played, and cancelled. The returned status can include additional information. This additional information or data includes: if in queue, information about its position and estimated time to wait; if played, whether the request was interrupted; and if cancelled, the reason for cancellation (denied by entry policy, denied by exit policy, ran out of schedule). The status check with additional information is implemented using a UAX_SendAndWait method that sends a request and then checks the request status until such time as the request is completed.

In the interactions between the UAX and the UAC, the UAC reads requests from the queue and writes the requests to the resource. There is one UAC per resource, and the UAC defines methods specific to the associated resource for use by the UAX. For example, the UAC defines the method to interrupt the current element in the resource, as this is specific to the current resource. The UAC is not directly accessible from applications in the user space; only the UAX can access the UAC, but the embodiment is not so limited.

Further, the UAC logs utilization data about the associated resource. The utilization data may be used by the UAX policies (for example, if an application uses too much of a resource, a UAX policy may ban the application). The utilization data of an embodiment includes data about overall frequency of use, frequency of use per application, and resource idleness (a policy may want a resource to be idle between two elements.

The UAC also logs application usage of the associated resource. As every event is not required to be logged, the UAC will write a log entry per application per session. For example, a navigation application may not create a log entry for every direction ("turn left", "turn right"), but for every session. The logging is stored in a directory that is synchronized with the enterprise application.

Control of Other Network Resources

Just as external communications and user interfaces have questions of priority and cost of use, many applications may attempt to access internal communications networks or restricted devices connected to such networks. Not all applications or devices can or should be given access to these resources, and thus service managers analogous to the UAX/UAC and the OLX/OLC described above should be used. The platform architecture described above with reference to FIG. 10 makes convenient the construction of one or more such managers for various classes of devices, while allowing trusted code to have full resource access. For example, an in-bound link exchange may be constructed to provide prioritized and cost-accounted access to wireless ports for requests that are pushed from remote sources, while latency-sensitive access control might be required for sensor/actuator combinations. As will be apparent to those skilled in the art, design considerations similar to those described herein with respect to communications devices and user interfaces may be applied in these situations as well, with particular details of the implementation dependent upon the classes of devices and applications to be supported.

Policy and Service Registry

As described above with respect to resource management, resource managers use policies for allowing access to particular devices, and for determining which applications are permitted access and at what priority. In the context of a vehicle telematics gateway or system, for example, an OEM may specify priority levels for different classes of applications to devices such as sensors and actuators on OEM buses. These priority levels can then be stored as policies first in an enterprise registry, and then downloaded to gateways on individual vehicles when changes are made. Matters are however more complicated for devices that may be connected to consumer electronics buses, such as for example an IEEE 1394 bus that obeys the AMI-C specification. The intention is that a very broad range of consumer electronics may be added at various points in the operating lifetime of a vehicle, with many of these devices not yet invented at the time of sale of the vehicle. Moreover, the applications that may make use of such devices may be similarly undefined.

Both service and policy discovery use a naming convention for the functions the software enables. For services, this includes the basic nature of the service, and the priority scheme for usage. Typically, services accessible in a network are stored in a set of libraries that include the addresses of the devices offering (or requesting) services. Bluetooth, OSGi, Jini, and the application levels of IEEE 1394 all use variants on this basic scheme. Policies tied to particular services (applications) similarly use a naming convention so that applications making requests for particular resources can be quickly matched to the appropriate policy, and a library in which the policies are registered. Applications that request access to non-sensitive services (typically on the consumer bus) can be assigned to generic policies to cover such situations. This simplifies the development of such applications and reduces time to market. However, higher levels of access use some certification of the application and possibly construction of a policy particularly tailored to the application.

Policies for such applications that have been tested in a suitable certification process are for example posted on an enterprise registry of an embodiment, accessible to all vehicles within a class. A local copy of this registry on each vehicle is periodically updated. This registry includes both policies and applications to be downloaded. Additionally the registry has available the latest versions of the naming conventions for services and policies, so that these may evolve over time.

Because not all applications that access services in a vehicle internetwork will have been fully tested for how they interact, resource managers should retain the ability to restrict access. This extends even to preventing network access when inappropriate resource calls are made, as will be described below.

Security Methods and Distributed Operation

Java security is founded on the idea of assigning specific rights and privileges to codebases. While this is acceptable in the context of a web browser downloading self-contained, untrusted "applets", it does not fare so well when applied to a true multi-user, multi-application platform. One problem that arises is that it is difficult to enable layering of libraries and services without making the library code itself privileged, in the process losing the capability for fine-grained, "top-down" control over resource access, and making the access control verification layer much "thicker" and therefore subject to a substantially more difficult verification process.

An example of this privileged library problem follows. Using thread-based privileges, there is no need to perform verification on the library layer, because there is no way that it can access the wrong resource, whether by bug or design. This is because the access control check is done in exactly one place, in a fairly thin (and thus more readily validated) layer. However, in the case of code-based privileges, in order to act on behalf of either of the users, the library must be granted the union of those users' privileges. This means that the entire library must be validated to be sure that it does not violate the "correct" semantics. In addition, this means that these semantics must be specified consistently at each intervening layer of the system.

Note that technically, the impossibility of stopping "covert channels" (a well known concept of system design) indicates that in either case a library that is specifically designed to break the security can do so, for example by posting data to world-readable temp files. However, communication through covert channels is difficult to hide in code that is subject to validation, whereas bugs that result in security holes are more likely to slip through. The risk resulting from bugs is much higher in the case of the privileged library.

Native code also needs access control and resource management. While the Java language has many features, the existence of legacy codebases and the desire for applications that push the system to the limits of its performance will mean that Java is unlikely to be sufficient for all applications. In addition, it is desirable for the choice of language to be left to the application developer, rather than imposing it from above, because every language has its strengths and weaknesses when applied to different problems. For example, it is unlikely that the world's best MP3 decoder or embedded speech recognition engine will appear in a pure Java format in the near future.

When taking the coexistence of native and Java applications as a given and a requirement, a difficulty arises because the native code operates below the Java layer, meaning that the native code is by definition not subject to any of the access control or resource management policies that are defined within Java. Yet, resource management and access control are still necessary so that the platform and its users can be protected from each other and from excessive resource consumption, whether the result of poor design, accident, or malicious intent.

Taking the problem one step farther, on a platform with a high degree of concurrency, access management is not simply a security concern, but may be a fundamental underpinning required to achieve correct operation of the system. For example, consider the audio subsystem of a telematics platform. Even in typical operational scenarios there will inevitably be contention for resources like, for example, a media player application and a diagnostic warning message, and the speech recognition engine must somehow resolve the contention problem. Further, some of these applications might be written in Java while others are not.

Two possible solutions to this problem currently known in the art. One solution allows resource decisions to "punch through" to the native management mechanisms. Another solution duplicates all of the native management mechanisms within Java. There are several disadvantages to the latter approach, including: (a) duplication increases the system overhead and doubles the development effort required to add new features; (b) duplication introduces the possibility that the two are semantically different; and (c) the management decisions may be suboptimal because they are broken into two components which must then communicate in a complex way to make joint decisions.

In many cases, a system is designed around the idea of a server that accepts connections from clients, secured by client credentials. This is a model that works well whenever there is some external or a priori secure device that holds the credentials. For example, a human user might memorize a password that is supplied to a web browser to authorize a transaction. This solution provides a reasonable amount of security, because with some degree of cooperation from the human user the privacy of that password can be maintained. Another possible solution revolves around possession of a particular key or tamper resistant device such as a smart card, which makes mechanical recovery of the key difficult.

However, when entering the realm of semi-autonomous applications that are accessing resources with certain centrally defined access privileges, the situation is quite different. Here, it cannot be assumed that the memory of the computer is completely safe; this is known as the stored credentials problem. The hardware is for the most part not tamper-resistant, and the system is complex enough that it can be difficult to be assured that a particular piece of information cannot be read 'illegally'. Ideally, the code that is loaded onto the platform will not need to be customized with permissions information unique to a particular installation embedded in it. Rather, it is preferred that the code distributions be identical, cacheable, and that the security of the system does not depend on encrypting their content.

Fundamentally, it is impossible to avoid the need for stored credentials. However, it is possible to (a) reduce the size and amount of information that is to be protected, and (b) centralize the maintenance, distribution, and verification of that information. The solution is a security framework in accordance with the platform architecture described above that leverages the security mechanisms designed into the OS to the greatest degree possible.

Figure 27:
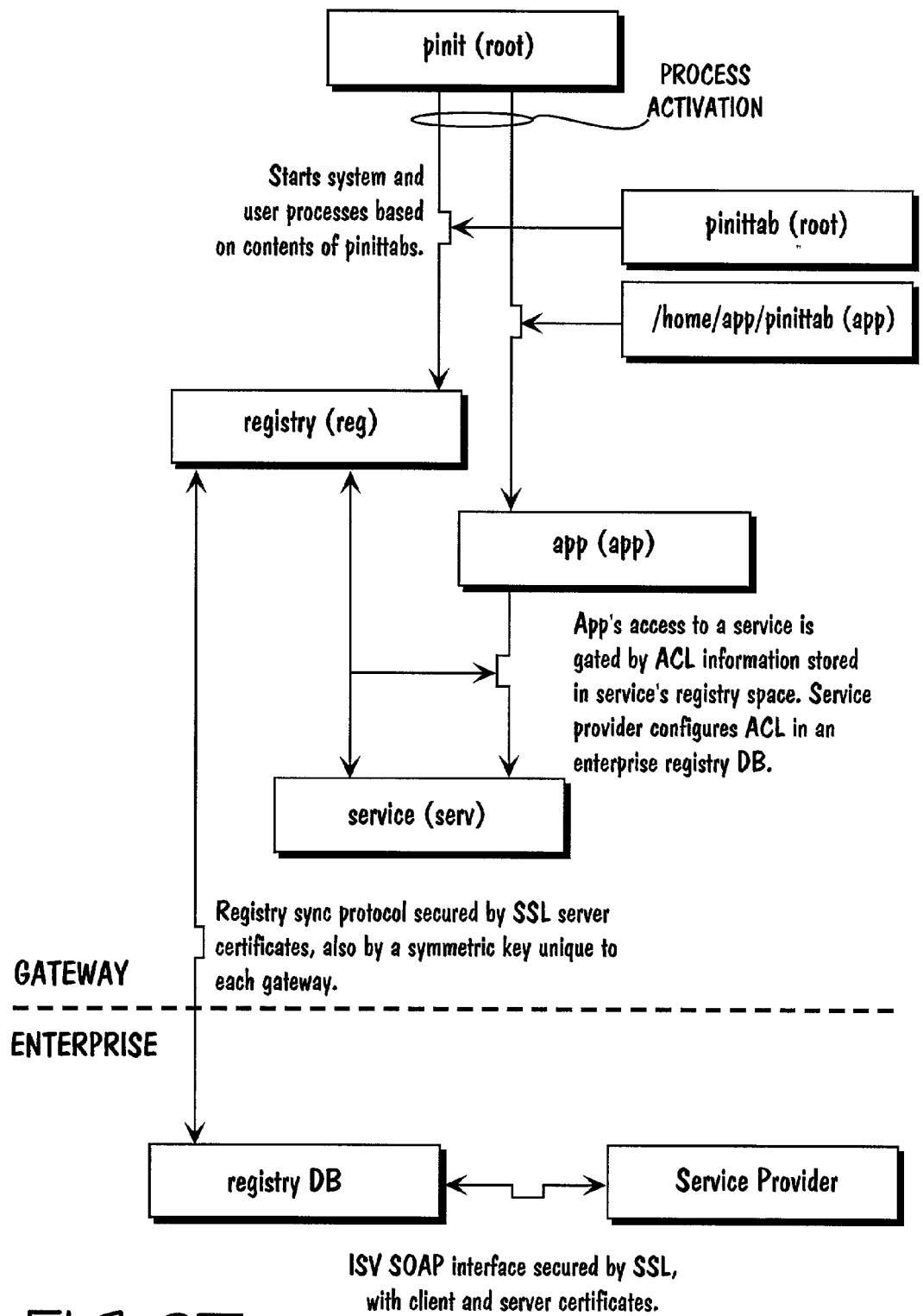
FIG. 27 is a block diagram of a security architecture that supports resource management and access control so that a host platform and platform users can be protected from each other and from excessive resource consumption, under an embodiment.

FIG. 27 is a block diagram of a security architecture that supports resource management and access control so that a host platform and platform users can be protected from each other and from excessive resource consumption, under an embodiment. A unique user ID is assigned to each application and service resident on a gateway; security then relies on the user space/kernel space boundary to perform basic access control checks. Services are implemented using messages passing across the user/kernel boundary (using for example the FUSD microkernel extension to the Linux OS) so that services can rely on the request being associated with the correct user ID metadata.

In operation, processes are started at boot time by a special program called "pinit" that runs as a root. This operation is controlled by special files called pinittab's. Applications can specify startup instructions but they are limited to starting processes as their own user. Installation of application files, including pinittabs, is controlled from the backend through a system manager-operated software upgrade service. A registry database residing at the enterprise (e.g., on a server on the World Wide Web) periodically communicates with the gateway and the service provider to ensure that applications have paid for and are authorized to use the resources they request. Because this is centralized, it can be made very secure. The local version of this information on the gateway is periodically updated.

Figure 28:
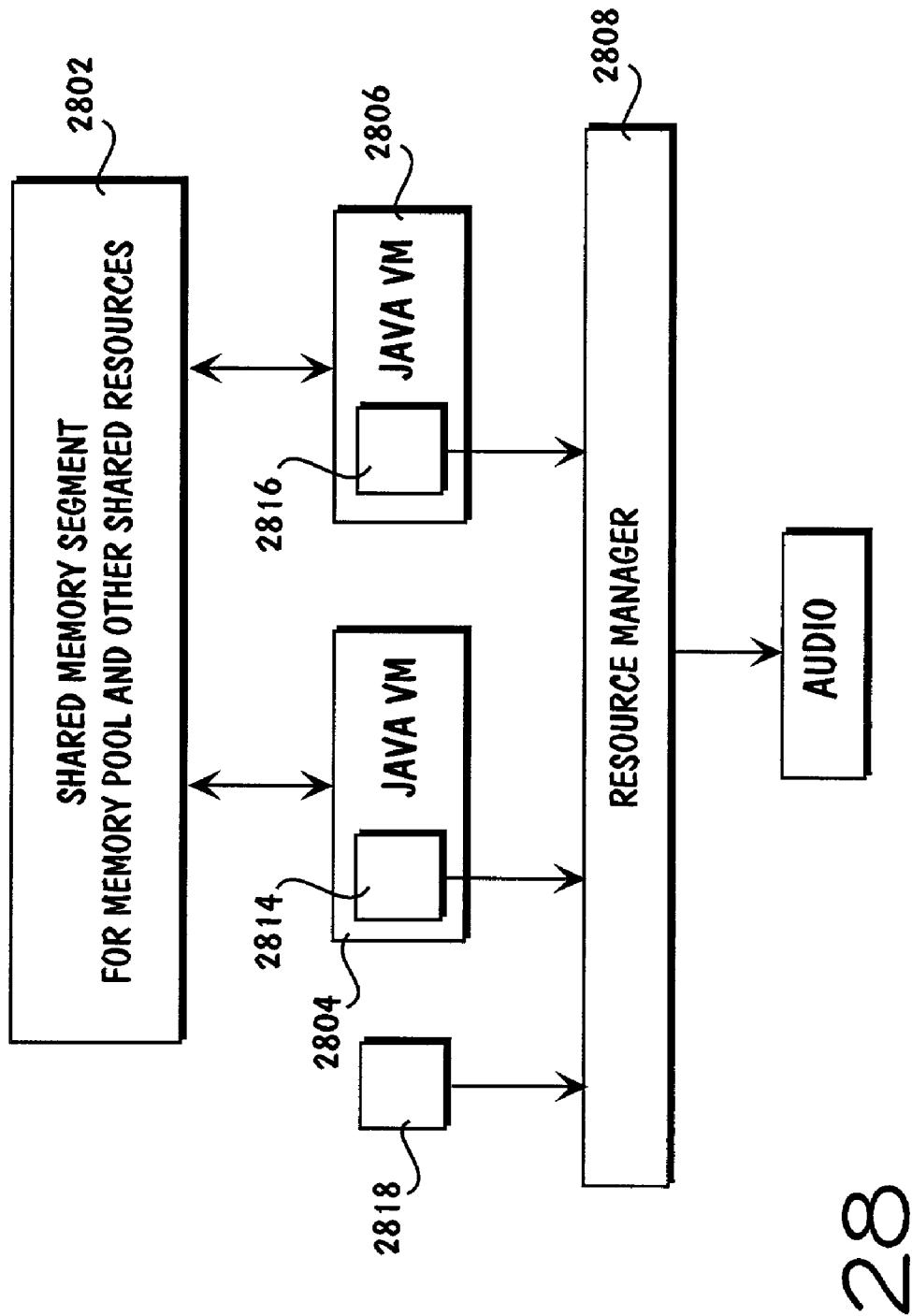
FIG. 28 is a block diagram of a platform architecture that supports shared resource management, under an embodiment.

To solve the privileged library, coexistence of Java, and native code problems, one solution under the platform software architecture of an embodiment provides a JVM that shares resources across several separate JVM instances. FIG. 28 is a block diagram of a platform architecture that supports shared resource management, under an embodiment. The architecture includes JVMs 2804–2806 running between a resource manager 2808 and a shared memory segment 2802 for a memory pool and other shared resources. Each JVM 2804–2806 runs as a separate user, and each JVM 2804–2806 runs the code for a single application 2814–2816. Therefore, the JVM 2804–2806 provides an environment in which a Java application 2814–2816 runs; and the Java application 2814–2816 plus the JVM instance 2804–2806 comprises a single process, on a par with any other system process or native application 2818. The JVMs 2804–2806 are already built around shared libraries, so there is little additional overhead from the text segment of the library code, even when it is used by multiple JVM instances. The major savings come from developing a shared memory pool 2802 from which all JVMs 2804–2806 allocate memory.

While this architecture solves many of the problems associated with a monolithic JVM, as a side effect it also makes OSGi less of a desirable alternative. The OSGi is basically a framework for hosting multiple applications in a single JVM. In addition, OSGi bases its service model on the use of stored credentials and code-based privileges, which have additional negative properties. Using the architecture described above, one JVM can be configured to accept multiple applications and thus support OSGi, accepting these penalties, by assigning lower priorities of access compared to applications that are hosted on individual JVMs or in native code. However, many of the features of OSGi can be provided by parallel features developed in a native software framework.

Figure 29:
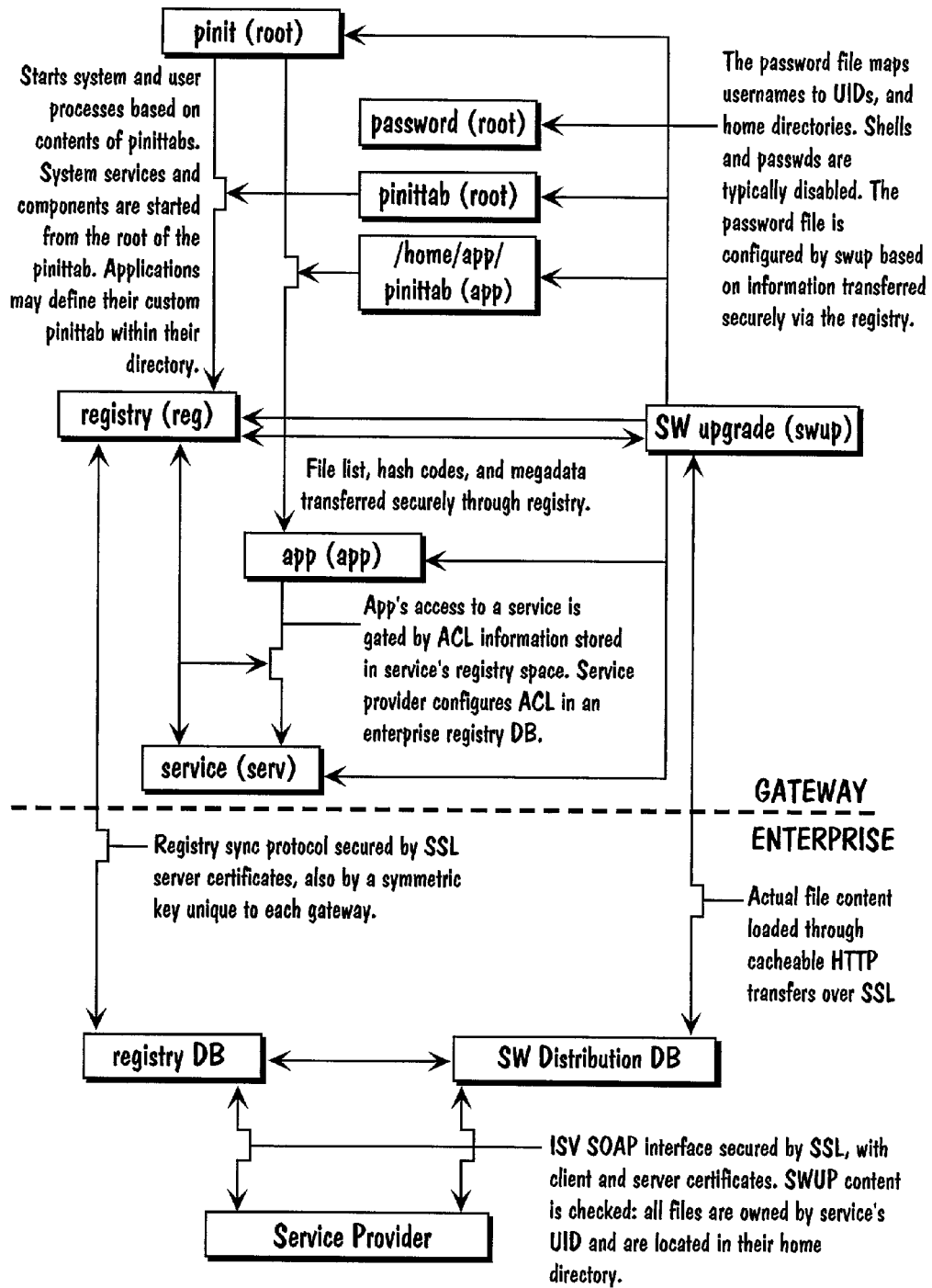
FIG. 29 is a platform security architecture that supports shared resource management, under an embodiment.

FIG. 29 is a platform security architecture that supports shared resource management, under an embodiment. Using this architecture and the FUSD architecture described above, services can be provided from Java just as well as from any other language, and the centrally managed software provisioning and upgrade facilities can work for Java applications as well as for native applications, thus obviating the need for the OSGi "bundle" mechanism.

In more detail, the pinit (root) starts the system and user processes based on the content of pinittabs. The system services and components are started from the root of pinittab. Applications may define their custom pinittab within their directory. The passwd file maps usernames to UIDs and home directories. Shells and passwords are typically disabled. The passwd file is configured by the software upgrade (swup) block based on information transferred securely via the registry. The registry and swup for example exchange file lists, hash codes, and metadata.

The access to a service by an application (app) is gated by ACL information stored in the space allocated to that service in the registry. The service provider configures the ACL information in an enterprise registry database (DB). This database synchronizes with the gateway registry using for example secure socket layer (SSL) server certificates, also employing symmetric keys unique to each gateway. Similarly, the software distribution database may communicate using SSL to create secure HTTP sessions with the swup module on the gateway. Communications between the registry and software distribution databases and the various service providers can be by means of an ISV SOAP interface or some other suitable standard as is known in the art, secured for example by SSL, with client and server certificates. The SWUP content is checked to ensure that all files are owned by the service's UID and are located in their home directory.

Implicit in the above description is the importance that communications between the gateway and external networks be secure. Otherwise policies for resource access may be subverted, privacy endangered, and/or financial transactions imperiled. Since the basic external communications model is based on the use of TCP/IP, a variety of methods known in the art can be used. The TCP/IP itself contains a set of methods designated as IPsec that can be used to encrypt information. Further, for interactions with web servers the SSL protocol that is now standard in most secure web transactions can be employed. To deal with authentication of sources, for example, the X.509 protocol may be used for public key distribution and exchange of security certificates.

Authentication and encryption operations are also used for certain transactions within a network controlled by a gateway. For example, when a new device joins the network requesting or offering services, the rights of the device with respect to access are determined. This can be done only if there is confidence in matching the identity of the device or application against a registry. It is also used to prevent applications from eavesdropping on other transactions, either on the gateway or in the network.

In the Related Applications, a proxy and port architecture was described for enabling secure addition of devices to the network, and for protecting the network from various attacks. In summary, the proxy controls all access to external communications and internal resources, with proxy stubs to enable access to legacy controls. Internet protocol (IP) approaches are used where possible, with the proxy stubs enabling legacy devices to be addressed as if they were IP-capable. The various buses are assumed to be insecure, with traffic to and from the proxy being by means of secure IP tunnels. Ports are trusted devices that are the only means by which other devices may be attached to the network. They have varying levels of sophistication and function, but share the common characteristic of being able to shut down traffic from misbehaving clients, and passing on only those messages on the network intended for their client. Methods for encapsulating messages from applications for communication among the proxy, ports, and other devices and networks were also described. A variety of physical security methods were also described as a means for authenticating devices, including use of the ignition key, and PINs.

The Related Applications also describe how the resource control and security features characteristic of the proxy might be centralized on one device, such as a gateway, or distributed throughout the network. A description follows below on use of the FUSD framework to securely implement resource management when applications reside on many clients of a gateway, or when the resource control functions are themselves distributed among several devices as is contemplated for a distributed proxy. This distribution of functions permits many devices with disparate operating systems to host applications without the need for all applications to be sent to one device such as the gateway. This is in contrast to systems generally described as distributed operating systems, in which each device must have the same operating system. With the platform architecture of an embodiment, the basic requirement is simply communications using a standard such as the TCP/IP stack and associated security protocols. As most OSs support this TCP/IP stack, this is a less onerous restriction, and consequently it is easier to add new devices and functions to the network. At the same time contention for common resources is resolved through one set of policies.

Identity of applications within the FUSD architecture is determined through the UID, which in turn indexes the appropriate policies in the resource managers. When applications and managers all reside in the same device, this has the same level of security as the OS itself. However, there are security concerns when applications or managers may reside on different devices. The platform architecture described herein supports both the authentication of applications residing on different devices and the secure transportation of messages over the network between devices. In effect, the UIDs presented to the FUSD modules or components are made to be trusted, even when passed over the network.

The use of standard operating systems and network protocols allows for the authentication to be accomplished within the platform architecture of an embodiment using numerous methods. For trusted devices, UIDs may be registered at the initialization stage without the need for explicit authentication for each message exchanged, thus reducing latency and overhead. For non-trusted devices, a certification system such as Kerberos can be used to authenticate client/server sessions. Kerberos demands credentials before authorizing a series of transactions (usually with a time-limit). This would govern for example the registration of the UIDs of the applications or the registration of the services enabled by the device.

Another approach is to have remote devices go through a remote login to the device hosting the security registry. The applications of the remote device are not authorized to remotely log in unless they are trusted. Following login of the remote device, the extra resources to which the authorized applications of the remote device have access become visible. Thus, for example, if a password or PIN is entered into a PDA to initiate a remote login, the applications on the PDA will now be assigned UIDs with rights of access according to the corresponding policy in the enterprise registry. Even so, the resource managers retain the ability to terminate access based on the pattern of resource use, in case the applications have been subverted or poorly conceived.

Figure 30:
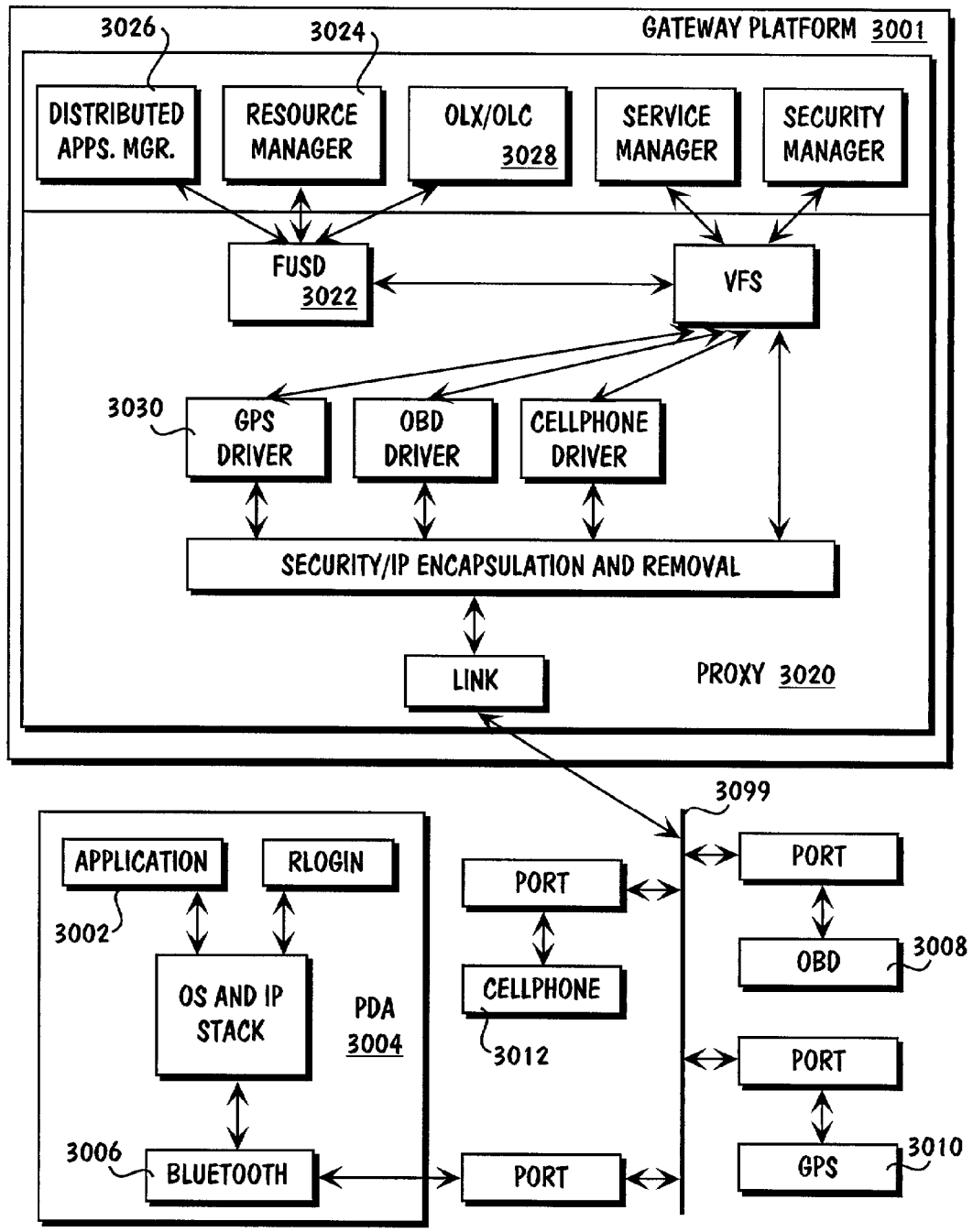
FIG. 30 is a block diagram of a remote application accessing shared resources of a gateway platform, under the platform software architecture of an embodiment.

Consider an example of how such services are provided in one embodiment of the distributed system. FIG. 30 is a block diagram of a remote application 3002 accessing shared resources of a gateway platform 3001, under the platform software architecture of an embodiment. A vehicle diagnostics application 3002 residing on a PDA 3004 with a bluetooth port 3006 requires data from the on-board data (OBD) port 3008 and GPS node 3010, which it will then process and use to make a request to transmit the results using a cellular telephone 3012 attached to the vehicle network 3099. None of the items are safety-sensitive, but GPS data carries privacy implications and the cellular telephone call generates charges, and is at a relatively low priority compared to other uses. Consequently, authorization will be required.

In operation, the user enters a PIN into the PDA 3004, triggering an authentication exchange. The PIN is verified as one that had been securely entered into the enterprise registry through a remote web access with the appropriate password. When the remote application 3002 is invoked, it registers with the proxy 3020, in this example hosted on the gateway platform 3001, and is assigned a UID with appropriate permissions. The remote application 3002 makes requests for GPS and OBD port data as if directly addressing these devices. However, the request is encapsulated in an IP tunnel and sent to the gateway platform 3001.

Upon being decoded, the request from the remote application 3002 passes through the FUSD module 3022 to the appropriate resource managers 3024 that check the UID against access policies, and then schedule requests to the device drivers 3030. As discussed above, this may involve several rounds of communications between the resource managers 3024 and the application 3002 if the requests cannot be immediately granted.

Eventually, data is retrieved by components of the gateway platform 3001, for example by a distributed applications manager 3026 that keeps track of requests from remote applications, and then the data are forwarded to the PDA 3004. The remote application 3002 on the PDA 3004 then processes the data and makes a request to send the results over the cellular telephone 3012, supplying the method to charge the call along with a call priority. The OLX 3028 evaluates the request against the policy set for the UID and the availability of the communications resource, determines if the data packet can be combined with that of a request by another application, and commands the data packet to be sent. A message confirming call transmission along with the amount charged for the call is returned to the PDA 3004.

Figure 31:
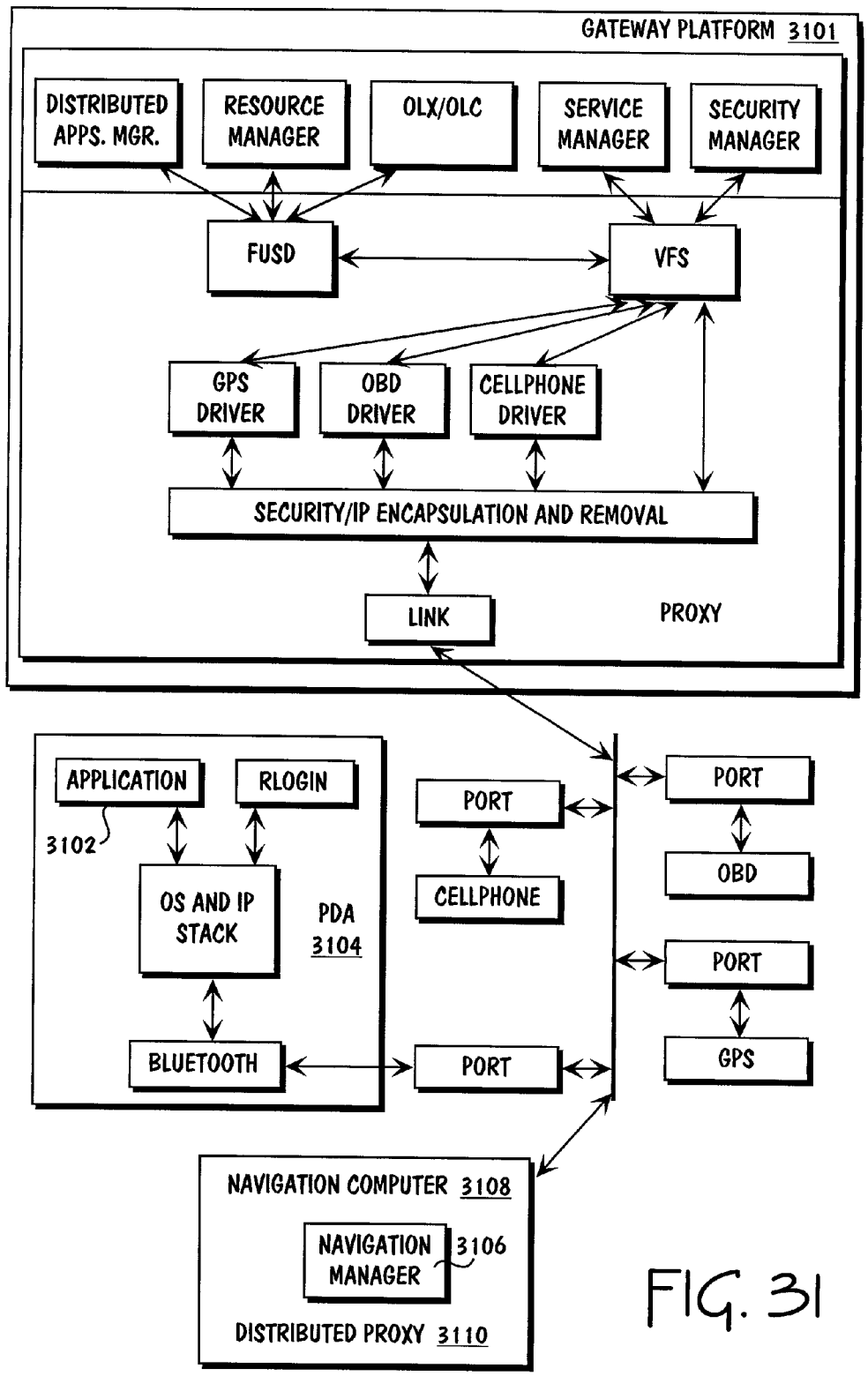
FIG. 31 is a block diagram of a remote application accessing shared resources of a gateway platform in which a designated navigation manager controls access to platform resources associated with navigation (including GPS), under an alternative embodiment.

FIG. 31 is a block diagram of a remote application 3102 accessing shared resources of a gateway platform 3101 in which a designated navigation manager 3106 controls access to platform resources associated with navigation (including GPS), under an alternative embodiment. The navigation manager 3106 is hosted on a navigation computer 3108. In this embodiment the proxy 3110 is itself distributed. The navigation computer 3108 may additionally host a variety of applications and device drivers, all of which are known to the service and policy registries. In the service discovery phase the application 3102 on the PDA 3104 is informed to route requests for GPS data to the navigation computer 3108 rather than the gateway 3101. The resource managers (not shown) on the navigation computer 3108 then deal with these requests, while the gateway 3101 continues to deal with the OBD and cellular telephone access requests.

Figure 32:
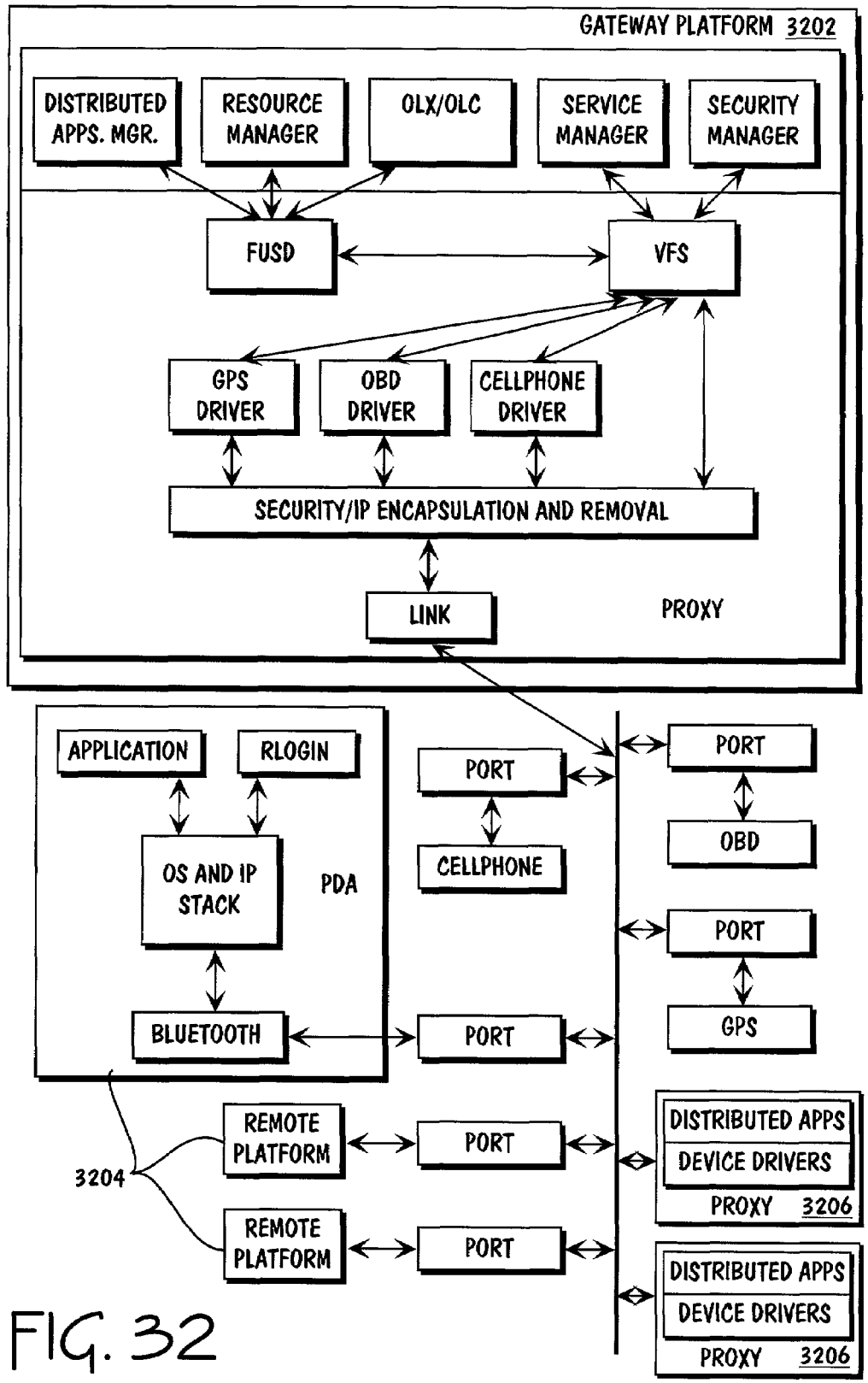
FIG. 32 is a block diagram of a network including a gateway platform, multiple remote platforms hosting remote applications, and multiple distributed platforms including distributed proxies, applications, and device drivers, under another alternative embodiment.

FIG. 32 is a block diagram of a network including a gateway platform 3202, multiple remote platforms 3204 hosting remote applications, and multiple distributed platforms 3206 including distributed proxies, applications, and device drivers, under another alternative embodiment.

In yet another alternative embodiment, the gateway may host only the service and policy registries. The managers for all other resources reside on other platforms of the system.

None of the above illustrative transactions are time-critical. Many applications are in this category, and are thus well-suited for distributed applications. However, in distributed systems the time to execute transactions across a network is potentially unbounded. Therefore, it is good practice to have applications, managers, and drivers for high-speed real-time systems to reside on the same device.

A system architecture that includes service and policy registries, resource managers, security procedures, and communications configured as described herein can be thought of as a distributed operating system. The system has the capability of securely managing access to shared resources, performing cost accounting, and incorporating new devices and services into the system as they become available. This system thus may be conveniently upgraded over time, as new generations of electronics and applications become available. Moreover, it allows multiple users to share the electronic resources available on, for example, a vehicle network with appropriate priority of use. This general system configuration may similarly be applied to distributed networks within homes or office/industrial settings, and even extended to remote access over the world wide web in instances where latency is not a critical issue, thus linking geographically remote resources.

Another example of the possible uses of such a distributed system involves digital rights management for digitized content such as music, images, and videos. While one application can be authorized to download such content it is presently extremely difficult, even in desktop computer systems, to guarantee that the content will not be passed to other applications that might then more widely distribute the content. However, using the platform framework described herein, the content is controlled to pass only to explicitly authorized devices. Thus, fees for usage can be dramatically lower than in an alternative situation in which content could potentially be sent to large numbers of users. Therefore, in an automotive application, content is downloaded from a remote web site, with the costs accounted for and assurances given that the content will reside only on a particular device on the vehicle and for a particular duration.

Another implication of the security and management framework described herein is that communications applications need not necessarily be hosted on a trusted device such as the gateway, or a set of trusted devices such as a distributed proxy. For example, a PDA couples to a network and establishes its credentials with the network. The recognized PDA then attempts a web connection to a remote site using a microbrowser or Wireless Application Protocol (WAP) forum stack. The cellular telephone used to make the web connection supports the lower levels of the protocol, but the proxy does not need to support any of the protocol, provided the request is encapsulated using a standard protocol. Thus, for example, a Bluetooth port may be used, with the WAP stack encapsulated as an bttp session that identifies the nature of the request and the protocol that is wrapped inside. A web server on the platform recognizes the UID that was assigned at login, and invokes the OLX for accounting, permissions, and scheduling of the session. It is verified that the cellular telephone supports the WAP. The http encapsulation is then stripped and the message passed through to the cellular telephone. Substantially any protocol set can be treated in this fashion; the resource management software will pass through the session as long as the origin and destination devices understand the protocol and the session is encapsulated using a standard protocol understood by the proxy. In this way communications protocols can proliferate over time, without the requirement for adding translation software to the proxy.

If the PDA desires a standard http session the message may also be passed through, with the proxy alerting the cellular telephone or other external communications device to use a standard communications protocol. In a more sophisticated exchange, the PDA can attempt a standard http session, but is then informed by the OLX that only low-bandwidth and high cost links are available, exceeding the cost allowed for the session. The application may then determine that a lower bandwidth WAP session will be attempted instead. The new http request to the gateway now includes the reduced projected resource use, and the session is scheduled. In this way, it appears to the PDA that full WAP functionality is available, with the added feature of explicit resource management.

Applications of the Platform Architecture

While for purposes of clarity of exposition the platform architecture has been described largely in the context of automotive telematics, the platform architecture also applies to local networks for residences, factories, offices and the like, and interactions of vehicles with such local networks. The platform architecture further applies to such applications as homeland defense and other security needs. More generally, the platform architecture applies to systems that interface networks to the physical world while dealing with requirements for management of some combination of remote reconfigurability, contention for access to physical resources, contention for access to communications, and cost accounting.

Figure 33:
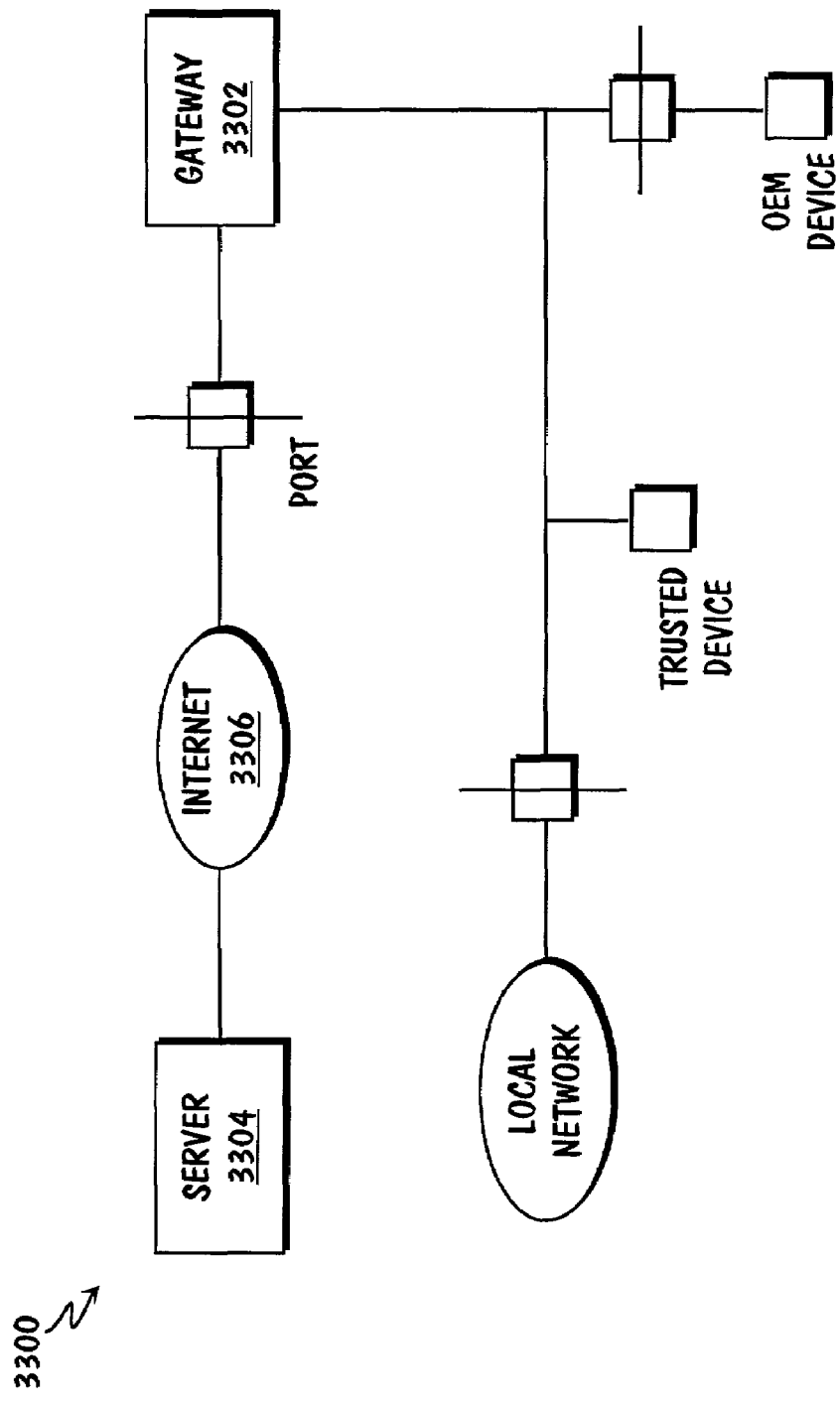
FIG. 33 is a block diagram of a managed local network including a gateway hosting the platform architecture of the embodiments described herein, for example the embodiments described with reference to FIG. 9 and FIG. 10.

FIG. 33 is a block diagram of a managed local network 3300 including a gateway 3302 hosting the platform architecture of the embodiments described herein, for example the embodiments described with reference to FIG. 9 and FIG. 10. The network 3300 includes at least one server 3304 coupled to the gateway 3302 and associated sub-networks via an Internet connection 3306. The gateway 3302 includes a port that supports the Internet connection 3306 including for example an Ethernet, cellular telephone, or any of a number of communication ports known in the art. A second gateway (not shown) in the network may connect to another local network (e.g., a CAN bus in a factory), and thus the local network may carry traffic from un-trusted sources. This brings with it security concerns. As described above, packets can be tunneled through non-secure networks to trusted devices, and methods were described as to how the devices that provide a given service can recognize and authenticate each other through this intervening non-secure network.

Figure 34:
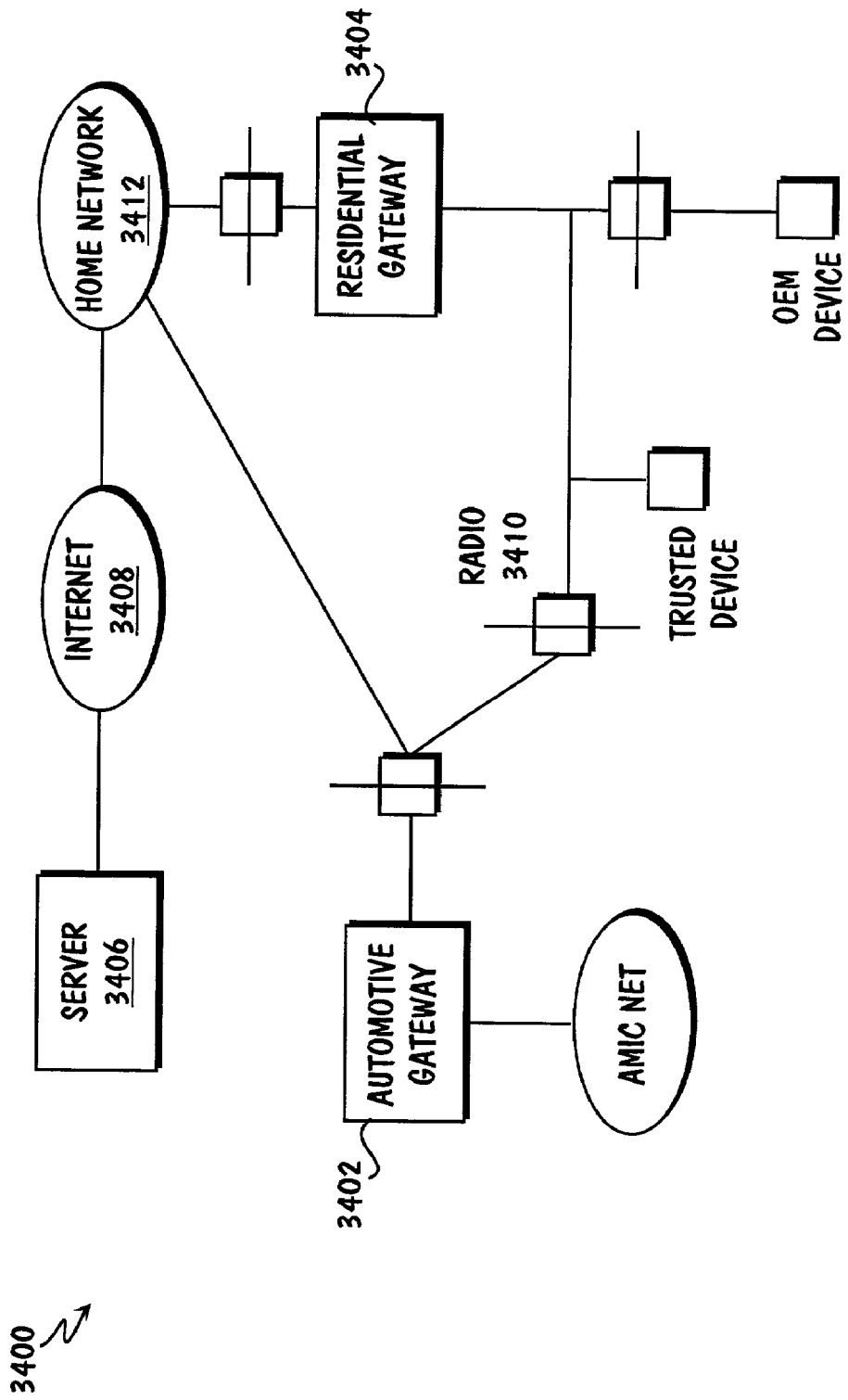
FIG. 34 is a block diagram of a combined residential/automotive application including an automotive gateway and a residential gateway, either or both of which host the platform architecture of the embodiments described herein, for example the embodiments described with reference to FIG. 9 and FIG. 10.

FIG. 34 is a block diagram of a combined residential/automotive application including an automotive gateway 3402 and a residential gateway 3404, either or both of which host the platform architecture of the embodiments described herein, for example the embodiments described with reference to FIG. 9 and FIG. 10. As described above the server 3406 is remotely located and is accessed via the Internet 3408. Now, however, the service-enabling devices within the home make use of the residential or home gateway 3404 and a non-secure network, e.g., a set-top box and a wired network like a wireless local area network (WLAN). The automotive gateway 3402 within the vehicle manages communications to the remote server 3406 through either the pre-existing WLAN, or through a radio 3410 that is accessed through the residential gateway 3404.

The residential gateway 3404 manages its side of this communication, and provides for connectivity to the Internet 3408 through the home network 3412. The residential gateway 3404 also hosts applications for the separate WLAN within the home, including for example energy management devices. In this application the service-enabling devices find each other through pre-existing non-secure networks, and establish secure links.

In one alternative application, the residential gateway and home network can instead represent a gateway and local network respectively of a service station or other local vendor that supplies services to motor vehicles. In another alternative application, the residential gateway and home network can instead represent an office network that, for example, may include radio communications devices in a parking structure, and which provides harmonization of information between office and vehicle networks. In all of these applications, only authorized devices are allowed to engage in transactions, and communications resources are preferentially managed in favor of the applications with the highest priorities.

The problem of providing secure communication through the pre-existing home, office, or industrial networks is similar to that of communication within a vehicle internetwork. In all cases, a port is used to bridge the networks and tunnel packets. Using the technology described herein and in the Related Applications, new communication resources can be conveniently added over time; these communication resources can be from any manufacturer for which the appropriate port has been fabricated. Thus, the proxy and port architecture described herein is enabling of "universal socket" functions not just for automobiles, but for substantially any network configuration. Key elements for this interoperability include a policy for authentication of new devices through an intervening network, a common communications protocol stack (such as TCP/IP and http), and ports that interface between these networks and the networks containing the proxies and servers that provision and manage the desired services.

The platform architecture described herein also suggests upgrade paths both with respect to advancing technology, and for customers who wish to incrementally add new services. More resources can be added to the network, provided a port exists to connect the new classes of devices to the prior network. Entire new networks can thereby be attached. Moreover, industrial applications, meter reading, and the like are more readily enabled using available communications resources. End-to-end solutions therefore do not require a new communications infrastructure, particularly given the capability of hosting applications and resource managers that enable local processing, thus limiting long-range high-bandwidth communications.

The platform architecture described herein also scales to the management of wireless or guest wired access to residential, industrial and office networks in a manner similar to the management of wireless devices accessing a vehicle network. For example, wireless networks of 802.11 devices may be constructed for convenient access by laptop computers and PDAs operated by classes of individuals including employees of the host business and non-employee individuals. While authorization for access by the employees is handled by a system administrator of the business, the provision of nuanced access to other parties is difficult using architectures known in the art.

As an example, it may be desirable to enable access to a certain package of services (e.g., particular printers or projectors, web and email access) by the non-employee individuals while restricting access to other more sensitive resources and information. The proxy and port architecture together with the platform software architecture described above provides a way to support these multi-user access requirements. Moreover, the cost accounting and resource sharing features can also be used for such purposes as providing public access ports in airports, restaurants, and malls.

In the context of the automotive application, users may go through a remote login procedure to a proxy. This proxy can be hosted on the 802.11 access point, or the access point may merely serve as a port, with multiple ports per proxy. Some services may be freely available without authentication, for example downloading of the necessary software for entering a secure http session to request greater access. Other downloadable software may include for example a Java applet that allows for convenient interaction with the resource managers hosted on the proxy. By limiting the particular ways that access may be granted to the network, the security firewall design is simplified, and fewer communications protocols and translators need to be hosted on the proxy. Because the managers are capable of limiting which devices and applications can be accessed per (authenticated) UID, it is thus possible to provide guest packages that provide convenient access to services that may generate revenue (e.g., web sites with advertising or commissions for each purchase) while granting variable priority of access to other users based on payment plan or identity.

Figure 35:
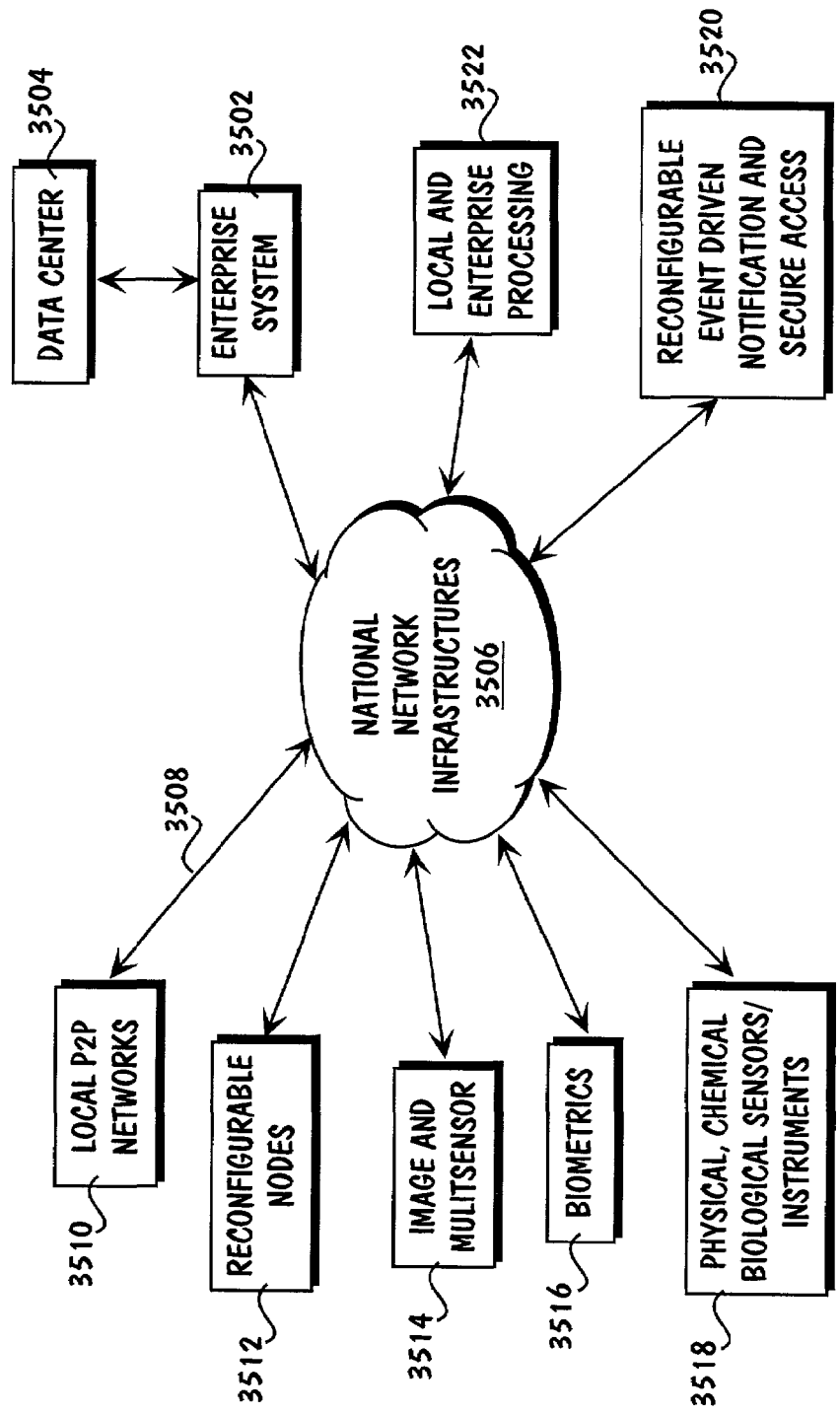
FIG. 35 is a block diagram of a network configuration for homeland defense including an enterprise system hosting the platform architecture of the embodiments described herein, for example the embodiments described with reference to FIG. 9 and FIG. 10.

The platform architecture of an embodiment also supports numerous homeland defense applications. FIG. 35 is a block diagram of a network configuration for homeland defense including an enterprise system 3502 hosting the platform architecture of the embodiments described herein, for example the embodiments described with reference to FIG. 9 and FIG. 10. This network configuration includes an enterprise system 3502 coupled among data centers 3504 and a national network infrastructure 3506. The national network infrastructure 3506 uses end-to-end authenticated secure links 3508 to couple the enterprise system 3502 to homeland defense applications including, but not limited to, local point-to-point networks 3510, reconfigurable nodes 3512, image and multi-sensor nodes 3514, biometric equipment 3516, and other sensor instruments including physical, chemical, and biological equipment 3518. The enterprise system 3502 supports secure access to and reconfigurable, event driven notification 3520 from the homeland defense applications, as well as local and enterprise processing 3522. The diverse homeland defense applications have the common feature of large numbers of gateways communicating through large-area non-secure networks with secure central servers and databases. In turn, security personnel may access information from these databases via standard web browsing tools.

Consider for example the deployment of a security system in which gateways are coupled to cameras, microphones, and other devices for biometric identification of individuals. The gateway may host software that performs the identification, or may perform some preprocessing that serves to compress the data to be transmitted to a remote location where a deeper level of analysis is performed.

The applications on the gateways access the cameras and microphones via device drivers in order to control such parameters as frame rate and exposure time given light conditions, or to trigger images based on sounds or proximity sensor outputs. The UAX provides convenient libraries for the applications to interact with these devices. The OLX controls the various communications resources that might be available, authorizing external communications based on a cost function related to message priority. Such priorities may change over time, and the applications can be remotely upgraded as newer versions with improved accuracy become available. Additionally, such installations can be upgraded over time with a larger or different set of sensors (e.g., for biohazards), with remote download of software for these new applications, and cost functions for the OLX to manage the remote communications.

In another application, a network of cameras is located throughout a facility. Multiple users may access the camera network, with the requests having differing thresholds of certainty as to whether something untoward had been observed. The requests are resolved so that information is sent at the correct resolution, given the fidelity that is required, and the relative priority. In this way, an installed security system can grow and be re-tasked over time.

Similarly, the platform architecture described herein supports numerous aspects of remote military applications. As an example, in remote military applications considerable effort may go into emplacing a monitoring system. This process may be hazardous to the extent that manual replacement and maintenance of systems is to be avoided. However, mission tasks and priorities may change over time, so it is essential both that a management system exists for controlling external communications and access to the sensors, and that new software can be remotely downloaded; both of these are provided as described above.

Further, remote military systems are often reconfigured, for example, as to target selection, duty cycle of operation (to balance system energy use (lifetime) against information collection), and/or new components might be air-dropped for integration into the network. Additionally, external communications available in support of the monitoring system are highly location dependent (e.g., cellular-based in an urban area, satellite-based in remote locations), and thus the need for a modular architecture that allows different classes of communication devices to be used is highly desirable. Support for these capabilities is provided using the software platform architecture described herein.

Other Implementations of the Platform Software Architecture

The advantages of the open platform software architecture described above include application portability, application verifiability, and support for the largest communities of development engineers and suppliers. For example, POSIX operating systems and associated device drivers, the Java language, and the OSGi middleware standard all become available in a wide variety of applications in providing a secure and stable operating system, a platform independent codebase, and a standard software delivery method. The platform software architecture described herein promotes rapid adoption of pure Java and OSGi standards, to name a few, by presenting language-independent interfaces to networking, vehicle devices, and others. These interfaces use the standard POSIX device file interface to provide applications with telematics capability without requiring compliance with proprietary APIs. The interface set includes security, network access, process management, file access permissions, and vehicle network interfaces. The complete assembly of these interfaces thus enables application developers to proceed with development of platform-independent telematics applications.

These advantages are not limited to telematics or particular sets of software standards. For the embodiments described above, substantially any middleware that can reside on top of the POSIX system can be supported, and indeed multiple varieties might be supported at the same time, since the resource management functions appear to the applications to reside in the kernel.

Moreover, while the descriptions of the platform software architecture herein have concentrated on POSIX compliant systems, the platform architecture is not limited to POSIX compliant systems, or particular middleware such as Java. The same methods can be applied to other operating systems, with similar advantages in the presence of numerous device drivers, applications and communications interfaces. Indeed, both the resource management functions enabled by the proxy and the application software may be distributed over many devices, none of which require use of the same operating system. Further, while the description herein has largely concentrated on access to drivers for telecommunications devices and user interfaces, similar advantages apply whenever there is a scarce or costly physical resource that must be accessed, for example sensor data through a commonly used analog/digital device, or access to an actuator set in a distributed system with many possible control inputs. The software platform architecture described herein encompasses all such applications and implementations.

Physical Embodiments

Figure 36:
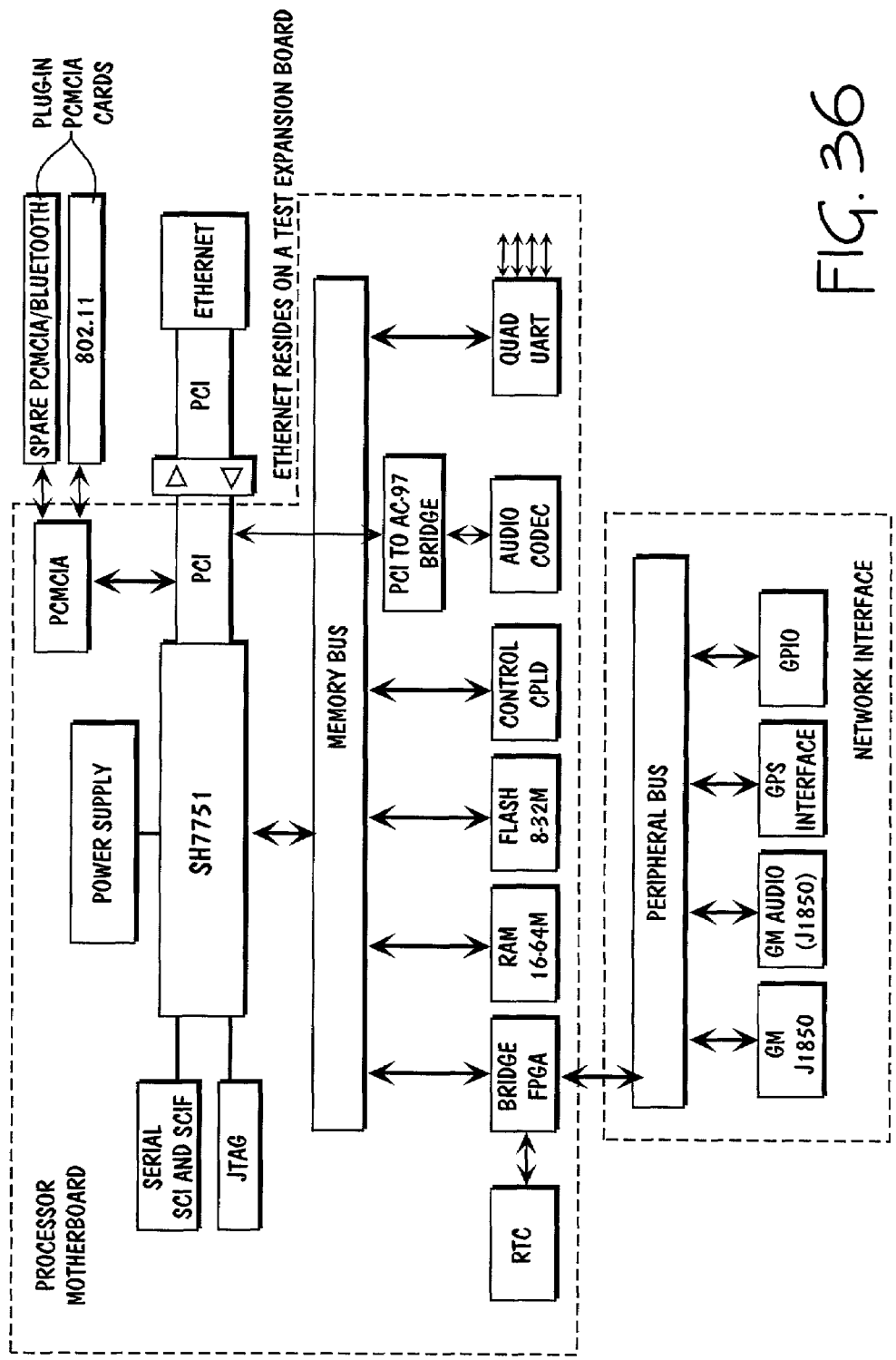
FIG. 36 is a block diagram of a gateway platform, under an embodiment.

The platform software architecture may be implemented on an apparatus such as the modular Gateway (mGate) available from Sensoria Corporation, for example. FIG. 36 is a block diagram of a gateway platform, under an embodiment. The processor motherboard includes the power supply, PCMCIA slots and interfaces, SH7751, PCI, Serial SCI and SCIF, JTAG, Memory Bus, RTC, bridge field programmable gate array (FPGA), random access memory (RAM) 16–64M, FLASH 8–32M, control complex programmable logic device (CPLD), PCI to AC-97 Bridge, Audio CODEC, and quad universal asynchronous receiver transmitter (UART). The vehicle interfaces board (VIB) includes the peripheral bus, GM J1850 (audio) bus, GPS interface, and general purpose input/output (GPIO). The test expansion board includes the PIC and Ethernet, and may be used in place of the VIB. Plug-in PCMCIA cards include IEEE 802.11 radio ports, and a spare which might be used for Bluetooth.

With the configuration depicted, the SH7751 is the host for the platform software architecture including the operating system and numerous drivers. The use of multiple additional processors enables many critical real-time management functions to be offloaded from the main processor, allowing determinism without requiring a special operating system. As described in the Related Applications, with respect to vehicle gateways with both a main processor and logic comprising a real-time interface processor (RTIP), systems with this general architecture enable convenient hosting of applications while also assuring real-time operation. In the gateway of an embodiment, the VIB contains most vehicle-specific interfaces, and can operate in an extreme low power mode while monitoring for incoming signals to wake up the entire system. Thus, the modular architecture reduces costs for dealing with multiple vehicle classes, while also avoiding excessive battery drain. The gateway is flexible to support a wide set of applications, yet can be implemented in a size (approximately 5 inches by 7 inches by 2 inches) that fits into standard automotive dashboard slots.

The processor of an embodiment is a Hitachi HD6417751F167, but is not so limited. The SH7751 can be programmed via a 14 pin JTAG header on the core board. This header is accessible when the board stack is removed from the gateways enclosure. The SH7751 has two native serial ports. The SCI port is used to communicate with the PIC, which controls the power state of the system. This port is used in a SPI mode where the SH7751 acts as a slave. The SCIF port on the SH7751 exits the gateway via the main connector at RS232 levels with full flow control.

The RAM on the board is scalable from 16 megabytes (M) to 64M in 16M increments. This is implemented by chip selection and the choice of the number of chips populated. The chips are populated in pairs. Using two chips that are 16 bits wide allows a 32-bit write which is twice as fast as two 16-bit writes.

The FLASH on the board is scalable from 8M to 32M in 8M increments. This is implemented by chip selection and the choice of the number of chips populated. The chips are populated in pairs. Using two chips that are 16 bits wide allows a 32-bit write which is twice as fast as two 16-bit writes.

The FPGA is responsible for aiding the SH7751 in controlling several devices on the core board. The address bus, data bus, chip selects, and IRQs of the SH7751 are routed to the FPGA so that they may be decoded before interfacing with other devices. The FPGA interfaces with the quad UART, the VIB, and the CODEC and generates GPIOs which are used for debugging. The FPGA can be programmed either through the SH7751 or a 5-pin JTAG header on the core board.

The CPLD is also used as an extension of the SH7751 but at a lower level than the FPGA. The CPLD interfaces include the RAM and FLASH.

The CODEC used is AC-97 compliant and is interfaced through AC-LINK. This is interfaced to the SH7751 by using a PCI-to-AC-LINK bridge chip. The audio traces are sensitive to digital noise. Care is thus taken in their routing both internal and external to the gateway enclosure.

The quad UART is used as an expansion of the two serial ports that are native to the SH processor.

Serial port 1 is exposed at a header on the core board. This header is intended to interface with a high speed device like a Bluetooth device that uses the RS232 protocol but at TTL levels. The receive (RX) and transmit (TX) lines of this port are also run to the FPGA at the TTL level. This gives the added flexibility of later being able to have a serial port on an expansion board which would use the connector currently designated for the VIB.

Serial port 2 is exposed at a header on the core board and runs to the main connector which is externally exposed. Both of these outputs use full flow control at regular RS232 levels. Zero ohm resistors are populated so that only one of these two options can be selected at a given time. This header may be used as the phone interface port. This header is in close proximity to the phones power pins. The second set of wires that run externally feed through the main external connector.

Serial port 3 has its RX and TX lines running at the TTL level to the VIB connector. This port is used as the GPS interface port. A header for the GPS resides on the VIB board.

Serial port 4 exits the main external connector with full flow control and at standard RS232 levels. The RX and TX lines also run to the FPGA at TTL level. In order to avoid a contention problem, a zero ohm resistor is placed on the RX line where the TTL lines branch. This gives the added flexibility of optionally being able to have a serial port on an expansion board that would use the connector nominally designated for the VIB.

The gateway runs from a 12 volt source on the vehicle. The power supply provides a 12 volt filtered line, a 5 volt line capable of 3 amps and a 3.3 volt line capable of 5 amps.

A PIC controls the on/off state of the gateway. The PIC obtains power from the 12 volt supply of the host vehicle and runs continuously with a typical current consumption of less than 10 mA. The PIC monitors the RUN/ACC line from the vehicle and, when RUN/ACC is active, the PIC enables the power supply.

The PIC also acts as a supervisory chip for both the SH7751 and the VIB board. After turning on the power supply it handles the SH7751 and VIB resets. When the RUN/ACC line goes low, the gateway informs the SH7751 that a shutdown is scheduled and shuts down the power supply after 1 minute. The communication between the SH7751 and the PIC is done over SPI with the PIC acting as the master. While the RUN/ACC line is low, the PIC may for example power up the phone every 20 minutes for 1 minute to allow for incoming messages, or at some other desired duty cycle. The phone is powered by a linear regulator that is run from the 12 volt filtered line and is controlled by the PIC. While the phone is on, the PIC listens to the phones TX line for the AT command "ring". If the PIC receives this message, it wakes up the entire gateway. The interface between the SH7751 and the PIC is SPI and uses the SH7751 SCI port. The PIC also monitors two temperature sensors; one is located by the power supply and the other is on the other side of the core board next to the PCMCIA slots.

The core board has multiple headers from which an external device can tap power. The headers include a 5 volt header from the main power supply, a 3.3 volt header from the main power supply, a 5 volt header from the linear regulator controlled by the PIC. The header for the regulator controlled by the PIC should be located near the header from serial port 2. There is also a header which is located close to the main connector which includes the raw 12 volt line from the vehicle (unfiltered).

The core board is responsible for supplying power to the VIB. The core board supplies the VIB with 3.3 volt, 5 volt, and 12 volt power rails in addition to ground, but is not so limited. The 3.3 volt and 5 volt supplies are both regulated while the 12 volt supply is not. The 12 volt supply is a filtered version of the vehicle power supply.

A header including 6 GPIOs is on the core board. The GPIO is internally pulled high. Ground pins are provided to pull the GPIO low with jumpers, for example to place the mGate in a debug mode.

Five LEDs are provided which are viewable from outside of the enclosure. The LEDs are placed so that they can easily be viewed while the gateway is installed in a vehicle. These LEDs are intended to aid in gateway diagnostics. One of the LEDs is red while the others are green. The LED states can be decoded to provide information pertinent to debugging.

An embodiment includes two JTAG headers on the core board. The SH7751 will use a 14-pin header and the FPGA will use a 5-pin header. These headers are accessible while the boards are removed from the enclosure.

The expansion board includes an Ethernet port and debug/test ports for the core board. The expansion board mates with the three headers that are exposed on the core board. The PCI header is used for the Ethernet. The connector dedicated for the VIB is passed through the board but not used. The SH7751 data and address lines run though a DATA/ADDR header.

The Ethernet is implemented using the SH7751 PCI port. A RJ45 connector is exposed so that a LAN connection can be made.

The address and data lines, along with a few other miscellaneous lines, are run to the expansion board through an ADD/DATA header. These signals are buffered on the expansion board and accessible via Mictor connectors.

The core board interfaces to a vehicle interface daughter board that supports the interfaces for communicating with buses and dedicated inputs and outputs on the vehicle. The VIB includes most of the external interfaces of the gateway. The VIB may be used, for example, to host a suite of interfaces seen on a single manufacturer's vehicle or class of vehicles. In one embodiment, the VIB interfaces to a J1850 for access to vehicle diagnostics and GPS, and has GPIO for miscellaneous interfaces. An FPGA is used as the bridge between the SH-4 on the core board and the processors on the VIB.

The PCMCIA for both the LAN and Bluetooth cards have the option of having a patch antenna or a connector from which a cable will run to an external antenna. A radome and bulkhead connectors offer this versatility. The WAN and GPS use these antennas to run externally.

The cellular unit, which serves as a WAN, interfaces with serial port 2 of the quad UART. The header for this port is exposed on the core board and located near the power header dedicated to the phone and controlled by the PIC.

The gateway contains a GPS module that is mounted on and interfaces to the VIB. The GPS unit in one embodiment is a RoyalTek REB-2100.

The gateway of an embodiment includes an 802.11 PCMCIA card that will be inserted into one of the two slots on the expansion board. The gateway accommodates both a patch antenna as well as a PCMCIA with an external connector.

The gateway of an embodiment will accept either a PCMCIA Bluetooth card or a module that will plug into the UART serial port 1 header on the core board. The gateway will accommodate both a patch antenna and an external connector.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems, not only for the processing system described above.

The elements and acts of the various embodiments described above can be combined to provide further embodiments. Aspects of the invention can be modified, if necessary, to employ the systems, functions and concepts of the various references and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all processing systems that operate under the claims to provide shared resource access management. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method for providing shared resource access management, comprising:
   receiving requests for access to resources from applications in user space, wherein the requests are received at a redirection module in kernel space;
   routing signals representative of the received requests from the redirection module to a management suite in the user space, wherein the management suite includes at least one resource management module and device drivers corresponding to the resources;
   generating queries on availability of the requested resources, and transferring the generated queries from the generating resource management module to device drivers of the requested resources;
   receiving resource status information from the device drivers, wherein the resource status information is received at the generating resource management module;
   generating schedules for granting access to the requested resources, wherein the schedules are generated by the generating resource management module in response to the resource status information; and
   controlling access to the resources in accordance with the generated schedules, wherein the resource management module issues responses to the requesting applications and the device drivers of the requested resources.

2. The method of claim 1, wherein the device drivers reside in the user space and couple to the management suite.

3. The method of claim 1, wherein the redirection module includes at least one kernel module in the kernel space coupled via at least one control channel to at least one library in the user space.

4. The method of claim 1, wherein the at least one resource management module includes a plurality of application programming interfaces.

5. The method of claim 1, further comprising validating each received request against at least one policy of the resource management module.

6. The method of claim 5, wherein the at least one policy is selected from among security policies, cost accounting policies, access policies, control policies, and timing policies.

7. The method of claim 1, wherein the management suite is language-independent.

8. The method of claim 1, wherein the resources reside on a telematics platform.

9. The method of claim 1, wherein the applications reside on a portable platform that is remote to the platform hosting the resources.

10. The method of claim 9, further comprising controlling access to the resources by the remote applications using Transmission Control Protocol/Internet Protocol (TCP/IP) security protocols.

11. The method of claim 1, wherein the resources and the applications reside on a platform hosting Java and a Portable Operating System Interface (POSIX).

12. The method of claim 1, further comprising controlling access to the resources by performing access control checks on the resource requests, wherein the access control checks include analysis of user identification metadata.

13. The method of claim 1, further comprising controlling transfer of information among the applications by performing access control checks on information requests from requesting applications.

14. The method of claim 1, further comprising controlling access to the resources via at least one application running on at least one Java virtual machine (JVM), wherein the JVMs are coupled among the at least one resource management module and a shared memory pool from which the JVMs share memory.

15. A method for providing shared resource access to multiple applications, comprising:

receiving resource access requests at a kernel space module from the applications, wherein the applications reside in user space;

generating and routing signals representative of the received requests from the kernel space module to components of a driver interface, wherein the driver interface resides in the user space, and wherein the components include at least one resource manager and a plurality of resource device drivers;

generating queries in the driver interface to determine availability of the requested resources, and transferring the queries to the corresponding resource device drivers;

receiving status information from the resource device drivers in response to the queries;

generating schedules for granting access to the requested resources, wherein the schedules are generated in the driver interface in accordance with the status information; and providing shared access to the resources in accordance with the generated schedules via the driver interface.

* * * * *